(12) United States Patent
Tabata et al.

(10) Patent No.: US 7,909,728 B2
(45) Date of Patent: Mar. 22, 2011

(54) VEHICLE DRIVE DEVICE CONTROLLER

(75) Inventors: Atsushi Tabata, Okazaki (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 551 days.

(21) Appl. No.: 11/914,864

(22) PCT Filed: May 19, 2006

(86) PCT No.: PCT/JP2006/310513
§ 371 (c)(1),
(2), (4) Date: Nov. 19, 2007

(87) PCT Pub. No.: WO2006/123841
PCT Pub. Date: Nov. 23, 2006

(65) Prior Publication Data
US 2009/0088290 A1    Apr. 2, 2009

(30) Foreign Application Priority Data

May 19, 2005  (JP) .................................. 2005-147348
May 31, 2005  (JP) .................................. 2005-159502

(51) Int. Cl.
*B60K 1/02* (2006.01)
*B60W 10/02* (2006.01)
*B60W 10/04* (2006.01)

(52) U.S. Cl. ............ 477/3; 477/5; 477/108; 180/65.285

(58) Field of Classification Search .......... 475/5; 477/3, 477/4, 5, 6, 108; 180/65.21, 65.23, 65.235, 180/65.24, 65.245, 65.26, 65.6, 65.7, 65.265, 180/65.275, 65.285
See application file for complete search history.

(56) References Cited

U.S. PATENT DOCUMENTS

| 6,551,208 | B1 * | 4/2003 | Holmes et al. ..................... 475/5 |
| 7,192,373 | B2 * | 3/2007 | Bucknor et al. ................... 475/5 |
| 7,322,902 | B2 * | 1/2008 | Tabata et al. ..................... 477/4 |
| 2009/0118955 | A1 * | 5/2009 | Tabata et al. ................... 701/66 |

FOREIGN PATENT DOCUMENTS

| JP | 9-331603 | 12/1997 |
| JP | 10-184415 | 7/1998 |

(Continued)

*Primary Examiner* — Roger Pang
(74) *Attorney, Agent, or Firm* — Oblon, Spivak, McClelland, Maier & Neustadt, L.L.P.

(57) ABSTRACT

A vehicle drive apparatus is disclosed having a differential mechanism and an electric motor provided in the differential mechanism for miniaturizing the drive apparatus or improving fuel consumption while suppressing the occurrence of shifting shocks. A switching clutch C0 or switching brake B0 is provided for placing a shifting mechanism 10 in a continuously variable shifting state and a step variable shifting state, enabling the drive apparatus to have combined advantages including a fuel economy improving effect of a transmission, enabled to electrically change a speed ratio, and a high transmitting efficiency of a gear type transmitting device enabled to mechanically transmit drive power. During a shifting of an automatic shifting portion 20 with a differential portion placed in a continuously variable shifting state, engaging pressure control means 84 controls a engaging pressure of a engaging device of the automatic power shifting portion 20 such that a rotational speed $N_{18}$ of a transmitting member achieves a given variation so as to provide a compromise between a rapid shifting response on a feeling and a slow shifting response on the shifting shocks, thereby suppressing the occurrence of the shifting shocks.

10 Claims, 24 Drawing Sheets

FOREIGN PATENT DOCUMENTS

| | | |
|---|---|---|
| JP | 10-257610 | 9/1998 |
| JP | 11-217025 | 8/1999 |
| JP | 2000-2327 | 1/2000 |
| JP | 2000-346169 | 12/2000 |
| JP | 2000-346187 | 12/2000 |
| JP | 2003-130203 | 5/2003 |
| JP | 2003-301731 | 10/2003 |
| JP | 2004-140993 | 5/2004 |
| JP | 2005-61498 | 3/2005 |

* cited by examiner

| | C0 | C1 | C2 | B0 | B1 | B2 | B3 | SHIFTING RATIO | STEPPING RATIO |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | | ○ | 3.209 | |
| N | ○ | | | | | | | | |

○ ENGAGED
◎ ENGAGED IN STEP-VARIABLE, RELEASED IN CONTINUOUSLY-VARIABLE

| ENGINE TORQUE | 1→2 | | 2→3 | | 3→4 | | 4→5 | |
|---|---|---|---|---|---|---|---|---|
| 1 | Pb3u121 | Pb2u121 | Pb2u231 | Pb1u231 | Pb1u341 | Pc2u341 | Pc0u451 | Pb0u451 |
| 2 | Pb3u122 | Pb2u122 | Pb2u232 | Pb1u232 | Pb1u342 | Pc2u342 | Pc0u452 | Pb0u452 |
| 3 | Pb3u123 | Pb2u123 | Pb2u233 | Pb1u233 | Pb1u343 | Pc2u343 | Pc0u453 | Pb0u453 |
| 4 | Pb3u124 | Pb2u124 | Pb2u234 | Pb1u234 | Pb1u344 | Pc2u344 | Pc0u454 | Pb0u454 |
| 5 | Pb3u125 | Pb2u125 | Pb2u235 | Pb1u235 | Pb1u345 | Pc2u345 | Pc0u455 | Pb0u455 |
| 6 | Pb3u126 | Pb2u126 | Pb2u236 | Pb1u236 | Pb1u346 | Pc2u346 | Pc0u456 | Pb0u456 |
| 7 | Pb3u127 | Pb2u127 | Pb2u237 | Pb1u237 | Pb1u347 | Pc2u347 | Pc0u457 | Pb0u457 |

(b)

| ENGINE TORQUE | 1←2 | | 2←3 | | 3←4 | | 4←5 | |
|---|---|---|---|---|---|---|---|---|
| 1 | Pb3d121 | Pb2d121 | Pb2d231 | Pb1d231 | Pb1d341 | Pc2d341 | Pc0d451 | Pb0d451 |
| 2 | Pb3d122 | Pb2d122 | Pb2d232 | Pb1d232 | Pb1d342 | Pc2d342 | Pc0d452 | Pb0d452 |
| 3 | Pb3d123 | Pb2d123 | Pb2d233 | Pb1d233 | Pb1d343 | Pc2d343 | Pc0d453 | Pb0d453 |
| 4 | Pb3d124 | Pb2d124 | Pb2d234 | Pb1d234 | Pb1d344 | Pc2d344 | Pc0d454 | Pb0d454 |
| 5 | Pb3d125 | Pb2d125 | Pb2d235 | Pb1d235 | Pb1d345 | Pc2d345 | Pc0d455 | Pb0d455 |
| 6 | Pb3d126 | Pb2d126 | Pb2d236 | Pb1d236 | Pb1d346 | Pc2d346 | Pc0d456 | Pb0d456 |
| 7 | Pb3d127 | Pb2d127 | Pb2d237 | Pb1d237 | Pb1d347 | Pc2d347 | Pc0d457 | Pb0d457 |

|  | C0 | C1 | C2 | B0 | B1 | B2 | SHIFTING RATIO | STEPPING RATIO |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | TOTAL 3.977 |
| R |  |  | ○ |  |  | ○ | 2.393 |  |
| N |  | ○ |  |  |  |  |  |  |

○ ENGAGED
◎ ENGAGED IN STEP-VARIABLE,
   RELEASED IN CONTINUOUSLY-VARIABLE

VEHICLE DRIVE DEVICE CONTROLLER

TECHNICAL FIELD

The present invention relates to a drive apparatus for vehicle having a differential mechanism, operative to perform a differential action, and an electric motor, and more particularly, to a technology of miniaturizing an electric motor or the like.

BACKGROUND ART

There has heretofore been known a drive apparatus of a vehicle including a differential mechanism through which an output of a drive power source, such as an engine or the like, is distributed to a first electric motor and an output member, and a second electric motor disposed between the output member and drive wheels. Such drive apparatus for a hybrid vehicle is disclosed for example in Patent Publication 1. The drive apparatus includes a differential mechanism being comprised of a planetary gear unit i.e., gear set and performing as the differential action for mechanically transmitting a major part of power outputted from the engine to drive wheels. A remaining part of power from the engine is electrically transmitted from the first electric motor to the second electric motor using an electrical path.

Thus, the drive apparatus operates as a transmission of which shifting ratio i.e., gear ratio is electrically changed, for example as an electrically controlled continuously variable automatic transmission. The drive apparatus is controlled by the control device so that the vehicle runs i.e., is driven with the optimum operation state of the engine, thus improving fuel consumption, i.e., mileage.

Patent Publication 1: JP 2003-301731

In general, the continuously variable transmission has heretofore been known as a device for improving fuel consumption of a vehicle. A gear type power transmitting device such as a step variable automatic transmission has heretofore been known as a device having high transmitting efficiency. However, no power transmitting mechanism having such combined advantages has been put into practical use yet. For instance, the hybrid vehicle drive apparatus, disclosed in the above Patent Publication 1, includes the electrical path through which electric energy is transmitted from the first electric motor to the second electric motor, that is, a transmitting path through which a part of the vehicle drive force is transmitted in the form of electric energy. This inevitably causes the first electric motor to be made large-size with an increase in an output of the engine. Also, the second electric motor, driven with electric energy output from the first electric motor, is caused to increase in size. Thus, an issue arises with the occurrence of an increase in size of the drive apparatus.

Alternately, the part of the engine output is transmitted to the driving wheel after converted to the electric energy once, which may worsen the mileage depending on the vehicle running condition such as the high speed running i.e., driving. Similar problem may occur when the above power distributing mechanism is used as the continuously variable machine called the electrically controlled CVT in which the shifting ratio is electrically changed.

With the drive apparatus for hybrid vehicle disclosed in Patent Publication 1, further, there has heretofore been known a transmission incorporated in a power transmitting path between an output member of a differential mechanism (electrically controlled continuously variable shifting portion) and drive wheels with a view to minimizing a required capacity of the second electric motor to meet a need for increasing drive torque. With such a drive apparatus for vehicle, an output of a drive power source is transferred to the drive wheels via two shifting mechanisms including the electrically controlled continuously variable shifting portion and the transmission, while permitting the drive apparatus to establish a total gear ratio based on respective gear ratios of the shifting mechanisms.

When this takes place, if the transmission executes the shifting, then, a need arises to execute the control of the continuously variable shifting portion with such a shifting. This causes likelihood of the transmission and the continuously variable shifting portion complicated in control, unlike the transmission and the continuously variable shifting portion are provided independently for respective controls, resulting in the occurrence of shifting shocks.

As one example of the transmission, a step variable automatic transmission (hereinafter referred to as "step variable transmission") has been known including an engaging device for selectively engaging plural sets of rotary elements of a planetary gear set to be alternatively switched to plural gear positions such as a forward 4th-gear, a forward 5th-gear and a forward 6th-gear, etc. With such a step variable transmission, an engaging pressure of the engaging device is controlled during a shifting so as to suppress the shifting shocks. However, the engaging pressure of the engaging device needs to be controlled in conjunction with a control of the continuously variable shifting portion during the shifting of the step variable transmission. Accordingly, there has been likelihood of the transmission and the continuously variable shifting portion more complicated in control than that independently executed by the step variable transmission, resulting in the occurrence of shifting shocks.

The present invention has been completed with the above view in mind and has an object to provide a control device for vehicle drive apparatus, having a differential mechanism operative to perform a differential action for distributing an output of an engine to a first electric motor and an output shaft, and an electric motor disposed in a power transmitting path between the differential mechanism and drive wheels, which enables the miniaturization of the drive apparatus and/or the improvement in fuel consumption with a capability of suppressing shifting shocks.

DISCLOSURE OF THE INVENTION

In the invention recited in the claim 1, a control device for vehicular drive apparatus, (a) the vehicular drive apparatus having (i) an engine, (ii) a continuously variable shifting portion including a differential mechanism for distributing an output of the engine to a first electric motor and a transmitting member, and a second electric motor disposed in a power transmitting path between the power transmitting member and drive wheels, being operative as an electrically controlled continuously variable transmission, and (iii) a shifting portion part forming a part of the power transmitting path and executing the shifting by engaging i.e., coupling or disengaging i.e., uncoupling an engaging device i.e., coupling device, the control device comprising: (b) a differential state switching device disposed in the differential mechanism and operative to selectively switch the continuously variable shifting portion in a continuously variable shifting state enabling an electrically controlled continuously variable shifting operation, and a non-continuously variable shifting state disenabling the electrically controlled continuously variable shifting operation; and (c) coupling pressure control means or an engaging pressure control portion for controlling engaging pressure i.e., coupling pressure of the engaging device to allow a rotational speed of the transmitting member to achieve a given variation during the shifting of the shifting portion, with the continuously variable shifting portion placed in the continuously variable shifting state.

With such a structure, the differential state switching device allows the continuously variable shifting portion of the vehicle drive apparatus to be selectively switched in the continuously variable shifting state available to perform the electrically controlled continuously variable shifting operation, and the non-continuously variable shifting state, i.e., a step variable shifting state, disenabling the electrically controlled continuously variable shifting operation. This results in capability of obtaining the drive apparatus with combined advantages of a fuel saving effect of the transmission in which a gear ratio is electrically changed and a high transmitting efficiency of a gear-type power transmitting device in which a drive power is mechanically transferred. For instance, in a normal output region of the engine where the vehicle runs at a low/medium speed and low/medium output, placing the continuously variable shifting portion in the continuously variable shifting state ensures the vehicle to have fuel economy performance.

During the running of the vehicle at a high speed, in contrast, the continuously variable shifting portion is placed in the non-continuously variable shifting state for the engine output to be transmitted mainly through the mechanical transmitting path to the drive wheels. This suppresses a loss in conversion efficiency between a drive power and electric energy occurring when the continuously variable shifting portion is rendered operative to electrically change the gear ratio, resulting in improved fuel consumption. Further, for instance, as the continuously variable shifting portion is placed in the non-continuously variable shifting state in the high output region of the engine, the transmission is rendered operative to electrically change the gear ratio in regions where the vehicle runs at the low/medium speed and low/medium output. This minimizes a maximal value of electric energy to be generated by the electric motor, resulting in a further miniaturization of the electric motor or the vehicle drive apparatus including such an electric motor.

With the vehicle drive apparatus including the continuously variable shifting portion structured to be switchable to the continuously variable shifting state and the non-continuously variable shifting state, during the shifting of the shifting portion with the continuously variable shifting portion placed in the continuously variable shifting state, the engaging pressure control means controls the engaging pressure of the engaging device so as to allow the rotational speed of the transmitting member to achieve the given variation.

This allows the rotational speed of the transmitting member, uniquely determined with a vehicle speed and a speed ratio of the transmission, to achieve a given varying state, i.e., a given varying rate to provide a balance between a rapid shifting response and a slow shifting response. In the rapid shifting response, the rotational speed of the transmitting member varies at an increased varying rate regarded to achieve, for instance, a comfortable feeling. In the slow shifting response, the rotational speed of the transmitting member varies at a decreased varying rate regarded to have, for instance, an ease of suppressing shifting shocks. Thus, the occurrence of the shifting shocks is suppressed.

In the invention recited in the claim 2, a control device for vehicular drive apparatus, (a) the vehicular drive apparatus having (i) an engine, (ii) a continuously variable shifting portion including a differential mechanism for distributing an output of the engine to a first electric motor and a transmitting member, and a second electric motor disposed in a power transmitting path between the power transmitting member and drive wheels, being operative as an electrically controlled continuously variable transmission, and (iii) a shifting portion forming a part of the power transmitting path and executing the shifting by engaging or disengaging an engaging device, the control device comprising: (b) a differential state switching device disposed in the differential mechanism and operative to selectively switch the continuously variable shifting portion in a continuously variable shifting state enabling an electrically controlled continuously variable shifting operation, and a non-continuously variable shifting state disenabling the electrically controlled continuously variable shifting operation; and (c) engaging pressure control means or an engaging pressure control portion for controlling engaging pressure of the engaging device to allow a rotational speed of the transmitting member or a rotational speed of the engine to achieve a given variation during the shifting of the shifting portion, with the continuously variable shifting portion placed in the non-continuously variable shifting state.

With such a structure, the differential state switching device allows the continuously variable shifting portion of the vehicle drive apparatus to be selectively switched in the continuously variable shifting state available to perform the electrically controlled continuously variable shifting operation, and the non-continuously variable shifting state, for example, a step variable shifting state, disenabling the electrically controlled continuously variable shifting operation. This results in capability of obtaining the drive apparatus with combined advantages of a fuel saving effect of the transmission in which a gear ratio is electrically changed and a high transmitting efficiency of a gear-type power transmitting device in which a drive power is mechanically transferred. For instance, in a normal output region of the engine where the vehicle runs at a low/medium speed and low/medium output, placing the continuously variable shifting portion in the continuously variable shifting state ensures the vehicle to have fuel economy performance.

During the running of the vehicle at a high speed, in contrast, the continuously variable shifting portion is placed in the non-continuously variable shifting state for the engine output to be transmitted mainly through the mechanical transmitting path to the drive wheels. This suppresses a loss in conversion efficiency between a drive power and electric energy occurring when the continuously variable shifting portion is rendered operative to electrically change the gear ratio, resulting in improved fuel consumption. Further, for instance, as the continuously variable shifting portion is placed in the non-continuously variable shifting state in the high output region of the engine, the transmission is rendered operative to electrically change the gear ratio in regions where the vehicle runs at the low/medium speed and low/medium output. This minimizes a maximal value of electric energy to be generated by the electric motor, resulting in a further miniaturization of the electric motor or the vehicle drive apparatus including such an electric motor.

With the vehicle drive apparatus including the continuously variable shifting portion structured to be switchable to the continuously variable shifting state and the non-continuously variable shifting state, during the shifting of the shifting portion with the continuously variable shifting portion placed in the non-continuously variable shifting state, the engaging pressure control means controls the engaging pressure of the engaging device so as to allow the rotational speed of the transmitting member or the rotational speed of engine to achieve the given variation.

Thus, with the continuously variable shifting portion placed in the non-continuously variable shifting state, the rotational speed of the transmitting member, uniquely determined with the vehicle speed and the speed ratio of the transmission, and the rotational speed of the engine to achieve the given varying states, i.e., the given varying rates to provide a balance between a rapid shifting response and a slow shifting response. In the rapid shifting response, the rotational speed of the transmitting member or the rotational speed of the engine varies at increased varying rates regarded to achieve, for instance, a comfortable feeling. In the slow shifting response, the rotational speed of the transmitting member or the rotational speed of the engine varies at decreased varying rates regarded to have, for instance, an ease of suppressing shifting shocks. Thus, the occurrence of the shifting shocks is suppressed.

In the invention recited in the claim 3, a control device for vehicular drive apparatus, (a) the vehicular drive apparatus having (i) an engine, (ii) a differential portion including a differential mechanism for distributing an output of the engine to a first electric motor and a transmitting member, and a second electric motor disposed in a power transmitting path between the power transmitting member and drive wheels, and (iii) a shifting portion forming a part of the power transmitting path and executing a shifting by engaging or disengaging an engaging device, the control device comprising: (b) a differential state switching device disposed in the differential mechanism and operative to selectively switch the differential portion in a differential state enabling a differential action, and a non-differential state disenabling the differential action; and (c) engaging pressure control means or an engaging pressure control portion for controlling engaging pressure of the engaging device to allow a rotational speed of the transmitting member to achieve a given variation during the shifting of the shifting portion, with the differential portion placed in the differential state.

With such a structure, the differential state switching device allows the differential portion of the vehicle drive apparatus to be selectively switched in the differential state available to perform the differential action, and the non-differential state, for example, a locked state disenabling the differential action. This results in capability of obtaining the drive apparatus with combined advantages of a fuel saving effect of the transmission in which a gear ratio is electrically changed, and a high transmitting efficiency of a gear-type power transmitting device in which a drive power is mechanically transferred. For instance, in a normal output region of the engine where the vehicle runs at a low/medium speed and low/medium output, placing the differential portion in the differential state ensures the vehicle to have fuel economy performance.

During the running of the vehicle at a high speed, in contrast, the differential portion is placed in the non-differential state for the engine output to be transmitted mainly through the mechanical transmitting path to the drive wheels. This suppresses a loss in conversion efficiency between a drive power and electric energy occurring when the differential portion is rendered operative to electrically change the gear ratio, resulting in improved fuel consumption. Further, for instance, as the differential portion is placed in the non-differential state in the high output region of the engine, the transmission is rendered operative to electrically change the gear ratio in regions where the vehicle runs at the low/medium speed and low/medium output. This minimizes a maximal value of electric energy to be generated by the electric motor, resulting in a further miniaturization of the electric motor or the vehicle drive apparatus including such an electric motor.

With the vehicle drive apparatus including the differential portion structured to be switchable to the differential state and the non-differential state, during the shifting of the shifting portion with the differential portion placed in the differential state, the engaging pressure control means controls the engaging pressure of the engaging device so as to allow the rotational speed of the transmitting member to achieve the given variation. This allows the rotational speed of the transmitting member, uniquely determined with a vehicle speed and a speed ratio of the shifting portion, to achieve a given varying state, i.e., a given varying rate to provide a balance between a rapid shifting response and a slow shifting response. In the rapid shifting response, the rotational speed of the transmitting member varies at an increased varying rate regarded to achieve, for instance, a comfortable feeling. In the slow shifting response, the rotational speed of the transmitting member varies at a decreased varying rate regarded to have, for instance, an ease of suppressing shifting shocks. Thus, the occurrence of the shifting shocks is suppressed.

In the invention recited in the claim 4, a control device for vehicular drive apparatus, (a) the vehicular drive apparatus having (i) an engine, (ii) a differential portion including a differential mechanism for distributing an output of the engine to a first electric motor and a transmitting member, and a second electric motor disposed in a power transmitting path between the power transmitting member and drive wheels, and (iii) a shifting portion forming a part of the power transmitting path and executing a shifting by engaging or disengaging an engaging device, the control device comprising: (b) a differential state switching device disposed in the differential mechanism and operative to selectively switch the shifting portion in a differential state enabling a differential action, and a non-differential state disenabling the differential action; and (c) engaging pressure control means or an engaging pressure control portion for controlling engaging pressure of the engaging device to allow a rotational speed of the transmitting member or a rotational speed of the engine to achieve a given variation during the shifting of the shifting portion, with the differential portion placed in the non-differential state.

With such a structure, the differential state switching device allows the differential portion of the vehicle drive apparatus to be selectively switched in the differential state available to perform the differential action, and the non-differential state, for example, a locked state, disenabling the differential action. This results in capability of obtaining the drive apparatus with combined advantages of a fuel saving effect of the transmission in which a gear ratio is electrically changed, and a high transmitting efficiency of a gear-type power transmitting device in which a drive power is mechanically transferred. For instance, in a normal output region of the engine where the vehicle runs at a low/medium speed and low/medium output, placing the differential portion in the differential state ensures the vehicle to have fuel economy performance.

During the running of the vehicle at a high speed, in contrast, the differential portion is placed in the non-differential state for the engine output to be transmitted mainly through the mechanical transmitting path to the drive wheels. This suppresses a loss in conversion efficiency between a drive power and electric energy occurring when the differential portion is rendered operative to electrically change the gear ratio, resulting in improved fuel consumption. Further, for instance, as the differential portion is placed in the non-differential state in the high output region of the engine, the transmission is rendered operative to electrically change the gear ratio in regions where the vehicle runs at the low/medium speed and low/medium output. This minimizes a maximal value of electric energy to be generated by the electric motor, resulting in a further miniaturization of the electric motor or the vehicle drive apparatus including such an electric motor.

With the vehicle drive apparatus including the differential portion structured to be switchable to the differential state and the non-differential state, during the shifting of the shifting portion with the differential portion placed in the differential state, the engaging pressure control means controls the engaging pressure of the engaging device so as to allow the rotational speed of the transmitting member or the rotational speed of the engine to achieve the given variation.

This allows the rotational speed of the transmitting member or that of the engine, uniquely determined with a vehicle speed and a speed ratio of the shifting portion, to achieve a given varying state, i.e., a given varying rate to provide a balance between a rapid shifting response and a slow shifting response. In the rapid shifting response, the rotational speed of the transmitting member or that of the engine varies at an increased varying rate regarded to achieve, for instance, a comfortable feeling. In the slow shifting response, the rotational speed of the transmitting member or that of the engine varies at a decreased varying rate regarded to have, for instance, an ease of suppressing shifting shocks. Thus, the occurrence of the shifting shocks is suppressed.

Preferably, as recited in the claim 5, a control device for vehicular drive apparatus further comprising electric motor control means for varying a rotational speed of the first electric motor so as to allow the rotational speed of the engine to continuously vary on a stage before and after the shifting of the shifting portion.

Preferably, as recited in the claim 6, in a control device for vehicular drive apparatus, the engaging pressure control means learns the engaging pressure of the engaging device so as to allow the rotational speed of the transmitting member or the rotational speed of the engine to achieve the given variation.

Preferably, as recited in claim 7, a control device for vehicular drive apparatus further comprising rotation control means for varying a rotational speed of the transmitting member using the first electric motor and/or the second electric motor so as to allow the rotational speed of the transmitting member to achieve a given variation during the shifting of the shifting portion, and with the rotation control means operated for the rotational speed of the transmitting member to be varied, the engaging pressure control means inhibiting the learning on the engaging pressure of the engaging device.

This inhibits the learning based on the engaging pressure of the engaging device when the rotation control means varies the rotational speed of the transmitting member. This results in the suppression of the shifting shocks when the rotation control means does not vary the rotational speed of the transmitting member.

Preferably, as recited in claim 8, a control device for vehicular drive apparatus further comprising rotation control means for varying a rotational speed of the transmitting member using the first electric motor and/or the second electric motor so as to allow the rotational speed of the transmitting member to achieve a given variation during the shifting of the shifting portion, and with the rotation control means operated for the rotational speed of the transmitting member to be varied, the engaging pressure control means learning the engaging pressure of the engaging device in consideration of a variation in the rotational speed of the transmitting member.

With such a control, the engaging pressure of the engaging device is learned upon subtracting a shifting shock suppressing effect caused by the variation in the rotational speed of the transmitting member effectuated by the rotation control means, thereby suppressing the occurrence of shifting shocks when the rotation control means does not vary the rotational speed of the transmitting member.

In the invention recited in the claim 9, a control device for vehicular drive apparatus, (a) the vehicular drive apparatus having (i) a continuously variable shifting portion including a differential mechanism for distributing an output of an engine to a first electric motor and a transmitting member, a second electric motor disposed in a power transmitting path between the power transmitting member and drive wheels, being operative as an electrically controlled continuously variable shifting portion, and (ii) a shifting portion forming a part of the power transmitting path, (b) the control device comprising electric motor control means or an electric motor control portion for varying a rotational speed of the transmitting member during the shifting of the shifting portion using the first electric motor and/or the second electric motor.

With such a structure, during the shifting of the shifting portion, the electric motor control means varies the rotational speed of the transmitting member using the first electric motor and/or the second electric motor. This allows the rotational speed of the transmitting member, uniquely determined with the vehicle speed and the speed ratio of the shifting portion, to achieve a given varying rate to provide a balance between a rapid shifting response and a slow shifting response. In the rapid shifting response, the rotational speed of the transmitting member varies at an increased varying rate regarded to achieve, for instance, a comfortable feeling. In the slow shifting response, the rotational speed of the transmitting member varies at a decreased varying rate regarded to have, for instance, an ease of suppressing shifting shocks. In other words, the rotational speed of the transmitting member is caused to achieve a given varying state for instance a given varying rate to provide a compromise between the shortening of for instance a shifting time and the suppression of the shifting shocks, whereby the occurrence of the shifting shocks is suppressed.

Preferably, as recited in the claim 10, in a control device for vehicular drive apparatus, the shifting portion executes the shifting upon disengaging an on-disengaging side engaging device or engaging an on-engaging side engaging device, and further comprising engaging pressure control means or a engaging pressure control portion, during the shifting of the shifting portion, for controlling the engaging pressure of the on-disengaging side engaging device and/or the engaging pressure of the on-engaging side engaging device, in conjunction with a variation in the rotational speed of the transmitting member by the electric motor control means, for thereby varying the rotational speed of the transmitting member.

With such a structure, the electric motor control means varies the rotational speed of the transmitting member using the first electric motor and/or the second electric motor. In addition, the engaging pressure of the on-disengaging side engaging device and/or the engaging pressure of the on-engaging side engaging device, associated with the shifting of the shifting portion, vary the rotational speed of the transmitting member so as to provide the balance between the shortening of for instance the shifting time and the suppression of the shifting shocks. Thus, the further suppression of the shifting shocks is achieved.

Preferably, as recited, in a control device for vehicular drive apparatus, the electric motor control means allows the rotational speed of the transmitting member to vary so as to achieve a given varying rate.

Preferably, as recited, in a control device for vehicular drive apparatus, the electric motor control means serves to prevent the variation in the rotational speed of the transmitting member on a stage before and after the shifting of the shifting portion using the first electric motor. Such a structure allows the total speed ratio, achieved with the continuously variable shifting portion and the transmission, to be continuously varied. This results in a further suppression of the shifting shocks than that achieved in a case where the rotational speed of the engine is caused to vary such that the total speed ratio achieves a non-continuous variation, i.e., a step-wise variation.

In the invention recited, a control device for vehicular drive apparatus, (a) the vehicular drive apparatus having (i) a continuously variable shifting portion including a differential mechanism for distributing an output of an engine to a first electric motor and a transmitting member, a second electric motor disposed in a power transmitting path between the power transmitting member and drive wheels, being operative as an electrically controlled continuously variable transmission, and (ii) a shifting portion forming a part of the power transmitting path, the control device comprising: (b) a differential action limiting device disposed in the differential mechanism and operative to limit a differential action of the differential mechanism for thereby limiting an operation of the continuously variable shifting portion as an electrically controlled continuously variable transmission; and (c) electric motor control means or an electric motor control portion for varying a rotational speed of the transmitting member or an rotational speed of engine using the first electric motor and/or the second electric motor, during the shifting of the shifting portion, when the differential action limiting device limits the operation of the continuously variable shifting portion as the electrically controlled continuously variable transmission to place the continuously variable shifting portion in a non-continuously variable shifting state to interrupt an electrically controlled continuously variable shifting operation.

With such a structure, the differential action limiting device does not limit the differential action of the differential mechanism to allow the differential mechanism to be placed in the differential state for the differential action to be activated. This allows the differential mechanism to be placed in the continuously variable shifting state enabling the electrically controlled continuously variable shifting operation to be performed. Alternately, with the differential action limiting device limiting the differential action of the differential mechanism, the operation of the electrically controlled continuously variable transmission is limited.

For instance, with the differential mechanism placed in the non-continuously variable shifting state, i.e., in a locked state, the differential mechanism is placed in the non-continuously variable shifting state, such as, for instance, a step-variable shifting state disenabling the electrically controlled continuously variable shifting operation. This results in a capability of obtaining a drive apparatus having doubled advantageous effects of a fuel saving effect of the transmission for the speed ratio to be electrically changed and a high transmitting efficiency of a gear reduction type transmitting device for a vehicle drive force to be mechanically transferred.

For instance, in a normal output region of the engine with a vehicle running at a low/intermediate speed and low/intermediate output, placing the continuously variable shifting portion in the continuously variable shifting state ensures a fuel saving performance of the vehicle. In addition, with the continuously variable shifting portion placed in the non-continuously variable shifting state during the running of the vehicle at the high speed, the output of the engine is transferred mainly through a mechanical power transmitting path to the drive wheels. This minimizes a loss in conversion between the vehicle drive force, occurring when the continuously variable shifting portion is caused to operate as a transmission for the speed ratio to be electrically changed, and electrical energy, resulting in improvement in fuel consumption.

Moreover, with the continuously variable shifting portion placed in the non-continuously variable shifting state during the running of the vehicle at the high output, the continuously variable shifting portion is actuated as the transmission to electrically change the speed ratio in a region under which the vehicle runs at the low/intermediate speed and low/intermediate output. This enables a reduction in a maximal value of electric energy, for the electric motor to generate, i.e., electric energy for the electric motor to transfer, resulting in a further minimization of the electric motor or the vehicle drive apparatus incorporating such an electric motor.

Further, there is a probability wherein the differential action limiting device limits the operation of the continuously variable shifting portion as the electrically controlled continuously variable transmission to cause the continuously variable shifting portion to be placed in the non-continuously variable shifting state with no capability of performing the electrically controlled continuously variable shifting operation. During the shifting of the shifting portion in such an event, the electric motor control means varies the rotational speed of the transmitting member or the rotational speed of the engine using the first electric motor and/or the second electric motor.

This allows the rotational speed, uniquely determined with the vehicle speed and the speed ratio of the transmission, of the transmitting member or the rotational speed of the engine to achieve a given varying rate to provide a compromise between two shifting responses. One of the shifting responses includes a rapid shifting response wherein the varying rate of the rotational speed of the transmitting member and the varying rate of the rotational speed of the engine become large in value regarded to have a comfortable feeling. The other of the shifting responses includes a slow shifting response wherein the varying rate of the rotational speed of the transmitting member and the varying rate of the rotational speed of the engine become large in value regarded to have, for instance, an ease of suppressing shifting shocks. In other words, the rotational speed of the transmitting member or the rotational speed of the engine is caused to achieve a given varying state, for instance, a given varying rate to provide a compromise between the shortening of, for instance, a shifting time and the suppression of the shifting shocks. This suppresses the occurrence of the shifting shocks.

Preferably, as recited, in a control device for vehicular drive apparatus, the shifting portion executes the shifting upon disengaging an on-disengaging side engaging device or engaging an on-engaging side engaging device, and further comprising engaging pressure control means or a engaging pressure control portion, during the shifting of the shifting portion, for controlling the engaging pressure of the on-disengaging side engaging device and/or the engaging pressure of the on-engaging side engaging device, in conjunction with a variation in the rotational speed of the transmitting member or a rotational speed of the engine by the electric motor control means, for thereby varying the rotational speed of the transmitting member or the rotational speed of the engine.

With such a structure, the electric motor control means varies the rotational speed of the transmitting member or the rotational speed of engine using the first electric motor and/or the second electric motor. In addition, the engaging pressure of the on-disengaging side engaging device and/or the engaging pressure of the on-engaging side engaging device, associated with the shifting of the shifting portion, varies the rotational speed of the transmitting member or the rotational speed of the engine so as to provide the balance between the shortening of, for instance, the shifting time and the suppression of the shifting shocks, thereby achieving the further suppression of the shifting shocks.

Preferably, as recited, in a control device for vehicular drive apparatus, the electric motor control means allows the rotational speed of the transmitting member or the rotational speed of the engine to vary so as to achieve a given varying rate. With such a structure, the rotational speed of the transmitting member or the rotational speed of the engine is caused to achieve the given varying rate so as to provide the compromise between the shortening of, for instance, the shifting rime and the suppression of the shifting shocks, thereby enabling the suppression of the shifting shocks.

In the invention recited, a control device for vehicular drive apparatus, (a) the vehicular drive apparatus having (i) a continuously variable shifting portion including a differential mechanism enabled to distribute an output of an engine to a first electric motor and a transmitting member, and a second electric motor disposed in a power transmitting path between the power transmitting member and drive wheels, being operative to serve as an electrically controlled continuously variable transmission, and (ii) a shifting portion forming a part of the power transmitting path, the control device comprising: (b) a differential action limiting device disposed in the differential mechanism and operative to limit a differential action of the differential mechanism for thereby limiting an operation of the continuously variable shifting portion as the electrically controlled continuously variable transmission; and (c) electric motor control means or an electric motor control portion for altering a varying method of rotational speed of the transmitting member or an rotational speed of the engine using a first electric motor and/or a second electric motor during the shifting of the shifting portion, depending on whether or not the differential action limiting device limits the operation of the continuously variable shifting portion as the electrically controlled continuously variable transmission to place the continuously variable shifting portion in a non-continuously variable shifting state disenabling an electrically controlled continuously variable shifting operation.

With such a structure, the differential action limiting device does not limit the differential action of the differential mechanism to allow the differential mechanism to be placed in the differential state for the differential action to be activated. This allows the differential mechanism to be placed in the continuously variable shifting state enabling the electrically controlled continuously variable shifting operation to be performed. Alternately, with the differential action limiting device limiting the differential action of the differential mechanism, the operation of the electrically controlled continuously variable transmission is limited.

For instance, with the differential mechanism placed in the non-continuously variable shifting state, i.e., in a locked state, the differential mechanism is placed in the non-continuously variable shifting state, such as, for instance, a step-variable shifting state disenabling the electrically controlled continuously variable shifting operation. This results in a capability of obtaining a drive apparatus having doubled advantageous effects of a fuel saving effect of the transmission for the speed ratio to be electrically changed and a high transmitting efficiency of a gear reduction type transmitting device for a vehicle drive force to be mechanically transferred.

For instance, in a normal output region of the engine with a vehicle running at a low/intermediate speed and low/intermediate output, placing the continuously variable shifting portion in the continuously variable shifting state ensures a fuel saving performance of the vehicle. In addition, with the continuously variable shifting portion placed in the non-continuously variable shifting state during the running of the vehicle at the high speed, the output of the engine is transferred mainly through a mechanical power transmitting path to the drive wheels. This minimizes a loss in conversion between the vehicle drive force, occurring when the continuously variable shifting portion is caused to operate as a transmission for the speed ratio to be electrically changed, and electrical energy, resulting in improvement in fuel consumption.

Moreover, with the continuously variable shifting portion placed in the non-continuously variable shifting state during the running of the vehicle at the high output, the continuously variable shifting portion is actuated as the transmission to electrically change the speed ratio in a region under which the vehicle runs at the low/intermediate speed and low/intermediate output. This enables a reduction in a maximal value of electric energy, for the electric motor to generate, i.e., electric energy for the electric motor to transfer, resulting in a further minimization of the electric motor or the vehicle drive apparatus incorporating such an electric motor.

During the shifting of the shifting portion, the determination is made whether or not the differential action limiting device limits the operation of the continuously variable shifting portion as the electrically controlled transmission to place the continuously variable shifting portion in the non-continuously variable shifting state disenabling the electrically controlled continuously variable shifting operation.

As a result of such determination, the electric motor control means alters the varying method the rotational speed of the transmitting member or the rotational speed of the engine using the first electric motor and/or the second electric motor. The shifting portion takes two shifting states including: (1) the continuously variable shifting state in which the rotational speed of the engine is caused to vary due to the electrically controlled continuously variable shifting operation regardless of the rotational speed of the transmitting member uniquely determined with the vehicle speed and the speed ratio of the transmission during the shifting of the transmission; and (2) the non-continuously variable shifting state having a further increased inertia due to the variation in the rotational speed of engine during the shifting of the shifting portion than that appearing when placed in the continuously variable shifting state.

In both states, the shifting portion is shifted using the first electric motor and/or the second electric motor so that occurrence of the shifting shock is suppressed.

In the invention recited, a control device for vehicular drive apparatus, (a) the vehicular drive apparatus having (i) a continuously variable shifting portion including a differential mechanism enabled to distribute an output of an engine to a first electric motor and a transmitting member, and a second electric motor disposed in a power transmitting path between the power transmitting member and drive wheels, being operative to serve as an electrically controlled continuously variable transmission, and (ii) a shifting portion forming part of the power transmitting path, the control device comprising (b) electric motor control means or an electric motor control portion for altering a varying method of a rotational speed of the transmitting member or an rotational speed of the engine using a first electric motor and/or a second electric motor during a shifting of the shifting portion, depending on whether to execute a shifting for continuously varying a total speed ratio achieved with the continuously variable shifting portion and the shifting portion, or a shifting for non-continuously varying the total speed ratio.

The electric motor control means thus alters the varying method a rotational speed of engine. There are two shifting including: a first shifting in which during the shifting of the shifting portion, the total speed ratio is continuously varied enabling a suppression of the variation in rotational speed of the engine; and a second shifting in which during the shifting of the shifting portion, the total speed ratio is non-continuously varied with the variation in rotational speed of the engine. In this case, the shifting portion performs the shifting using the first electric motor and/or the second electric motor depending on either of such two shifting. That is, the shifting portion performs the shifting using the first electric motor and/or the second electric motor depending on the shifting for continuously varying the total speed ratio, wherein different inertia torques occur during the shifting of the shifting portion, and the shifting for non-continuously varying the total speed ratio. This suppresses the occurrence of the shifting shocks.

In the invention recited, a control device for vehicular drive apparatus, (a) the vehicular drive apparatus having (i) a differential portion including a differential mechanism enabled to distribute an output of an engine to a first electric motor, and a second electric motor disposed in a power transmitting path between the power transmitting member and drive wheels, and (ii) a shifting portion forming a part of the power transmitting path, the control device comprising (b) electric motor control means or an electric motor control portion for varying a rotational speed of the transmitting member using a first electric motor and/or a second electric motor during a shifting of the shifting portion.

With such a structure, during the shifting of the shifting portion, the electric motor control means varies the rotational speed of the transmitting member using the first electric motor and/or the second electric motor. This allows the rotational speed of the transmitting member, uniquely determined with the vehicle speed and the speed ratio of the shifting portion, to achieve a given varying rate to provide a balance between a rapid shifting response and a slow shifting response. In the rapid shifting response, the rotational speed of the transmitting member varies at an increased varying rate regarded to achieve, for instance, a comfortable feeling. In the low shifting response, the rotational speed of the transmitting member varies at a decreased varying rate regarded to have, for instance, an ease of suppressing shifting shocks.

In other words, the rotational speed of the transmitting member is caused to achieve a given varying state, for instance, a given varying rate to provide a compromise between the shortening of for instance a shifting time, and the suppression of the shifting shocks. Thus, the occurrence of the shifting shocks is suppressed.

In the invention recited, a control device for vehicular drive apparatus, (a) the vehicular drive apparatus having (i) a differential portion including a differential mechanism enabled to distribute an output of an engine to a first electric motor, and a second electric motor disposed in a power transmitting path between the power transmitting member and drive wheels, and (ii) a shifting portion forming a part of the power transmitting path, the control device comprising: (b) a differential action limiting device disposed in the differential mechanism for limiting a differential action of the differential portion by limiting the differential action of the differential mechanism; and (c) electric motor control means or an electric motor control portion for varying a rotational speed of the transmitting member or a rotational speed of the engine using a first electric motor and/or a second electric motor during a shifting of the shifting portion, when the differential action limiting device limits a differential action of the differential portion to cause the differential portion to be placed in a non-differential state in which no differential action is executed.

With such a structure, the differential action limiting device does not limit the differential action of the differential mechanism to allow the differential mechanism to be placed in the differential state for the differential action to be activated. Alternately, with the differential action limiting device limiting the differential action of the differential mechanism, the operation of the electrically controlled continuously variable transmission is limited. For instance, with the differential mechanism placed in the non-continuously variable shifting state for example in a locked state, the differential mechanism is placed in the non-continuously variable shifting state, such as, for instance, a step variable shifting state disenabling the electrically controlled continuously variable shifting operation. This results in a capability of obtaining a drive apparatus having doubled advantageous effects of a fuel saving effect of the transmission for the speed ratio to be electrically changed and a high transmitting efficiency of a gear reduction type transmitting device for a vehicle drive force to be mechanically transferred.

For instance, during the normal output region of the engine under which the vehicle runs at the low/medium speed and low/medium output, if the differential portion is placed in the differential state, the vehicle is ensured to have improved fuel saving performance. During the vehicle running at the high speed, further, the differential portion is placed in the non-differential state. In this case, the output of the engine is transferred to the drive wheels mainly through a mechanical power transmitting path such that the shifting portion is rendered operative to electrically change the gear ratio. This suppresses a loss in conversion efficiency between drive power and electric energy occurring during such an operation, resulting in improved fuel consumption.

In addition, with the differential portion placed in the non-differential state during the running of the vehicle at the high speed, the shifting portion is rendered operative as the shifting portion to electrically change the gear ratio in regions where the vehicle runs at the low/medium speed and low/intermediate output. This enables a reduction in a maximal value of electric energy to be generated by the electric motor, i.e., a maximal value of electric energy to be transferred through the electric motor. This results in a further miniaturization of the electric motor or the vehicle drive apparatus including such an electric motor.

Further, there is a probability wherein the differential action limiting device limits the operation of the differential portion to place the differential portion in the non-differential state with no capability of performing the differential action. During the shifting of the shifting portion in such an event, the electric motor control means varies the rotational speed of the transmitting member or the rotational speed of the engine using the first electric motor and/or the second electric motor.

This allows the rotational speed of the transmitting member and the rotational speed of the engine, uniquely determined with the vehicle speed or the speed ratio of the shifting portion, to achieve a given varying rate to provide a balance between a rapid shifting response and a slow shifting response. In the rapid shifting response, the rotational speed of the transmitting member or the rotational speed of the engine varies at an increased varying rate regarded to achieve, for instance, a comfortable feeling. In the low shifting response, the rotational speed of the transmitting member or the rotational speed of the engine varies at a decreased varying rate regarded to have, for instance, an ease of suppressing shifting shocks.

In other words, the rotational speed of the transmitting member or the rotational speed of the engine is caused to achieve a given varying state, for instance, a given varying rate to provide a compromise between the shortening of for instance a shifting time, and the suppression of the shifting shocks. Thus, the occurrence of the shifting shocks is suppressed.

In the invention recited, a control device for vehicular drive apparatus, (a) the vehicular drive apparatus having (i) a differential portion including a differential mechanism enabled to distribute an output of an engine to a first electric motor, and a second electric motor disposed in a power transmitting path between the power transmitting member and drive wheels, and (ii) a shifting portion forming a part of the power transmitting path, the control device comprising: (b) a differential action limiting device disposed in the differential mechanism for limiting a differential action of the differential portion by limiting the differential action of the differential mechanism; and (c) electric motor control means or an electric motor control portion for altering a varying method of a rotational speed of the transmitting member or an rotational speed of the engine using a first electric motor and/or a second electric motor during a shifting of the shifting portion, based on whether or not the differential action limiting device limits a differential action of the differential portion to cause the differential portion to be placed in a non-differential state in which no differential action is executed.

With such a structure, the differential action limiting device does not limit the differential action of the differential mechanism to allow the differential mechanism to be placed in the differential state for the differential action to be activated. This allows the differential mechanism to be placed in the differential state enabling the differential action to be performed. Alternately, with the differential action limiting device limiting the differential action of the differential mechanism, the operation of the electrically controlled continuously variable transmission is limited.

For instance, with the differential mechanism placed in the non-differential state, i.e., in a locked state, the differential portion is placed in the non-differential state, such as, for instance, a step variable shifting state disenabling the differential shifting operation. This results in a capability of obtaining a drive apparatus shifting portion having doubled advantageous effects of a fuel saving effect of the shifting portion for the speed ratio to be electrically changed and a high transmitting efficiency of a gear reduction type transmitting device for a vehicle drive force to be mechanically transferred.

For instance, during the normal output region of the engine under which the vehicle runs at the low/medium speed and low/medium output, if the differential portion is placed in the differential state, the vehicle is ensured to have improved fuel saving performance. During the vehicle running at the high speed, further, the different portion is placed in the non-different state. In this case, the output of the engine is transferred to the drive wheels mainly through a mechanical power transmitting path such that the shifting portion is rendered operative to electrically change the gear ratio. This suppresses a loss in conversion efficiency between drive power and electric energy occurring during such an operation, resulting in improved fuel consumption.

In addition, with the different portion placed in the non-different state during the running of the vehicle at the high speed, the shifting portion is rendered operative as the shifting portion to electrically change the gear ratio in regions where the vehicle runs at the low/medium speed and low/intermediate output. This enables a reduction in a maximal value of electric energy to be generated by the electric motor, i.e., a maximal value of electric energy to be transferred through the electric motor. This results in a further miniaturization of the electric motor or the vehicle drive apparatus including such an electric motor.

During the shifting of the shifting portion, the electric motor control means alters the varying method of the rotational speed of the transmitting member or the rotational speed of the engine using the first electric motor and/or the second electric motor. The alteration depends on whether or not the differential action limiting device limits the differential action of the differential portion to cause the differential portion to be placed in the non-differential state in which no differential action is executed. The differential portion takes differential states including: (1) a differential state in which the rotational speed of the engine is caused to vary due to the electrically controlled continuously variable shifting operation regardless of the rotational speed of the transmitting member, uniquely determined with the vehicle speed and the speed ratio of the shifting portion, during the shifting of the shifting portion; and (2) a non-differential state causing a further increased inertia due to the variation in the rotational speed of engine during the shifting of the shifting portion than that appearing when placed in the differential state. Thus, the shifting portion performs the shifting using the first electric motor and/or the second electric motor in either one of these two modes.

In the invention recited, a control device for vehicular drive apparatus, (a) the vehicular drive apparatus having (i) a differential portion including a differential mechanism enabled to distribute an output of an engine to a first electric motor, and a second electric motor disposed in a power transmitting path between the power transmitting member and drive wheels, and (ii) a shifting portion forming a part of the power transmitting path, the control device comprising (b) electric motor control means or an electric motor control portion for altering a varying method of a rotational speed of the transmitting member or an rotational speed of the engine using a first electric motor and/or a second electric motor during a shifting of the shifting portion, based on whether the shifting of the shifting portion is for continuously varying a total speed ratio achieved with the differential portion and the shifting portion, or the shifting is for discontinuously varying the total speed ratio.

The electric motor control means thus alters the varying method of the rotational speeds. There are shifting in two modes including: a first shifting in which the total speed ratio is continuously varied enabling the suppression of the variation in rotational speed of the engine during the shifting of the shifting portion; and a second shifting in which the total speed ratio is non-continuously varied with the variation in rotational speed of the engine during the shifting of the shifting portion. Thus, the shifting portion performs the shifting using the first electric motor and/or the second electric motor in either one of these two modes. That is, the shifting portion performs the shifting using the first electric motor and/or the second electric motor depending on the shifting for the total speed ratio to be continuously varied in different magnitudes of inertia torque occurring during the shifting of the shifting portion and the shifting for the total speed ratio to be non-continuously varied, thereby suppressing the shifting shocks.

Preferably, the differential state switching device causes the differential mechanism to be placed in the differential state enabling the differential action to be performed, causing the continuously variable shifting portion to be placed in the continuously variable shifting state, enabling the electrically controlled continuously variable shifting operation. In contrast, the differential mechanism is placed in the non-differential state i.e., the locked state disabling the differential action, causing the continuously variable shifting portion to be placed in the non-continuously shifting state, for example in the step variable shifting state. Thus, the continuously variable shifting portion can be placed in either the continuously variable shifting state or the non-continuously variable shifting state.

Preferably, the differential portion is placed in the differential state with the differential mechanism being placed by the differential state switch means in the differential state to perform the differential action. The differential portion is placed in the non-differential state with the differential mechanism being placed in the non-differential state, for example, a locked state. Thus, the differential portion is switched between the differential state and the non-differential state.

Preferably, the shifting portion is a step variable automatic transmission. With the step variable automatic transmission, during the shifting of the shifting portion, the total gear ratio constructed by the gear ratio of the continuously variable shifting portion and the gear ratio of the shifting portion stepwise varies quicker than the case when the total gear ratio varies continuously. Accordingly, the entire drive apparatus is caused to function as the continuously variable transmission to vary the drive torque smoothly, and it is caused to function to vary the gear ration stepwise for obtaining the drive torque rapidly. Also, in the continuously variable shifting state of the continuously variable shifting portion, the continuously variable shifting portion and the shifting portion construct the continuously variable transmission, while in the non-continuously variable shifting state of the same, the continuously variable shifting portion and the shifting portion construct the step variable transmission.

Preferably, the differential mechanism includes a first element connected to the engine, a second element connected to the first electric motor, and a third element connected to the transmitting member. The differential state switching means or the differential limit device operates in one mode to allow the first to third elements to rotate relative to each other for the differential mechanism to be placed in the differential state, for example rotating at least the second and third elements in the different speed. The differential state switching means or the differential limit device operates in the other mode to allow at least the second and third element to rotate not in the different speed, for example to allow the first to third elements to rotate in a unitary fashion or to cause the second element to be brought into a non-rotating state for the differential mechanism to be placed in the non-differential state i.e., the locked state. Such arrangement provides a structure for the differential mechanism to be placed in either the differential state or the non-differential state.

Preferably, disengaging of both the clutch and the brake allows the first to third rotary elements of the differential mechanism to rotate relative to each other, which causes the differential mechanism to be placed in the differential state and act as an electrically controlled differential device. Engaging the clutch allows the differential mechanism to act as the transmission providing the gear ratio of "1". Alternatively, engaging the brake allows the differential mechanism to act as the speed-increasing transmission providing the gear ratio less than "1". This allows the differential mechanism to have a structure to be placed in either the differential state or the no-differential state while having the structure of the transmission that has a fixed gear ratio in a single gear position or a multiple-gear position.

Preferably, the differential mechanism is comprised of a planetary gear device. The first element acts as a carrier, the second element acts as a sun gear, and the third element acts as a ring gear, respectively of the planetary gear device. This allows the differential mechanism to have a minimized axial dimension. In addition, the differential mechanism can be formed in a simplified structure with use of the single planetary gear device.

Preferably, the planetary gear device is one of the single-pinion type. With such a structure, the differential mechanism is short in the axial length and can be simply constructed by the single-pinion type planetary gear device.

More preferably, the total speed ratio of the vehicle drive apparatus is established with the speed ratio of the continuously variable shifting portion and the speed ratio of the shifting portion. With such a structure, using the speed ratio of the shifting portion results in capability of obtaining a vehicle drive force in a wide range. Alternately, with a reduction gear transmission rendered operative with the power transmission having a speed ratio greater than "1", the second electric motor suffices to generate lower output torque than that of the output shaft of the shift portion. This enables the minimization of the second electric motor. In addition, with the continuously variable shifting portion placed in the continuously variable shifting state, the continuously variable shifting portion and the shifting portion constitute the continuously variable transmission and with the non-continuously variable shifting portion placed in the non-continuously variable shifting state, the continuously variable shifting portion and the shifting portion constitute the step-variable transmission.

More preferably, the total speed ratio of the vehicle drive apparatus is established with the speed ratio of the differential portion and the speed ratio of the shifting portion. With such a structure, using the speed ratio of the shifting portion results in capability of obtaining a vehicle drive force in a wide range. Alternately, with a reduction gear transmission rendered operative with the power transmission having a speed ratio greater than "1", the second electric motor suffices to generate lower output torque than that of the output shaft of the shift portion. This enables the minimization of the second electric motor. In addition, with the differential portion placed in the differential state, the differential portion and the shifting portion constitute the continuously variable transmission and with the differential portion placed in the non-differential state, the differential portion and the shifting portion constitute the step-variable transmission.

More preferably, the vehicle drive apparatus further includes a differential action limiting device incorporated in the differential mechanism for limiting a differential action of the differential mechanism. This restricts the continuously variable shifting portion from acting as an electrically controlled continuously variable shifting portion. With such a structure, the differential action limiting device does not limit the differential action of the differential mechanism to allow the differential mechanism to be placed in the differential state available to perform the differential action. This enables the continuously variable shifting portion to act as the electrically controlled continuously variable shifting portion.

Alternately, the differential action limiting device is operative to limit the differential action of the differential mechanism for restricting the operation of the differential mechanism as the electrically controlled continuously variable shifting portion. Therefore, with the differential mechanism placed in the non-differential state, i.e., for instance, a locked state with no differential action being enabled, the differential mechanism can be placed in the non-continuously variable shifting state, i.e., for instance, a step variable shifting state with no electrically controlled continuously variable shifting operation being enabled. Thus, the drive apparatus can be obtained with a balance between a fuel saving effect of the shifting portion in which the gear ratio is electrically changed, and a high conversion efficiency of the gear-type power transmitting device in which the drive power is mechanically transferred.

For example, with the continuously variable shifting portion placed in the continuously variable shifting state, during the running of the vehicle at low/medium speed running, and low/medium output running, the desirable fuel consumption of vehicle can be rendered. Moreover, with the continuously variable shifting portion placed in the non-continuously variable shifting state during the running of the vehicle at the high speed, the output of the engine is transferred to the drive wheels mainly through a mechanical power transmitting path.

This results in the suppression of a conversion loss between drive power and electric energy occurring when activated as the transmission with the speed ratio being electrically changed, enabling a reduction in fuel consumption. Moreover, with the continuously variable shifting portion placed in the non-continuously variable shifting state during the running of the vehicle at the high output of the engine, the continuously variable shifting portion is activated as the transmission for the speed ration to be electrically changed in a region where the vehicle runs at the low/intermediate speed and at the low/intermediate output of the engine. This minimizes a maximal value of electric energy to be generated by the electric motor, i.e., electric energy to be transferred by the electric motor, enabling a further miniaturization of the electric motor and the vehicle drive apparatus employing such an electric motor.

More preferably, the vehicle drive apparatus further includes a differential action limiting device incorporated in the differential mechanism for restricting a differential action of the differential mechanism for thereby limiting the differential action of the differential portion. With such a structure, the differential portion, incorporated in the vehicle drive apparatus, is placed in the differential state to be operative to perform the differential action such that no differential action of the differential mechanism is limited by the differential action limiting device and the differential mechanism is placed in the differential state for the differential action to be enabled.

Alternately, the differential action limiting device restricts the differential action of the differential mechanism for limiting the differential action. This causes the differential mechanism to be placed in a non-differential state, for instance, a locked state with no differential action being enabled. Thus, the differential mechanism can be placed in the non-differential state, for instance, the locked state in which no differential action is initiated. Thus, a drive apparatus can be obtained with combined benefits between a fuel saving effect of the shifting portion in which the gear ratio is electrically changed and a high conversion efficiency of the gear-type power transmitting device in which the drive power is mechanically transferred.

For instance, during the normal output region of the engine where the vehicle runs at the low/medium speed and low/medium output, if the differential portion is placed in the differential state, the vehicle is ensured to have improved fuel saving performance. During the vehicle running at the high speed, further, if the differential portion is placed in the non-differential state, the output of the engine is transferred to the drive wheels mainly through the mechanical power transmitting path such that the shifting portion is rendered operative to electrically change the gear ratio. This suppresses a loss in conversion efficiency between drive power and electric energy occurring during such an operation, resulting in improved fuel consumption.

In addition, during the running of the vehicle at the high output region of the engine, as the differential portion is placed in the non-differential state, it is rendered operative as the transmission to electrically change the gear ratio in regions where the vehicle runs at the low/medium speed and low/intermediate output. This results in a reduction in a maximal value of electric energy to be generated by the electric motor, i.e., a maximal value of electric energy to be transmitted through the electric motor. This results in a further miniaturization of the electric motor or the vehicle drive apparatus including such an electric motor.

More preferably, the drive apparatus establishes the total gear ratio based on the gear ratio of the continuously variable shifting portion and the gear ratio of the shifting portion. With such an operation, the use of the gear ratio of the shifting portion results in capability of obtaining the drive power in a wide range. Alternately, with the shifting portion including a reduction speed transmission with a gear ratio greater than "1", the second electric motor may suffice to provide a low output torque with respect to that of the output shaft of the shifting portion. This enables the second electric motor to be miniaturized. Moreover, the continuously variable shifting portion and the shifting portion constitute the continuously variable transmission with the continuously variable shifting portion placed in the differential state, and the continuously variable shifting portion and the shifting portion constitute the step variable transmission with the continuously variable shifting portion placed in the non-differential state.

More preferably, the drive apparatus establishes the total gear ratio based on the gear ratio of the differential portion and the gear ratio of the shifting portion. With such an operation, the use of the gear ratio of the shifting portion results in capability of obtaining the drive power in a wide range. Alternately, with the shifting portion including a reduction speed transmission with a gear ratio greater than "1", the second electric motor may suffice to provide a low output torque with respect to that of the output shaft of the shifting portion. This enables the second electric motor to be miniaturized. Moreover, the differential portion and the shifting portion constitute the continuously variable transmission with the differential portion placed in the differential state, and the differential portion and the shifting portion constitute the step variable transmission with the differential portion placed in the non-differential state.

BRIEF DESCRIPTION OF THE DRAWINGS

FIG. 11 shows one example of hydraulic pressure learned value maps for selecting an engaging pressure of an engaging device for use in a shifting of an automatic shifting portion.

EXPLANATION OF REFERENCES

8: engine
10, 70: shifting mechanism (drive apparatus)
11: differential portion (continuously variable shifting portion)
16: power distributing mechanism (differential mechanism)
18: transmitting member
20,72: automatic shifting portion (shifting portion)
38: drive wheel
40: electronic control device (control device)
52: hybrid control means (electric motor control means, rotation control means)
84, 184: engaging pressure control means
M1: first electric motor
M2: second electric motor
C0: switching clutch (differential state switch device, differential action limiting device)
B0: switching brake (differential state switch device, differential action limiting device)

BEST MODE FOR CARRYING OUT THE INVENTION

Hereinafter, embodiments of the present invention will be explained with reference to attaching drawings.

Embodiment 1

Figures 1, 2:
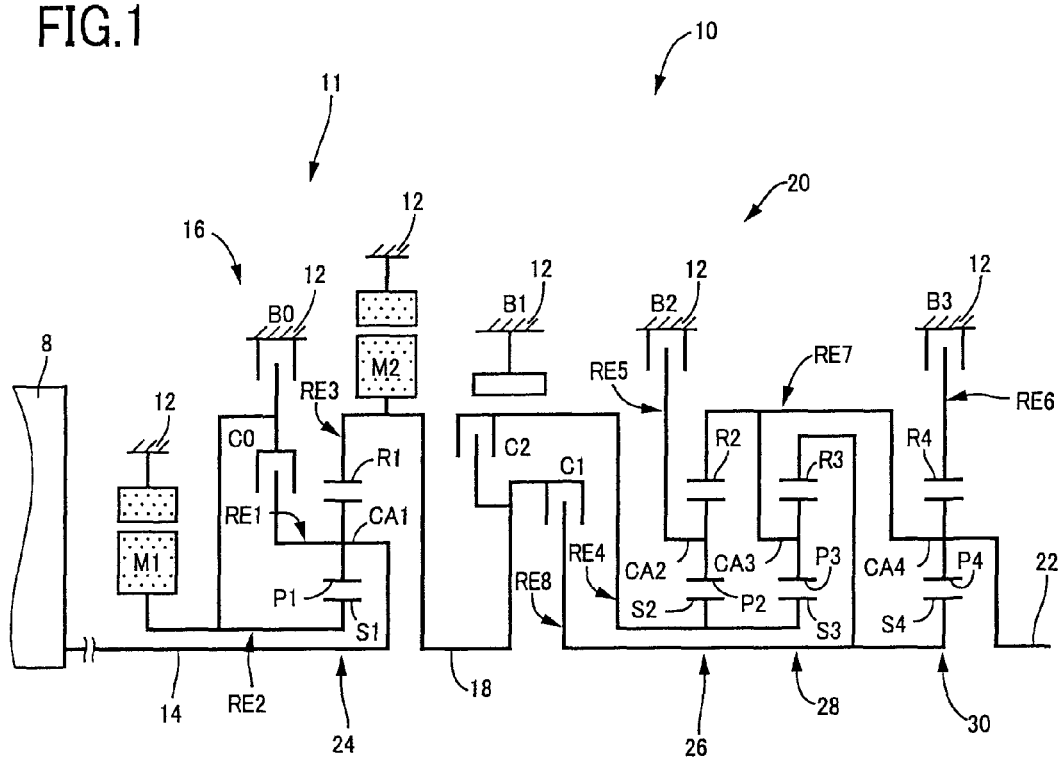
FIG. 1 is a skeleton view explaining a structure of a drive apparatus for hybrid vehicle of one embodiment according to the present invention.
FIG. 2 is an operation Table indicating a relation between a shifting operation of the drive apparatus of the hybrid vehicle of the embodiment shown in FIG. 1 operable in a continuously variable shifting state or a step variable shifting state, and operation combinations of hydraulic-type friction engaging devices used therefor.

FIG. 1 is a skeleton view explaining a shifting mechanism i.e., transmission mechanism 10 constructing a part of a drive apparatus of a hybrid vehicle according to one embodiment of the present invention. The transmission mechanism i.e., shifting mechanism 10 includes an input shaft 14, a differential portion 11, an automatic shifting portion 20, and an output shaft 22 all coaxially disposed in a transmission case 12 (hereinafter briefly referred to as "case 12") as a non-rotatable member fixed to a vehicle body. The input shaft 14 as an input rotation member is fixed to the case 12. The differential portion 11 functioning as the continuously variable shifting portion is connected to the input shaft 14 directly or indirectly via a pulsation absorbing damper (vibration damping device) not shown. The automatic shifting portion 20 i.e., the automatic shifting portion functioning as a step variable type transmission is disposed between the differential mechanism 11 and the output shaft 22 to be connected thereto in series. The output shaft 22 as an output rotation member is connected to the automatic shifting portion 20.

This shifting mechanism 10 of this embodiment is suitably used for a transverse FR vehicle (front-engine, rear-drive vehicle), and is disposed between a drive power source in the form of an engine 8 such as a gasoline engine or a diesel engine, and a pair of drive wheels 38 (FIG. 5), to transmit a vehicle drive force to the pair of drive wheels 38 through a differential gear device 36 (final speed reduction gear) and a pair of drive axles both constructing a part of the power transmitting path from the engine 8 to the paired drive wheels 38.

In the shifting mechanism 10 of this embodiment, the engine 8 and the differential portion 11 is directly connected. Here, the direct connection includes, in addition to a connection without using any fluid-type transmitting device such as a torque converter or fluid engaging, a connection with using vibration damping device. Noted that a lower half of the shifting mechanism 10 constructed symmetrically with respect to its axis, is omitted in FIG. 1. This is true for other embodiments to be explained hereinafter.

The differential portion 11 includes a first electric motor M1, a power distributing mechanism 16 and a second electric motor M2. The power distributing mechanism 16 is a mechanism distributing an output of the engine 8 inputted to the input shaft 14 to the first electric motor M1 and the transmitting member 18, as the differential mechanism. The second electric motor M2 is rotatable integral with the transmitting member 18. The second electric motor M2 may be disposed at any portion of a power transmitting path extending between the transmitting member 18 and the drive wheel 38. In the present embodiment, each of the first electric motor M1 and the second electric motor M2 is a so-called motor/generator also functioning as an electric generator. The first electric motor M1 should function at least as an electric generator to generate an electric energy with generating a reaction force, and the second electric motor M2 should function at least as an electric motor to generate a drive force of the vehicle.

The power distributing mechanism 16 includes a first planetary gear unit 24 functioning as a differential device, a switching clutch C0 and a switching brake B0. The first planetary gear unit 24 of single pinion type has a gear ratio $\rho 1$ of about 0.418, for example. It has, as rotary elements, a first sun gear S1, a first planetary gear P1, a first carrier CA1 supporting the first planetary gear P1 to be rotatable about its axis and about the axis of the first sun gear S1, and a first ring gear R1 meshing with the first sun gear S1 through the first planetary gear P1. Representing the numbers of teeth of the first sun gear S1 and the first ring gear R1 by ZS1 and ZR1, respectively, the above gear ratio $\rho 1$ is represented by ZS1/ZR1.

In the power distributing mechanism 16, the first carrier CA1 is connected to the drive apparatus input shaft 14, i.e., to the engine 8, the first sun gear S1 is connected to the first electric motor M1, and the first ring gear R1 is connected to the transmitting member 18. The switching brake B0 is disposed between the first sun gear S1 and the casing 12, and the switching clutch C0 is disposed between the first sun gear S1 and the first carrier CA1. Upon release of both the switching clutch C0 and switching brake B0, the power distributing mechanism 16 is placed in the differential state where the first sun gear S1, first carrier CA1 and first ring gear R1 of the first planetary gear unit 24 are placed in a differential state to be rotatable relative to each other to perform a differential function.

Thus, the output of the engine 8 is distributed to the first electric motor M1 and the transmitting member 18, and a part of the output distributed to the first electric motor M1 is used to generate and store power thereat or to drive the second electric motor M2.

Accordingly, the differential portion 11 (power distributing mechanism 16) functions as the electrically controlled differential device, for example, in the continuously variable shifting state (electrically controlled CVT state), in which the rotating speed of the transmitting member 18 changes continuously, irrespective of the rotating speed of the engine 8. That is, the differential portion 11 placed in the continuously variable shifting state by the differential state of the power distributing mechanism 16 functions as the electrically controlled continuously variable transmission in which speed ratio $\gamma 0$ (rotating speed of the driving device input shaft 14/rotating speed of the transmitting member 18) electrically changes from a minimum value γ0min to a maximum value γ0max.

In this state, by engagement of the switching clutch C0 or switching brake B0, the power distributing mechanism 16 is placed to the non-differential state not to perform, that is impossible to perform the differential operation. Specifically, when the first sun gear S1 and the first carrier CA1 are engaged integrally by engagement of the switching clutch C0, the rotary elements of the first planetary gear unit 24 including the first sun gear S1, first carrier CA1 and first ring gear R1 are placed in a connected state, i.e., a locked state or a non-differential state to be rotatable as a unit. With this, also the differential portion 11 is placed to the non-differential state. Thus, the rotating speeds of the engine 8 and the power transmitting member 18 coincide with each other, so that the differential portion 11 (power distributing mechanism 16) is placed in a non-continuously variable shifting state for example a fixed shifting state, that is a step variable shifting state functioning as the transmission having a fixed speed ratio γ0 equal to 1.

Then, when the switching brake B0 is engaged instead of the switching clutch C0 to connect the first sun gear S1 with the case 12, the power distributing mechanism 16 is placed in a locked state, connected state or non-differential state impossible to perform the differential operation with the non-rotating state of the first sun gear S1. With this, also the differential portion 11 is placed in the non-differential state. Due to the higher rotating speed of the first ring gear R1 than that of the first carrier CA1, the power distributing mechanism 16 functions as a speed-increasing mechanism. The differential portion 11 (power distributing mechanism 16) is placed in non-continuously variable shifting state for example the fixed shifting state, i.e., the step variable shifting state functioning as the speed-increasing mechanism of which a speed ratio γ0 is fixed in a value smaller than 1, for example, about 0.7.

In the present embodiment, the switching clutch C0 and switching brake B0 selectively place the differential portion 11 (power distributing mechanism 16) to the differential state i.e., non-locked state (disengaged state), and in the non-differential state i.e., the locked state. In detail, in the differential state (engaged state), the differential portion 11 (power distributing mechanism 16) is operable as the electrically controlled differential device. For example, in the continuously variable shifting state, it is operable as the continuously variable transmission of which shifting ratio is continuously variable.

The switching clutch C0 and switching brake B0 also place the differential portion 11 (power distributing mechanism 16) in the shifting state not operable as the electrically controlled differential device. For example, in the locked state with the shifting ratio being locked in the fixed value, the differential portion 11 (power distributing mechanism 16) is not operable as the continuously variable transmission, with the continuously variable shifting operation being inoperative. In other words, in the locked state, the differential portion 11 (power distributing mechanism 16) operates as the single-stage or multi-stage transmission having one or not less than two shifting ratio(s), not operative as the continuously variable transmission, with the continuously variable shifting operation being inoperative. The locked state can otherwise be expressed as the fixed shifting state where the differential portion 11 (power distributing mechanism 16) operates as the single-stage or multi-stage transmission having one or not less than two shifting ratio(s). The non-engaging state includes, in addition to the state where the switching clutch C0 and the switching brake B0 are completely released, the state where the switching clutch C0 or the switching brake B0 is half engaged (slipped state).

From another point of view, with the power distributing mechanism 16 placed in the non-differential state to restrict the differential action thereof, the switching clutch C0 and the switching brake B0 function as the differential action limiting device operative to place the differential portion 11 in the non-continuously variable shifting state for limiting operation thereof as an electrically controlled differential device, i.e., an electrically controlled continuously variable shifting portion. Further, with the power distributing mechanism 16 in placed in the differential state not to limit the differential action thereof, the switching clutch C0 and the switching brake B0 do not limit the operation of the differential portion 11 as an electrically controlled differential device with the differential portion 11 placed in the continuously variable shifting state. That is, the switching clutch C0 and the switching brake B0 do not limit operation of the differential portion 11 as the electrically controlled continuously variable transmission.

The automatic shifting portion 20 includes plural planetary gear units, that is a single-pinion type second planetary gear unit 26, a single-pinion type third planetary gear unit 28 and a single-pinion type fourth planetary gear unit 30. The second planetary gear unit 26 includes a second sun gear S2, a second planetary gear P2, a second carrier CA2 supporting the second planetary gear P2 to be rotatable about its axis and about the axis of the second sun gear S2, and a second ring gear R2 meshing with the second sun gear S2 through the second planetary gear P2, having for example a gear ratio ρ2 of about 0.562.

The third planetary gear unit 28 includes a third sun gear S3, a third planetary gear P3, a third carrier CA3 supporting the third planetary gear P3 to be rotatable about its axis and about the axis of the third sun gear S3, and a third ring gear R3 meshing with the third sun gear S3 through the third planetary gear P3, having for example a gear ratio ρ3 of about 0.425. The fourth planetary gear unit 30 includes a fourth sun gear S4, a fourth planetary gear P4, a fourth carrier CA4 supporting the fourth planetary gear P4 to be rotatable about its axis and about the axis of the fourth sun gear S4, and the fourth ring gear R4 meshing with the fourth sun gear S4 through the fourth planetary gear P4, having a gear ratio ρ4 of about 0.421.

When representing the numbers of teeth of the second sun gear S2, second ring gear R2, third sun gear S3, third ring gear R3, fourth sun gear S4 and fourth ring gear R4 by ZS2, ZR2, ZS3, ZR3, ZS4 and ZR4 respectively, the above gear ratios ρ2, ρ3 and ρ4 are represented by ZS2/ZR2, ZS3/ZR3, and ZS4/ZR4, respectively.

In the automatic shifting portion 20, the second sun gear S2 and the third sun gear S3 integrally fixed to each other as a unit are selectively connected to the transmitting member 18 through a second clutch C2, and are selectively fixed to the casing 12 through a first brake B1. The second carrier CA2 is selectively connected to the casing 12 through the second brake B2, and the fourth ring gear R4 is selectively fixed to the transmission casing 12 through a third brake B3. The second ring gear R2, third carrier CA3 and fourth carrier CA4 integrally fixed to each other are fixed to the output shaft 22. The third ring gear R3 and the fourth sun gear S4 integrally fixed to each other are selectively connected to the transmitting member 18 through a first clutch C1.

Thus, the automatic shifting portion 20 and the transmitting member 18 are selectively connected to each other through the first clutch C1 or the second clutch C2 used for establishing the gear shift position in the automatic shifting portion 20. In other words, the first clutch C1 and the second clutch C2 function as the engaging device between the transmitting member 18 and the automatic shifting portion 20. That is, it selectively switches the power transmitting path between the differential portion 11 (transmitting member 18) and the drive wheel 38 in a power transmitting condition allowing the power transmission therethrough, and a power interrupting condition interrupting the power transmission therethrough. That is, engagement of at least one of the first clutch C1 and the second clutch C2 bring the power transmitting path into the power transmitting condition, while release of both the first clutch C1 and the second clutch C2 bring the power transmitting path into the power interrupting condition.

The switching clutch C0, the first clutch C1, the second clutch C2, the switching brake B0, the first brake B1, the second brake B2 and the third brake B3 are hydraulic-type frictionally engaging devices used in a conventional vehicular automatic transmission. The frictionally engaging device includes a wet-type multiple-disc clutch in which a plurality of friction plates superposed on each other are forced against each other by a hydraulic actuator, or a band brake in which a rotary drum and one band or two bands wound on an outer circumferential surface thereof is tightened at one end by a hydraulic actuator.

In particular, in this embodiment, by engagement of any of the switching clutch C0 and switching brake B0 provided in the power distributing mechanism 16, the differential portion 11 can construct, in addition to the continuously variable shifting state operable as the continuously variable transmission, the fixed shifting state operable as the transmission of the fixed shifting ratio. Accordingly, in the shifting mechanism 10, the differential portion 11 placed in the fixed shifting state by engagement of any of the switching clutch C0 and switching brake B0, and the automatic shifting portion 20 construct the step variable shifting state operable as the step variable transmission. The differential portion 11 placed in the continuously variable shifting state by non-engagement of both the switching clutch C0 and switching brake B0, and the automatic shifting portion 20 construct the continuously variable shifting state operable as the continuously variable transmission.

In other words, the shifting mechanism 10 is switched to the step variable shifting state by engagement of any of the switching clutch C0 and switching brake B0, and is switched to the continuously variable shifting state by non-engagement of both the switching clutch C0 and switching brake B0. The differential portion 11 is the transmission also switched to the step variable shifting state and the continuously variable shifting state.

More particularly, with the differential portion 11 placed in the non-continuously shifting state to cause the shifting mechanism 10 to function as the step variable transmission, either the switching clutch C0 or the switching brake B0 is engaged, with the first clutch C1, the second clutch C2, the first brake B1, the second brake B2 and the third brake B3 being selectively engaged, that is with disengagement and engagement of the engaging device relating to the shifting of the automatic shifting portion 20. This allows a hydraulically controlled friction engaging device associated with for instance the gear shifting to be disengaged (hereinafter referred to as "on-disengaging side engaging device"), and another hydraulically controlled friction engaging device associated with the gear shifting to be engaged (hereinafter referred to as "on-engaging side engaging device"), respectively. The on-disengaging side engaging device and the on-disengaging side engaging device engage such that any one of the 1st-speed gear position (1st-gear position) to the 5th-speed gear position (5th-gear position) or the reverse-gear position (reverse-drive position) or the neutral position is selectively established to automatically change the gear ratio.

Thus, a total gear ratio $\gamma T$ (=input shaft rotation speed $N_{IN}$/output shaft rotation speed $N_{OUT}$) of the shifting mechanism 10 can be obtained in a substantially equal ratio for each gear position. This represents the total gear ratio $\gamma T$ of the shifting mechanism 10 as a whole to be established based on the gear ratio $\gamma 0$ of the differential portion 11 and the gear ratio $\gamma$ of the automatic shifting portion 20.

For example, when the shifting mechanism 10 functions as the step variable transmission, for example, as shown in FIG. 2, engagement of the switching clutch C0, the first clutch C1 and the third brake B3 establish the first-gear position having the highest speed ratio $\gamma 1$ of about 3.357, for example, and engagement of the switching clutch C0, the first clutch C1 and the second brake B2 establish the second-gear position having the speed ratio $\gamma 2$ of about 2.180, for example, which is lower than the speed ratio $\gamma 1$. Further, engagement of the switching clutch C0, first clutch C1 and first brake B1 establish the third-gear position having the speed ratio $\gamma 3$ of about 1.424, for example, which is lower than the speed ratio $\gamma 2$, and engagement of the switching clutch C0, first clutch C1 and second clutch C2 establish the fourth-gear position having the speed ratio $\gamma 4$ of about 1.000, for example, which is lower than the speed ratio $\gamma 3$.

Engagement of the first clutch C1, second clutch C2 and switching brake B0 establish the fifth-gear position having the speed ratio $\gamma 5$ of about 0.705, for example, which is smaller than the speed ratio $\gamma 4$. Further, engagement of the second clutch C2 and the third brake B3 establish the reverse-gear position having the speed ratio $\gamma R$ of about 3.209, for example, which positions between the speed ratios $\gamma 1$ and $\gamma 2$. The neutral position N is established by engaging only the switching clutch C0.

With the differential portion 11 placed in the continuously variable shifting state to cause the shifting mechanism 10 to function as a continuously variable transmission, both the switching clutch C0 and the switching brake B0 are disengaged. Thus, the differential portion 11 is compelled to function as the continuously variable transmission and the automatic shifting portion 20 connected to the differential portion 11 in series, is compelled to function as the step variable transmission. For at least one speed gear position M of the automatic shifting portion 20, the rotation speed, input to the automatic shifting portion 20, i.e., the rotation speed of the transmitting member 18 are compelled to vary stepless in an infinitely ranging gear ratio for the relevant speed gear position M. Accordingly, the shifting mechanism 10 can have the total gear ratio $\gamma T$ that is infinitely variable.

However, when the shifting mechanism 10 functions as the continuously variable transmission, as shown in FIG. 2, the switching clutch C0 and the switching brake B0 are both released. With this, the differential portion 11 functions as the continuously variable transmission, and the automatic shifting portion 20 connected in series thereto functions as the step variable transmission. The rotating speed to be input to the automatic shifting portion 20 placed in one of the first-gear, second-gear, third-gear and fourth-gear positions. Accordingly, since the speed ratio of the automatic shifting portion 20 is continuously variable across the adjacent gear positions, a total speed ratio $\gamma T$ of the shifting mechanism 10 is continuously variable.

Figure 3:
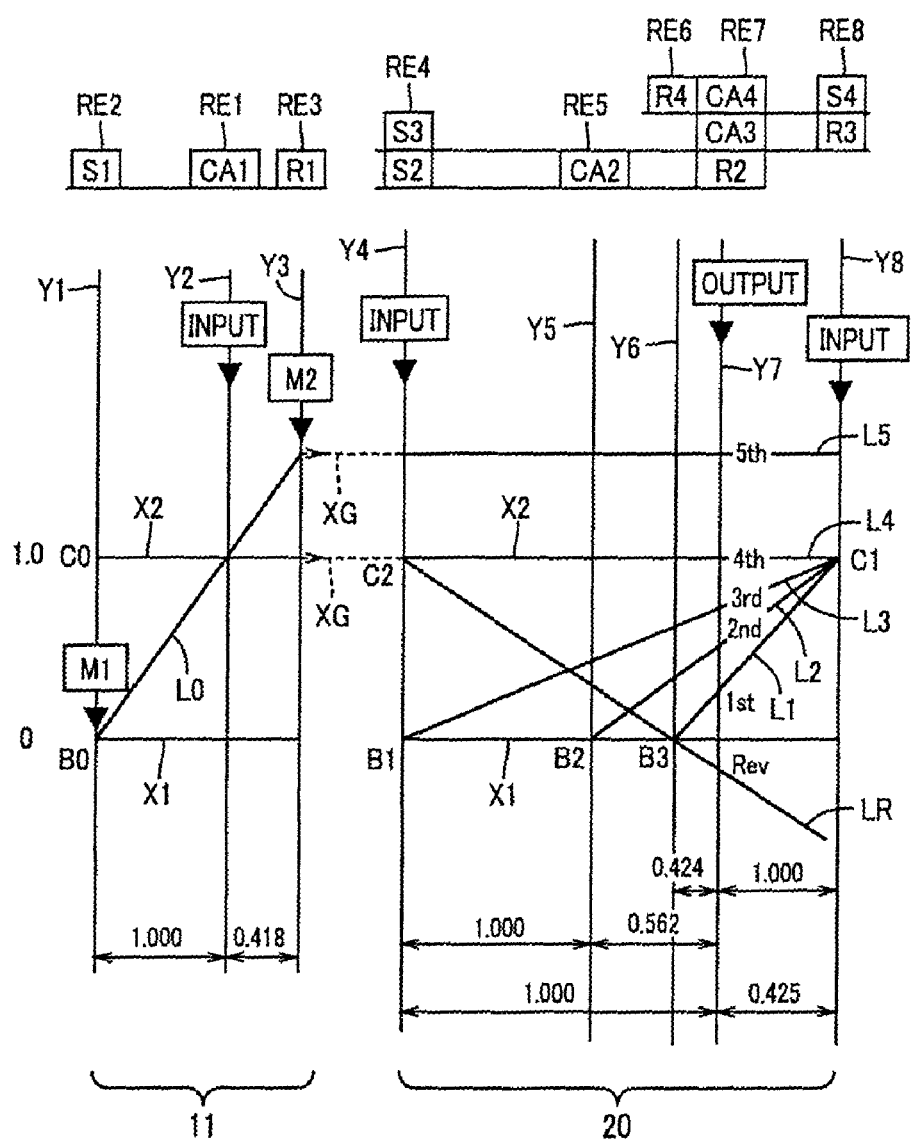
FIG. 3 is a collinear chart showing relative rotating speeds of rotary elements in each of different gear positions when the drive apparatus of the hybrid vehicle of the embodiment shown in FIG. 1 is operated in the step variable shifting state.

FIG. 3 shows a collinear chart representing by straight lines a relation among the rotating speeds of the rotary elements different in each of the gear positions of the shifting mechanism 10. The shifting mechanism 10 is constituted by the differential portion 11 functioning as the continuously variable shifting portion or first shifting portion, and the automatic shifting portion 20 functioning as the shift portion (step variable shifting portion) or second shifting portion. The collinear chart of FIG. 3 is a rectangular two-dimensional coordinate system in which the gear ratios ρ of the planetary gear units 24, 26, 28 and 30 are taken along the horizontal axis, while the relative rotating speeds of the rotary elements are taken along the vertical axis. A lower one X1 of three horizontal lines indicates the rotating speed of 0, and an upper one X2 indicates the rotating speed of 1.0, that is, an operating speed $N_E$ of the engine 8 connected to the input shaft 14. The horizontal line XG indicates the rotating speed of the transmitting member 18.

Among three vertical lines Y1, Y2 and Y3 corresponding to the three elements of the differential portion 11, respectively represent from the left the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined corresponding to the gear ratio ρ1 of the first planetary gear unit 24.

Further, five vertical lines Y4, Y5, Y6, Y7 and Y8 corresponding to the automatic shifting portion 20 respectively represent from the left the relative rotating speeds of a fourth rotary element (fourth element) RE4, a fifth rotary element (fifth element) RE5, a sixth rotary element (sixth element) RE6, a seventh rotary element (seventh element) RE7, and an eighth rotary element (eighth element) RE8. The fourth rotary element RE4 has a form of the second and third sun gears S2, S3 integrally fixed to each other, the fifth rotary element RE5 has a form of the second carrier CA2, and the sixth rotary element RE6 has a form of the fourth ring gear R4. The seventh rotary element RE7 has a form of the second ring gear R2 and third and fourth carriers CA3, CA4 integrally fixed to each other, and the eighth rotary element RE8 has a form of the third ring gear R3 and fourth sun gear S4 integrally fixed to each other. The distances between the adjacent ones of the vertical lines Y4 to Y8 are determined by the gear ratios ρ2, ρ3 and ρ4 of the second, third and fourth planetary gear units 26, 28 and 30.

In the relation between the vertical lines of the collinear chart, when the interval i.e., distance between the sun gear and the carrier is set as "1", the interval between the carrier and the ring gear is set as the interval corresponding to the gear ratio ρ of the planetary gear unit. That is, at the differential portion 11, the interval between the vertical lines Y1 and Y2 is set as the interval corresponding to "1", and the interval between the vertical lines Y2 and Y3 is set as the interval corresponding to "ρ". In the automatic shifting portion 20, for each of the second, third and fourth planetary gears 26, 28 and 30, the interval between the sun gear and carrier is set as "1", and the distances between the carrier and ring gear is set as the gear ratio ρ.

Expressing with the collinear chart of FIG. 3, the shifting mechanism 10 of this embodiment is, in the power distributing mechanism 16 (continuously variable shifting portion 11), arranged such that the first rotary element RE1 (the first carrier CA1), which is one of the three rotary elements of the first planetary gear unit 24, is fixed to the input shaft 14, and selectively connected to the second rotary element RE 2 (first sun gear S1) as another rotary element through the switching clutch C0. The second rotary element RE2 is fixed to the first electric motor M1 and selectively fixed to the casing 12 through the switching brake B0. The third rotary element RE3 (the first ring gear R1) as still another rotary element is fixed to the transmitting member 18 and the second electric motor M2. Thus, rotation of the input shaft 14 is transmitted (inputted) to the automatic shifting portion 20 through the transmitting member 18. An inclined straight line L0 which passes an intersection point between the lines Y2 and X2 represents a relation between the rotating speeds of the first sun gear S1 and the first ring gear R1.

For example, when the shifting mechanism 10 is switched to the continuously variable shifting state (differential state) by release of the switching clutch C0 and the switching brake B0, rotation of the sun gear S1 represented by the intersection point between the straight line L0 and the vertical line Y1 increases of decreases by control of the rotation speed of the first electric motor M1. In the differential state, for example, at lease the second rotary element RE2 and the third rotary element RE3 are rotated in the different rotation speed. When the rotation speed of the ring gear R1 determined depending on the vehicle speed V is substantially constant, the rotation speed of the first carrier CA1, that is the engine rotation speed $N_E$ represented by the intersection point between the straight line L0 and the vertical line Y2 increases or decreases.

When the first sun gear S1 and the first carrier CA1 are connected by engagement of the switching clutch C0, the power distributing mechanism 16 is brought into the non-differential state where the above three rotary elements RE1, RE2 and RE 3 are integrally rotated, that is at least the second rotary element RE2 and the third rotary element RE3 are not rotated in the same rotation speed. Thus, the straight line L0 coincides with the lateral line X2, so that the transmitting member 18 rotates in the same rotation speed as the engine rotation speed $N_E$.

Alternately, with connection of the first sun gear S1 with the casing 12 by engagement of the switching brake B0, the power distributing mechanism 16 is brought into the non-differential state, where the engine rotation speed $N_E$ is halted and at least the second rotary element RE2 and the third rotary element RE3 are not rotated in the same rotation speed, so that the differential portion 11 functions as the speed increasing mechanism. Thus, the rotation speed of the first ring gear R1, i.e., the transmitting member 18 is represented by the intersection point between the straight line L0 which is in the state shown in FIG. 3 and the vertical line Y3, being inputted to the automatic shifting portion 20 in the increased rotation speed compared with the engine rotation speed $N_E$.

In the automatic shifting portion 20, the fourth rotary element RE4 is selectively connected to the transmitting member 18 through the second clutch C2 and selectively fixed to the casing 12 through the first brake B1, the fifth rotary element RE5 is selectively fixed to the casing 12 through the second brake B2, and the sixth rotary element RE6 is selectively fixed to the casing 12 through the third brake B3. The seventh rotary element RE7 is fixed to the output shaft 22, and the eighth rotary element RE8 is selectively connected to the transmitting member 18 through the first clutch C1.

As shown in FIG. 3, in the automatic shifting portion 20, upon engagement of the first clutch C1 and the third brake B3, the rotating speed of the output shaft 22 in the first-speed position is represented by an intersection point between the inclined straight line L1 and the vertical line Y7. Here, the inclined straight line L1 passes an intersection point between the vertical line Y8 indicative of the rotating speed of the eighth rotary element RE8 and the horizontal line X2, and an intersection point between the vertical line Y6 indicative of the rotating speed of the sixth rotary element RE6 and the horizontal line X1.

Similarly, the rotating speed of the output shaft 22 in the second-speed position is represented by an intersection point between an inclined straight line L2 determined by engagement of the first clutch C1 and second brake B2, and the vertical line Y7 indicative of the rotating speed of the seventh rotary element RE7 fixed to the output shaft 22. The rotating speed of the output shaft 22 in the third-speed position is represented by an intersection point between an inclined straight line L3 determined by engagement of the first clutch C1 and first brake B1, and the vertical line Y7 indicative of the rotating speed of the seventh rotary element RE7 fixed to the output shaft 22. The rotating speed of the output shaft 22 in the fourth-speed position is represented by an intersection point between a horizontal line L4 determined by engagement of the first clutch C1 and second clutch C2, and the vertical line Y7 indicative of the rotating speed of the seventh rotary element RE7 fixed to the output shaft 22.

In the first-speed through fourth-speed positions, as result of engagement of the switching clutch C0, power from the differential portion 11 i.e., the power distributing mechanism 16 is input to the eighth rotary element RE8 with the rotating speed the same as that of the engine rotation speed $N_E$. However, when the switching clutch B0 engages instead of the switching clutch C0, since power from the differential portion 11 is input to the eighth rotary element RE8 with a speed higher than the engine rotation speed $N_E$, the rotating speed of the output shaft 22 in the fifth-speed position is represented by an intersection point between a horizontal line L5 and the vertical line Y7. Here, the horizontal line L5 is determined by engagement of the first clutch C1, second clutch C2 and switching brake B0, and the vertical line Y7 indicates the rotating speed of the seventh rotary element RE7 fixed to the output shaft 22.

Figure 4:
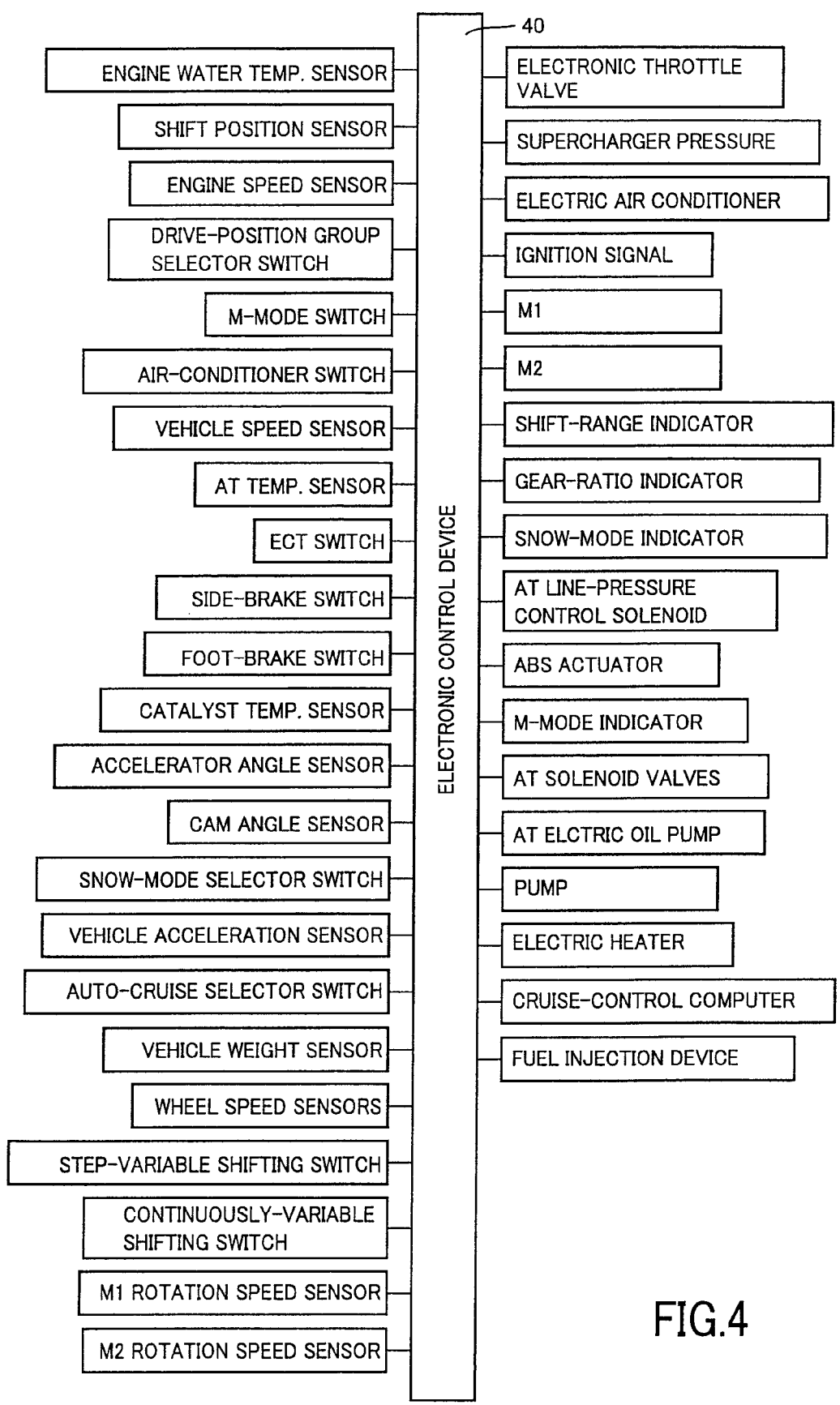
FIG. 4 is a view explaining input and output signals of an electronic control apparatus provided in the drive apparatus of the embodiment shown in FIG. 1.

FIG. 4 illustrates signals input to an electronic control device 40 and signals output therefrom to control the shifting mechanism 10. This electronic control device 40 includes a so-called microcomputer incorporating a CPU, a ROM, a RAM and an input/output interface. By performing signal processing according to programs stored in the ROM utilizing a temporary data storage function of the ROM, it implements hybrid drive controls of the engine 8 and electric motors M1 and M2, and drive controls such as shifting controls of the automatic shifting portion 20.

To the electronic control device 40, from various sensors and switches shown in FIG. 4, various signals are inputted, which include a signal indicative of a temperature $TEMP_W$ of cooling water of the engine, a signal indicative of a selected operating position $P_{SH}$, a signal indicative of the operating speed $N_E$ of the engine 8, a signal indicative of a set value of gear ratio row, a signal indicative of a command for M mode (motor drive mode), a signal indicative of an operated state of an air conditioner, a signal indicative of a vehicle speed V corresponding to the rotating speed $N_{OUT}$ of the output shaft 22, a signal indicative of a working oil temperature of the automatic shifting portion 20, a signal indicative of an operated state of a side brake, a signal indicative of an operated state of a foot brake, a signal indicative of a catalyst temperature, a signal indicative of an opened amount $A_{CC}$ of an accelerator pedal, a signal indicative of a cam angle, a signal indicative of a snow drive mode, a signal indicative of a longitudinal acceleration value G of the vehicle, and a signal indicative of an auto-cruising drive mode.

Also inputted are a signal indicative of a vehicle weight, a signal indicative of wheel speed of each drive wheel, a signal indicative of operation of a step variable switch for changing the differential portion 11 (power distributing mechanism 16) to the step variable shifting state (locked state) so that the shifting mechanism 10 functions as the step variable transmission, a signal indicative of operation of a continuously variable switch for changing the differential portion 11 (power distributing mechanism 16) to the continuously variable shifting state (differential state) so that the shifting mechanism 10 functions as the continuously variable transmission, a signal indicative of the rotating speed $N_{M1}$ of the first electric motor M1, a signal indicative of the rotating speed $N_{M2}$ of the second electric motor M2, and a charge capacity (charge state) of the electric storage device 60.

From the electronic control device 40, various control signals are outputted, which controls the engine output, which includes a signal to drive a throttle actuator for controlling an opening degree $\theta_{TH}$ of a throttle valve 94 of the engine 8, a signal to control fuel supply amount to each cylinder of the engine 8 by a fuel injection device 96, a signal to command an ignition timing in the engine 8 by an ignition device 98, a signal to adjust a supercharger pressure, a signal to operate the electric air conditioner, signals to operate the electric motors M1 and M2, a signal to operate a shift-range indicator for indicating the selected operating position of the shift lever, a signal to operate a gear-ratio indicator for indicating the gear ratio, a signal to operate a snow-mode indicator for indicating the selection of the snow drive mode, a signal to operate an ABS actuator for anti-lock braking of the wheels, and a signal to operate an M-mode indicator for indicating the selection of the M-mode.

Also outputted are signals to operate solenoid-operated valves incorporated in a hydraulic control unit 42 (refer to FIG. 6) provided to control the hydraulic actuators of the hydraulically operated frictional engaging devices of the differential portion 11 and the automatic shifting portion 20, a signal to operate an electric oil pump used as a hydraulic pressure source for the hydraulic control unit 42, a signal to drive an electric heater, a signal to be applied to a cruise-control computer, and a signal indicative of an fuel injection device.

Figure 5:
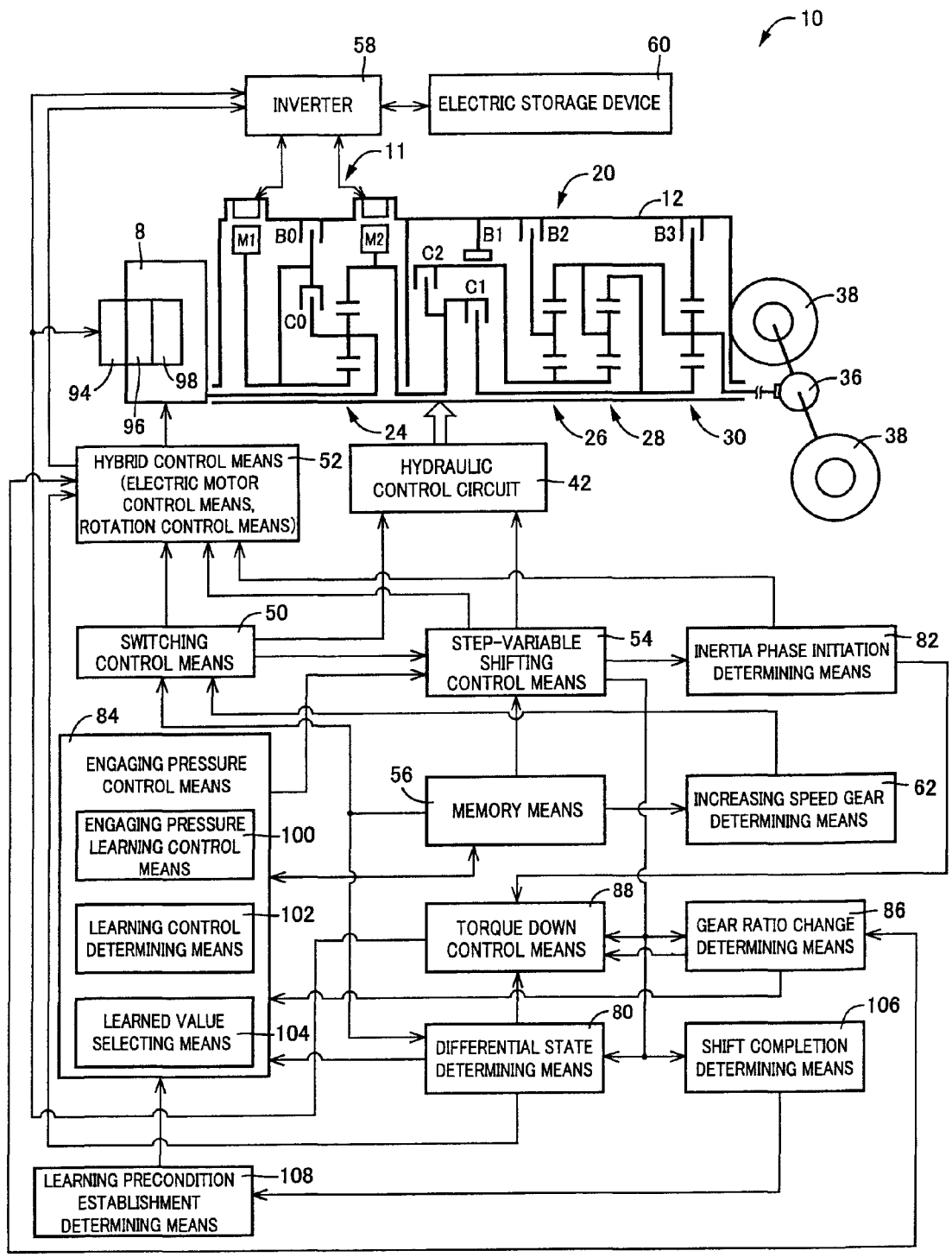
FIG. 5 is a functional block diagram explaining an essence of control operation to be executed by the electronic control apparatus shown in FIG. 4.
Figure 6:
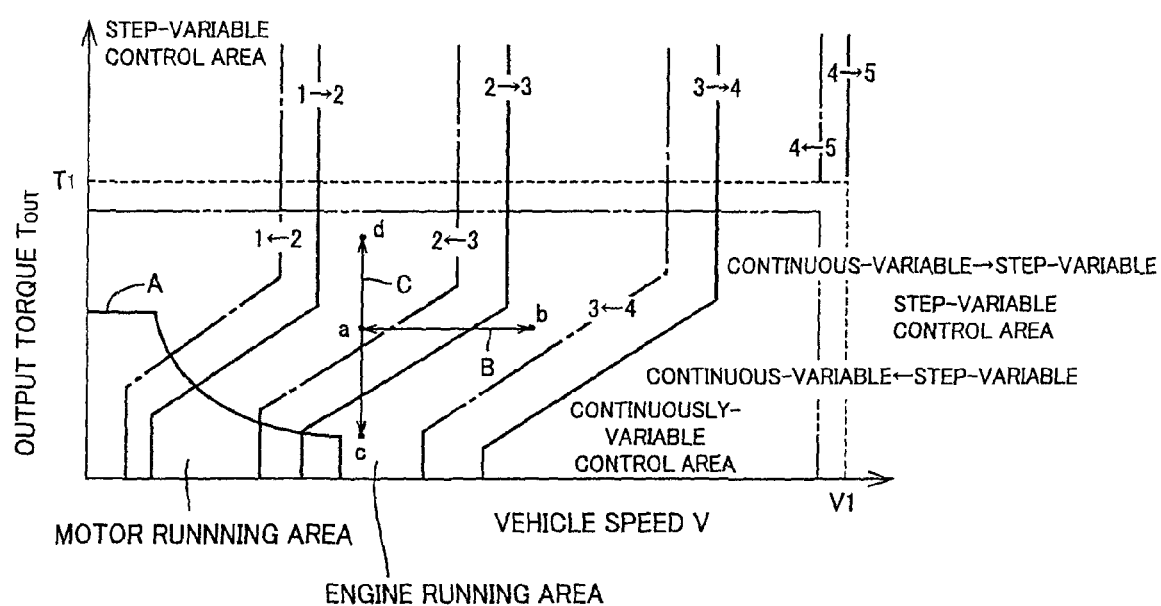
FIG. 6 is a view representing one example of a preliminarily stored shifting diagram based on which a determination on the gear shifting is executed in the automatic shifting portion, one example of a preliminarily stored shifting diagram based on which a shifting portion on the switching of a shifting state is executed in a shifting mechanism, and one example of a preliminarily stored drive-force source switching diagram having a boundary line between an engine running area and a motor running area for an engine running mode and a motor running mode to be switched. They are plotted on a two-dimensional coordinate in terms of as the same parameters as the vehicle speed and output torque, while representing respective relations.

FIG. 5 is a functional block diagram for illustrating an essential part of a control function to be performed with the electronic control device 40. In FIG. 5, the step variable shifting control means 54 performs the gear shifting in the automatic shifting portion 20. For instance, the step variable shifting control means 54 discriminates i.e., judges whether to perform the gear shifting in the automatic shifting portion 20 on the basis of the vehicle condition indicative of the vehicle speed V and the required output torque $T_{out}$ for the automatic shifting portion 20 by referring to the shifting diagram (the relation and the shifting map), preliminarily stored in the memory means 56, which are shown in FIG. 6 in solid lines and long dash short dash lines.

That is, the step variable shifting control means 54 discriminates a shifting position, for which the gear shifting is performed with the automatic shifting portion 20, to allow the automatic shifting portion 20 to perform the gear shifting so as to obtain the discriminated shifting position. When this takes place, the step variable shifting control means 54 outputs a command (shifting output command, hydraulic command) to a hydraulic control circuit 42 for engaging and/or disengaging the hydraulically operated frictional engaging device, excepting the switching clutch C0 and the switching brake B0, so as to achieve a desired shifting position in accordance with, for instance, the operation Table shown in FIG. 2.

Hybrid control means 52 functions as continuously variable shift control means. It allows the shifting mechanism 10 to be placed in the continuously variable shifting state, that is the differential portion 11 to be placed in the differential state, compelling the engine 8 to operate in an operating range with high efficiency. Meanwhile, the hybrid control means 52 compels the drive powers of the engine 8 and the second electric motor M2 to be distributed, and the first electric motor M1 to generate electric power with a reactive force in optimized variations. This allows the gear ratio γ0 of the differential portion 11, acting as the electrically controlled continuously variable shifting portion, to be controlled.

For instance, at the relevant traveling speed, the hybrid control means 52 calculates various factors such as a target (demanded) output of the vehicle based on an accelerator opening Acc; a vehicle speed V representing a driver's output requirement variable; a demanded total target output based on the target output of the vehicle and a charging demand value; and a target engine output in consideration of a transmitting loss, loads on auxiliary units and assist torque or the like required for the second electric motor M2, with a view to obtaining such a total target output. Then, the hybrid control means 52 controls the engine 8 at an engine rotation speed $N_E$ with engine torque $T_E$ so as to obtain the target engine output while controlling a rating of electric power generated by the first electric motor M1.

The hybrid control means 52 performs hybrid control with taking account of the gear position of the automatic shifting portion 20 to obtain drive power performance while improving fuel consumption. Such hybrid control allows the differential portion 11 to function as the electrically controlled continuously variable transmission so as to allow the engine rotation speed $N_E$, determined for the engine 8 to operate at a high efficiency, to match the rotating speed of the transmitting member 18 that is determined based on the vehicle speed V and the selected gear position of the automatic shifting portion 20.

To this end, the hybrid control means 52 preliminarily stores therein an optimum fuel economy curve (fuel economy map and relations) that is preliminarily determined on an experimental basis. This allows a compromise to be obtained, during the running of the vehicle under the continuously variable shifting state, between drivability of the vehicle and fuel economy performance of the engine 8 on the two-dimensional coordinate with the parameters including, for instance, the engine rotation speed $N_E$ and the output torque (engine torque) $T_E$ of the engine 8.

Thus, the hybrid control means 52 determines a target value of the total speed ratio γT of the shifting mechanism 10 so as to obtain the engine torque $T_E$, causing the engine to generate an output required for satisfying, for instance, the target output (overall target output and required drive force), and the engine rotation speed $N_E$. This enables the engine 8 to operate on the optimum fuel economy curve. Then, the hybrid control means 52 controls the speed ratio γ0 of the differential portion 11 so as to achieve the target value. This allows the total speed ratio γT to be controlled within a variable shifting range, for instance, from 13 to 0.5.

During such hybrid control, the hybrid control means 52 allows electric energy generated by the first electric motor M1 to be supplied to an electric-energy storage device 60 and the second electric motor M2 through an inverter 58. This allows a major portion of the drive force of the engine 8 to be mechanically transmitted to the transmitting member 18. When this takes place, a portion of the drive force of the engine is consumed with the first electric motor M1 for generating electric power to be converted to electric energy. The electric energy is supplied through the inverter 58 to the second electric motor M2, which in turn is driven to transfer the drive force from the second electric motor M2 to the transmitting member 18. Equipment, related to the operations from a phase of generating the electric energy to a phase in which the electric energy is consumed with the second electric motor M2, constitutes an electric path in which the portion of the drive force of the engine 8 is converted to the electric energy which in turn is converted to the mechanical energy.

In particular, with the step variable shift control means 54 executed a shift control of the automatic shifting portion 20, the gear ratio of the automatic shifting portion 20 is caused to vary stepwise accompanied by a stepwise change in the total gear ratio γT of the shifting mechanism 10 on a stage before and after the relevant shifting. That is, the total gear ratio γT is not continuously varied on a stage before and after the shifting of the automatic shifting portion 20 unlike the continuously variable shifting portion whose gear ratio is infinitely varied, with the gear ratio being compelled to vary so as to skip step-by-step, i.e., in a non-continuous manner.

Herefore, the hybrid control means 52 allows the differential portion 11 to execute the shifting in synchronism with the shifting of the automatic shifting portion 20 so as to suppress the stepwise change in the total gear ratio γT on the stage before and after the shifting of the automatic shifting portion 20 during the shifting thereof. That is, the variation in the engine rotation speed $N_E$ is adjusted to be less than a given engine rotation speed $N_E'$ for the variation in the rotation speed, representing the input rotation speed $N_{IN}$ of the automatic shifting portion 20, of the transmitting member 18 (second electric motor M2) caused by the shifting of the automatic shifting portion 20.

In other words, the hybrid control means 52 allows the differential portion 11 to execute the shifting in synchronism with the shifting of the automatic shifting portion 20 such that the engine rotation speed $N_E$ is caused to continuously vary on the stage before and after the shifting of the automatic shifting portion 20, so as to suppress the variation in the engine rotation speed $N_E$ due to an electrically controlled CVT function (differential action) of the differential portion 11.

That is, the hybrid control means 52 functions as motor control means for varying the rotation speed $N_{M1}$ of the first electric motor M1 so as to continuously vary the engine rotation speed $N_E$ on the stage before and after the shifting of the automatic shifting portion 20, regardless of the variation in the rotation speed of the transmitting member 18 (second electric motor M2). As used herein, the term "given engine rotation speed $N_E'$" refers to a given value that is targeted for changing the gear ratio of the differential portion 11 preliminarily stored upon experiments as the variation, with the variation of the engine rotation speed $N_E$ being suppressed on the stage before and after the shifting of the automatic shifting portion 20 to cause the variation to be continuous.

For instance, the hybrid control means 52 compels a transient change in the total gear ratio γT not to vary in a non-continuous manner on the stage before and after the shifting of the automatic shifting portion 20 with the transient change continuously occurring to maintain the engine rotation speed $N_E$ at a nearly constant level. Therefore, the differential portion 11 executes the shifting in synchronism with the shifting of the automatic shifting portion 20 so as to change the gear ratio γ0 in a direction opposite to the direction in which the gear ratio γ is changed in the automatic shifting portion 20. For instance, the gear ratio γ0 is changed in the direction opposite to the direction, in which the gear ratio γ is changed in the automatic shifting portion 20, by a variable component equivalent to a stepwise change in the gear ratio γ of the automatic shifting portion 20.

Therefore, even if the automatic shifting portion 20 performs the shifting accompanied by the stepwise change in gear ratio thereof, the stepwise change in engine rotation speed $N_E$ is suppressed on the stage before and after the shifting, thereby suppressing the shifting shock.

Figure 7:
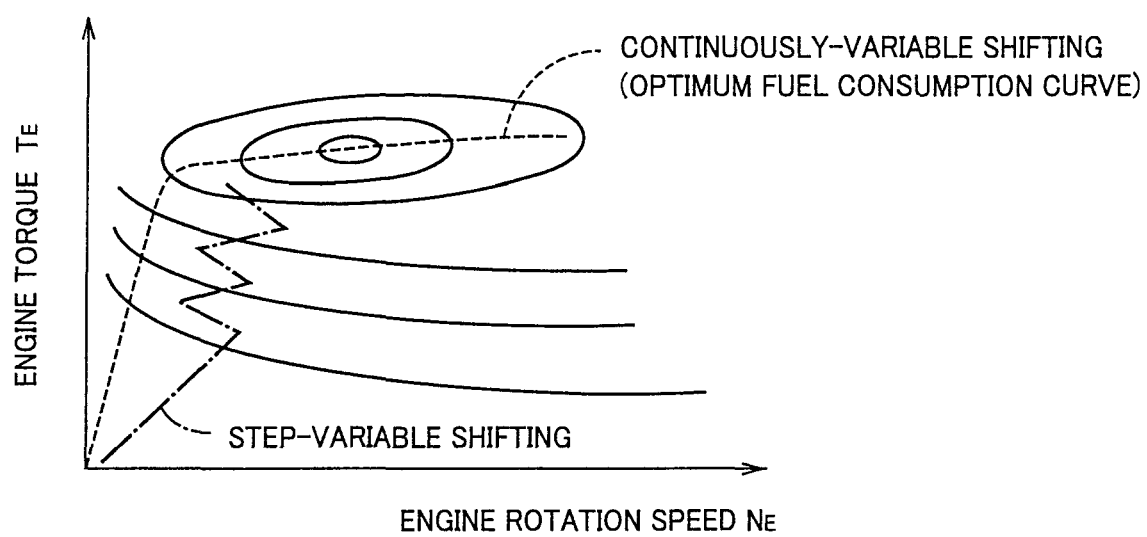
FIG. 7 is a view showing a fuel consumption rate map in which a broken line shows an optimum fuel consumption rate curve of the engine, and shows difference between the engine operation in the continuously variable transmission (broken line) and an engine operation in the step variable transmission (dashed line).

From another standpoint, with a commonly used step variable transmission, the engine 8 is caused to operate in a manner as indicated by long dash short dash line shown in FIG. 7. Meanwhile, with the continuously variable transmission, the engine 8 is caused to operate in a manner along the optimum fuel saving rate curve of the engine 8, indicated by a broken line shown in FIG. 7, or in a manner closer to the optimum fuel saving rate curve than that achieved by the step variable power transmission. Accordingly, the continuously variable transmission can realize engine torque $T_E$ for drive torque to be obtained for satisfying demanded drive torque (drive power) at the engine rotation speed $N_E$ in a pattern closer to the optimum fuel saving rate curve than that of the step variable transmission.

Thus, the continuously variable transmission is regarded to be superior in a fuel saving effect than that achieved by the step variable transmission. Thus, the hybrid control means 52 controls the gear ratio γ0 of the differential portion 11 so as to cause the engine 8 to operate along the optimum fuel saving rate curve indicated by, for instance, the broken line in FIG. 7 such that no degradation occurs in fuel consumption, even if the automatic shifting portion 20 executes the shifting to cause the gear ratio thereof to change stepwise. This makes it possible to cause a whole of the shifting mechanism 10 to function as the continuously variable transmission, resulting in improved fuel consumption.

As set forth above, the hybrid control means 52 performs a so-called synchronizing shift control for the differential portion 11 to execute the shifting in synchronism with the shifting of the automatic shifting portion 20. The initial timing, at which the differential portion 11 performs the synchronizing shift control, is set in consideration of a response lag between a judgment made on the shifting of the automatic shifting portion 20 effectuated by the step variable shift control means 54, and an actual operation of the engaging device for varying the rotation speed of the transmitting member 18 (second electric motor M2).

As used herein, the term "response lag" refers to a delay in response between the occurrence of the shifting in the shifting process of the automatic shifting portion 20 and a timing at which a so-called inertia phase is initiated with the occurrence of the variation in input rotation speed $N_{IN}$, i.e., the variation in rotation speed $N_{18}$ of the transmitting member 18. For instance, the response lag may be preliminarily acquired on experimental tests to be stored or with the occurrence of an actual variation in rotation speed $N_{18}$ of the transmitting member 18, the hybrid control means 52 may start the synchronizing shift control of the differential portion 11.

Further, the differential portion 11 terminates the synchronizing shift control at timing when the inertia phase is completed in the process of the shifting of the automatic shifting portion 20. For instance, a shifting time of the automatic shifting portion 20 may be preliminarily acquired on, for instance, experimental tests and stored in advance. Alternately, the hybrid control means 52 may terminate the synchronizing shift control of the differential portion 11 when no variation in the rotation speed $N_{18}$ of the transmitting member 18 is actually present, that is, when the actual rotation speed $N_{18}$ of the transmitting member 18 is nearly brought into synchronism with the rotation speed $N_{18}$ of the transmitting member 18 subsequent to the shifting.

Thus, the hybrid control means 52 compels the differential portion 11 to perform the shifting for executing the synchronizing shift control during a period (interval) for the inertia phase to be present in the course of the shifting of the automatic shifting portion 20. For instance, the inertia phase is present in a period preliminarily acquired on experiments, or in a period between an actual variation occurring in the rotation speed $N_{18}$ of the transmitting member 18 and the occurrence of no variation in the rotation speed $N_{18}$ of the transmitting member 18. In other words, the hybrid control means 52 causes the differential portion 11 to perform the shifting during the inertia phase caused by the shifting of the automatic shifting portion 20. This enables the differential portion 11 to perform the shifting in synchronism with the shifting of the automatic shifting portion 20.

The hybrid control means 52 functionally includes engine output control means. The engine output control means allows a throttle actuator to perform throttle control so as to open or close an electronic throttle valve 94. In addition, the hybrid control means 52 allows a fuel injection device 96 to control a fuel injection quantity and fuel injection timing for performing fuel injection control. Further, the hybrid control means 52 outputs commands independently or in combination. This allows the engine 8 to perform output control so as to fundamentally provide the required engine output. For instance, the hybrid control means 52 drives the throttle actuator in response to an acceleration opening signal Acc by referring to the preliminarily stored relation, which is not shown, such that the greater the accelerator opening Acc, the greater will be the throttle valve opening $\theta_{TH}$.

The hybrid control means 52, irrespective of the halt or idling state of the engine 8, can perform the control to cause the vehicle to run or to be driven by the electrical CVT function (differential function) of the differential portion 11. A solid line A, shown in FIG. 6, represents a boundary line between the engine running area and the motor running area for the drive power source of the vehicle for starting up/running (hereinafter referred to as "for running") thereof to be switched to the engine 8 and the electric motor, that is, for instance, the second electric motor M2. In other words, the boundary line is used for switching the so-called engine running area, in which the engine 8 is caused to act as a running drive power source for starting up/running (hereinafter referred to as "running") the vehicle, and the so-called motor running area in which the second electric motor M2 is caused to act as a drive power source for running the vehicle.

The preliminarily stored relation, having the boundary line (in the solid line A) shown in FIG. 6 for switching the engine running area and the motor running area, represents one example of the drive-force source switching diagram (drive power source map), formed in a two-dimensional coordinate, which takes the vehicle speed V and the output torque $T_{OUT}$, indicative of the drive-force related value, as parameters. Memory means 56 preliminarily stores the drive-force source switching diagram together with, for instance, the solid line and the shifting diagram (shifting map) designated by the long dashed short dashed line which are shown in FIG. 6.

The hybrid control means 52 determines based on the vehicle condition, represented by the vehicle speed V and the required torque output $T_{OUT}$ by referring to, for instance, the drive-force source switching diagram shown in FIG. 6 to find whether the motor running area or the engine running area is present, thereby effectuating the motor running area or the engine running area. As will be apparent from FIG. 6, the hybrid control means 52 executes the motor running area at the relatively low output torque $T_{OUT}$, that is, the low engine torque $T_E$ in which the engine efficiency is generally lower than that in the high torque region, or the relatively low vehicle speed area in the vehicle speed V, that is, the low load region.

Accordingly, upon the vehicle starting, the motor starting is normally executed. However, depending on the vehicle state when the accelerator pedal is so deeply depressed that, in the drive force source switch diagram shown in FIG. 6, the required output torque $T_{OUT}$ exceeds the motor running area that is the required engine torque $T_E$, the engine starting is normally executed.

In order to suppress a drag of the engine 8 in a halted state thereof for improving the fuel economy, the hybrid control means 52 renders the differential portion 11 operative to perform an electrical CVT function (differential function) during the motor running area. This enables the rotating speed $N_{M1}$ of the first electric motor M1 to be controlled in a negative rotating speed, for instance, an idling state. This causes the engine rotation speed $N_E$ to be maintained at a zeroed or nearly zeroed value.

Further, even under the engine running area, the hybrid control means 52 may allow the electric path to be established. In this moment, the electric energies resulting from the first electric motor M1 and/or the electric-storage device 60 are supplied to the second electric motor M2. Thus, the second electric motor M2 is driven to make it possible to perform torque-assisting for the drive force of the engine 8. Thus, in the illustrated embodiment, the engine running area may cover a phase including the engine running area and the motor running area in combination.

Further, the hybrid control means 52 may cause the differential portion 11 to have the electrical CVT function through which the engine 8 can be maintained under the operating state, regardless of the halted condition or the low speed condition of the vehicle. For instance, if a drop occurs in a state of charge SOC of the electric-storage device 60 during the halt of the vehicle, the first electric motor M1 needs to generate electric power. In this moment, the drive force of the engine 8 causes the first electric motor M1 to generate electric power while the rotating speed of the first electric motor M1 increases. Thus, even if the rotating speed $N_{M2}$ of the second electric motor M2, uniquely determined with the vehicle speed V, becomes zero (nearly zero) due to the halted condition of the vehicle, the power distributing mechanism 16 performs the differential action. This causes the engine rotation speed $N_E$ to be maintained at a level beyond a rotating speed for autonomous rotation.

Furthermore, the hybrid control means 52 allows the differential portion 11 to perform the electrical CVT function to control the rotating speed $N_{M1}$ of the first electric motor M1 and the rotating speed $N_{M2}$ of the second electric motor M2. This causes the engine rotation speed $N_E$ to be maintained at an arbitrary level of the rotating speeds regardless of the vehicle remaining under the halted or running state. In other words, the hybrid control means 52 controls the rotating speed $N_{M1}$ of the first electric motor M1 and/or the rotating speed $N_{M2}$ of the second electric motor M2 to the arbitrary level, while maintaining the engine rotation speed $N_E$ in the constant value or in the arbitrary value. For instance, as will be understood from the collinear diagram shown in FIG. 3, when increasing the engine rotation speed $N_E$, the hybrid control means 52 executes the operation to raise the rotating speed $N_{M1}$ of the first electric motor M1 while maintaining the rotating speed $N_{M2}$ of the second electric motor M2, restricted with the vehicle speed V, at a substantially fixed level.

Increasing-speed gear judge means 62 makes a judge on which of the switching clutch C0 and the switching brake B0 are to be engaged for placing the shifting mechanism 10 in the step variable shifting state. That is, the determination is made based on the vehicle condition according to, for instance, the shifting diagram, shown in FIG. 6, which is preliminarily stored in the memory means 56, to find whether or not the gear position to be shifted in the shifting mechanism 10 lies in an increasing-speed gear position, for instance, a 5th-speed gear position.

Switching control means 50 switches the engaging state and/disengaging state of the engaging device (switching clutch C0 and switching brake B0) depending on the vehicle condition. This allows the continuously variable shifting state and the step variable shifting state, that is, the differential state and the locked state to be selectively switched. For instance, the switching control means 50 determines whether to switch the shifting state of the shifting mechanism 10 (differential portion 11) based on the vehicle condition represented with the vehicle speed V and the required output torque $T_{OUT}$. This determination is made by referring to the shifting diagram (shifting map and relation), preliminarily stored in the memory means 56, which are shown in the broken line and the long dashed double short dashed line in FIG. 6.

That is, the determination is made to find whether the shifting mechanism 10 lies in a continuously variable shifting control region for the continuously variable shifting state or a step variable shifting control region for the step variable shifting state. Thus, the determination is made on the shifting state to be switched by the shifting mechanism 10.

More particularly, if the determination is made that the shifting mechanism 10 lies in the step variable shifting control region, then, the switching control means 50 outputs a command to the hybrid control means 52 disenabling or interrupting the hybrid control or continuously variable shifting control, while permitting the step variable shifting control means 54 to perform the shifting for the predetermined step variable shifting operation. When this takes place, the step variable shifting control means 54 allows the automatic shifting portion 20 to perform the automatic shifting in accordance with, for instance, the shifting diagram, shown in FIG. 6, which is preliminarily stored in the memory means 56.

For instance, FIG. 2 shows the operation Table, preliminarily stored in the memory means 56, which represents combinations in operation of the hydraulically operated frictional engaging devices, that is, the clutches C0, C1, C2, and the brakes B0, B1, B2 and B3 to be selected in the shifting control. That is, the entire shifting mechanism 10, that is, the differential portion 11 and the automatic shifting portion 20, functions as a whole to be the so-called step variable automatic transmission, thereby establishing the gear positions according to the operation Table shown in FIG. 2.

If the increasing-speed gear judge means 62 judges the 5th-gear position, the switching control means 50 outputs a command to the hydraulic control circuit 42 for disengaging the switching clutch C0 and engaging the switching brake B0. This causes the differential portion 11 to function as an auxiliary power transmission with a fixed speed ratio γ0, for instance, the speed ratio γ0 equal to "0.7". Thus, the shifting mechanism 10 can act as a whole to obtain an increasing-speed gear position, that is, a so-called overdrive-gear position with a speed ratio less than 1.0.

In contrast, if no 5th-gear position is determined by the increasing-speed gear judge means 62, the switching control means 50 outputs a command to the hydraulic control circuit 42 for engaging the switching clutch C0 and disengaging the switching brake B0. This causes the differential portion 11 to function as the auxiliary power transmission with the fixed speed ratio γ0, for instance, the speed ratio γ0 equal to 1. Thus, the shifting mechanism 10 can act as a whole to obtain a decreasing-speed gear position with a speed ratio greater than 1.0. Thus, the switching control means 50 can perform the switching of the shifting mechanism 10 in the step variable shifting state and selectively performs the switching for the gear positions of two kinds in either one gear position under the step variable shifting state. This causes the differential portion 11 to function as the auxiliary power transmission and the automatic shifting portion 20, connected to the differential portion 11 in series, is caused to function as the step variable transmission. Thus, the shifting mechanism 10 is caused to function as the so-called step variable automatic transmission as a whole.

On the contrary, if the determination is made that the shifting mechanism 10 should be switched to the continuously variable shifting state, the switching control means 50 outputs a command to the hydraulic control circuit 42 for disengaging both the switching clutch C0 and the switching brake B0. This causes the shifting mechanism 10 to be placed in the continuously variable shifting state for enabling a continuously variable shifting to be performed. Thus, the shifting mechanism 10 can act as a whole to obtain the continuously variable shifting state.

Concurrently, the switching control means 50 outputs a command to the hybrid control means 52 for permitting the hybrid control, and outputs a signal to the step variable shifting control means 54 for fixing the shifting mechanism 10 in the gear position for the predetermined continuously variable shifting state. Alternately, a signal is outputted to the step variable shifting control means 54 for permitting the automatic shifting portion 20 to perform automatic shifting according to, for instance, the shifting diagram, shown in FIG. 6, which are preliminarily stored in the memory means 56. In such a case, the variable step shifting control means 54 executes the operations as shown in the operation Table of FIG. 2 excepting the engaging operations of the switching clutch C0 and brake B0, thereby performing the automatic shifting.

Thus, the switching control means 50 switches the differential portion 11 to be placed in the continuously variable shifting state to function as the continuously variable transmission. In addition, the automatic shifting portion 20, connected to the differential portion 11 in series, is caused to function as the step variable transmission. This results in the occurrence of a drive force with a suitable magnitude. Simultaneously, a continuously variable change occurs in the rotating speed input to the automatic shifting portion 20, that is, the rotating speed of the transmitting member 18 applied to the automatic shifting portion 20 for each gear position of the 1st-gear, 2nd-gear, 3rd-gear and 4th-gear positions. Thus, the respective gear positions are established in speed ratios over a continuously variable shifting range. Accordingly, since the speed ratio is continuously variable across the adjacent gear positions, the shifting mechanism 10 can achieve the overall speed ratio $\gamma T$ in the continuously variable shifting state.

To explain about FIG. 6 in detail, which represents the shifting diagram (shifting map and relation) preliminarily stored in the memory means 56 for a determination to be made to perform the gear shifting in the automatic shifting portion 20. FIG. 6 shows one example of the shifting diagram plotted in a two-dimensional coordinate with parameters in terms of the vehicle speed V and the required output torque $T_{OUT}$ indicative of a drive-force related value. In FIG. 6, a solid line represents an up-shift line and a long dashed short dashed line represents a downshift line.

Further, in FIG. 6, a broken line represents a determination vehicle speed V1 and a determination output torque T1 for the switching control means 50 to make a determination on the continuously variable control area and the step variable control area. That is, the broken line in FIG. 6 represents a two determination lines. One is a predetermined high vehicle speed determination line, which forms a series of the determination vehicle speed V1 representing a predetermined high-speed running determination line for determining that the hybrid vehicle lies in the high speed running region. Other is a predetermined high-output running determination line, which forms a series of the determination output torque T1 representing a predetermined high-output running determination line for determining the drive-force related value relevant to the hybrid vehicle, that is, for instance, the high output running region for the output torque $T_{OUT}$ of the automatic shifting portion 20 to mark the high output.

Further, as sown in a long dashed double short dashed line in FIG. 6 in contrast to the broken line indicated therein, a hysteresis is provided for making a determination on the step variable shifting control region and the continuously variable shifting control region. That is, FIG. 6 represents a preliminarily stored shifting diagram (switching map and relation) for the switching control means 50 to make a regional determination on either the continuously variable control area or the step variable control area, based on parameters with the vehicle speed V and the output torque $T_{OUT}$ covering the determination vehicle speed V1 and the determination output torque T1. In addition, the memory means 56 may preliminarily store the shifting map, inclusive of such a shifting diagram. Moreover, the shifting diagram may be of the type that includes at least one of the determination vehicle speed V1 and the determination output torque T1 and may include a preliminarily stored shifting diagram with a parameter taking any of the vehicle speed V and the output torque $T_{OUT}$.

The shifting diagram, the switching diagram or the drive-force source switching diagram or the like may be stored not in the map but in a determination formula for making comparison between the current vehicle speed V and the determination vehicle speed V1, and a determination formula or the like for making comparison between the output torque $T_{OUT}$ and the determination output torque T1. In such a case, the switching control means 50 places the shifting mechanism 10 in the step variable shifting state when the vehicle condition such as, for instance, the current vehicle speed exceeds the determination vehicle speed V1. In addition, the switching control means 50 places the shifting mechanism 10 in the step variable shifting state when the vehicle condition such as, for instance, the output torque $T_{OUT}$ of the automatic shifting portion 20 exceeds the determination output torque T1.

When a failure or defective function occurs in a control unit of an electrical system such as an electric motor or the like for rendering the differential portion 11 operative as an electrically controlled continuously variable transmission, the switching control means 50 may preferentially place the shifting mechanism 10 in the step variable shifting state to ensure the vehicle to continuously run, even in the presence of the continuously variable control region. As used herein, the term "defective function" refers to a functional deterioration of equipment related to an electric path involved in the operation of the first electric motor M1 to generate electric energy and the conversion of such electric energy to mechanical energy, that is, failures and functional deteriorations resulting from the failures or low temperatures of the first electric motor M1, the second electric motor M2, the inverter 58 and the electric-storage device 60 and transmitting paths, etc., for such component parts to be interconnected.

The above drive-force related value is a parameter corresponding to the drive force of the vehicle in one-to-one relation, which may be the drive torque or the drive force at the drive wheel 38. In addition, it may be an output torque $T_{OUT}$ of the automatic shifting portion 20, an engine output torque $T_E$, an acceleration value of the vehicle; an actual value such as the engine output torque $T_E$ calculated based on the operating angle of the accelerator pedal or the opening angle $\theta_{TH}$ of the throttle valve (or intake air quantity, air/fuel ratio or fuel injection amount) and the engine rotation speed $N_E$; or an estimated value such as the engine output torque $T_E$ or required vehicle drive force calculated based on the amount of operation of the accelerator pedal by the vehicle operator or the operating angle of the throttle valve. The vehicle drive torque may be calculated based on not only the output torque $T_{OUT}$, etc., but also the ratio of a differential gear device of and the radius of the drive wheels 38, or may be directly detected by a torque sensor or the like. This is true for each of torques mentioned above.

Further, for instance, if the shifting mechanism 10 is placed in the continuously variable shifting state during the high speed running, deterioration occurs in fuel consumption. Therefore, to address such an issue, the vehicle speed V1 is set such that the shifting mechanism 10 is placed in the step variable shifting state during the high speed running. Furthermore, if the first electric motor M1 is configured to provide a reactive torque varying in a range covering the high output region of the engine during the running of the vehicle in a high output region, the first electric motor M1 becomes large in size. To minimize the first electric motor M1, the determination torque T1 is set to depend on the characteristic of the first electric motor M1 such that, for instance, the maximum output of electric energy being generated by the first electric motor M1 is lowered.

Figure 8:
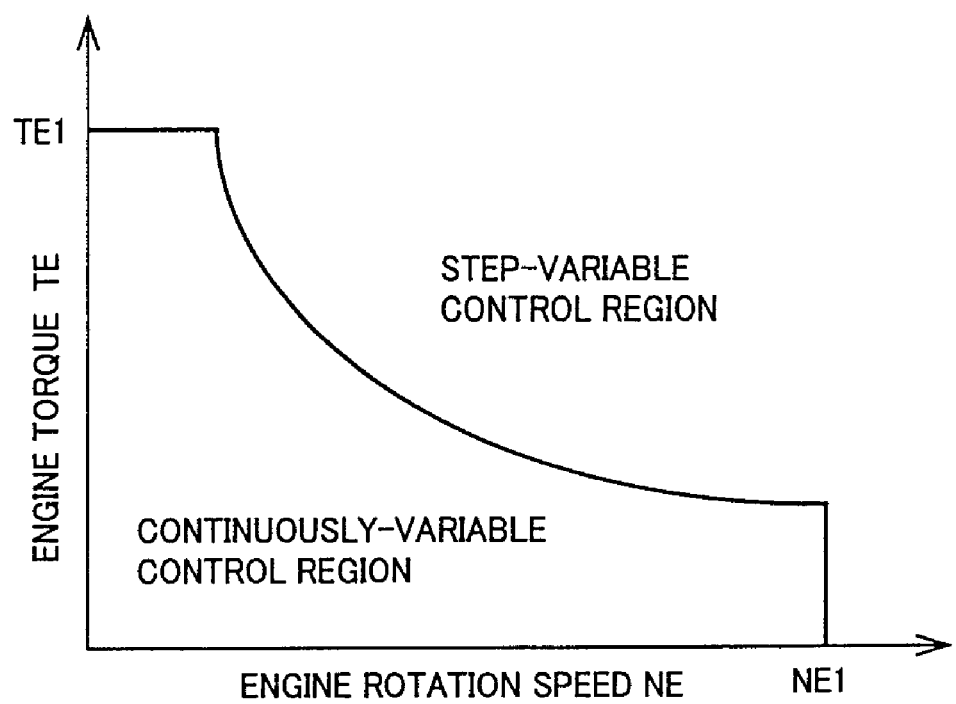
FIG. 8 is a conceptual view showing a preliminarily stored relation having a boundary line between a continuously variable control area and a step variable control area for mapping the boundary line between the continuously variable control area and the step variable control area shown in broken lines in FIG. 7.

FIG. 8 represents a switching diagram (switching map and relation), preliminarily stored in the memory means 56. It has an engine output line in the form of a boundary line to allow the switching control means 50 to execute the regional determination on which of the step variable control area and the continuously variable control area is to be selected in terms of the parameters including the engine rotation speed $N_E$ and the engine torque $T_E$. The switching control means 50 may execute the operation based on the engine rotation speed $N_E$ and the engine torque $T_E$ by referring to the switching diagram shown in FIG. 6 in place of referring to the switching diagram shown in FIG. 6.

That is, the switching control means 50 may determine whether the vehicle condition, represented with the engine rotation speed $N_E$ and the engine torque $T_E$, is placed in the step variable control area or the continuously variable control area. Further, FIG. 8 is a conceptual view for the broken line to be plotted as shown in FIG. 6. In other words, the broken line in FIG. 6 also represents shifting lines rewritten on the two-dimensional coordinate in terms of the parameters including the vehicle speed V and the output torque $T_{OUT}$ based on the relational diagram (map) shown in FIG. 8.

As indicated on the relation shown in FIG. 6, the step variable control area is set to lie in the high torque region, where the output torque $T_{OUT}$ is greater than the predetermined determination output torque T1, or the high vehicle speed region where the vehicle speed V is greater than the predetermined determination vehicle speed V1. Therefore, a step variable shift running area is effectuated in a high drive torque region, where the engine 8 operates at a relatively high torque, or a relatively high vehicle speed region of the vehicle speed. Further, a continuously variable shift running area is effectuated in a low drive torque region, where the engine 8 operates at a relatively low torque, or a relatively low vehicle speed region of the vehicle speed, that is, during a normal output region of the engine 8.

In the relation shown in FIG. 8, similarly, the step variable shifting control region is set to lie in a high-torque region where the engine torque $T_E$ is greater than a predetermined given value TE1, a high-speed rotating region where the engine rotation speed $N_E$ is greater than a predetermined given value NE1, or a high-output region where the engine output calculated based on the engine torque $T_E$ and the engine rotation speed $N_E$ is greater than a given value. Therefore, the step variable shift running area is effectuated at a relatively high torque, a relatively high rotating-speed or a relatively high-output of the engine 8.

The continuously variable shift running area is effectuated at a relatively low torque, a relatively low rotating-speed or a relatively low-output of the engine 8, that is, in the normal output region of the engine 8. The boundary line in FIG. 8 between the step variable control area and the continuously variable control area corresponds to a high vehicle-speed determination line which forms a series of high vehicle-speed determination values and a high-output running determination line which forms a series of high-output running determination values.

With such a boundary line, the shifting mechanism 10 is placed in the continuously variable shifting state to ensure the vehicle to have fuel economy performance during the running of the vehicle at, for instance, a low/medium speed and low/medium output. In the high speed running region where an actual vehicle speed V exceeds the determination vehicle speed V1, the shifting mechanism 10 is placed in the step variable shifting state operative to act as a step variable transmission. In this moment, the output of the engine 8 is transferred to the drive wheels 38 mainly through a mechanical power transmitting path. This suppresses a loss in conversion between drive power and electric energy, generated when the shifting mechanism 10 is caused to act as an electrically controlled continuously variable transmission, providing improved fuel consumption.

Further, during the running of the vehicle at the high output of the engine where the drive-force related value such as the output torque $T_{OUT}$ or the like exceeds the determination torque T1, the shifting mechanism 10 is placed in the step variable shifting state acting as the step variable transmission. In this moment, the output of the engine 8 is transferred to the drive wheels 38 mainly through the mechanical power transmitting path. Therefore, the electrically controlled continuously variable transmission is caused to operate in the low/medium speed running region and the low/medium output running region of the vehicle. This results in a reduction in the maximum value of the electric energy being generated by the first electric motor M1, that is, the electric energy being transmitted by the same. Thus, a further miniaturization can be achieved in the first electric motor M1 per se or the vehicle drive apparatus including such a component.

That is, as the given value TE1 is preset to be a switching judgment value for engine torque $T_E$ for the first electric motor M1 to be able to bear reactive torque, the differential portion 11 is placed in the step variable shifting state during the running of the vehicle at high output torque of the engine where engine torque $T_E$ exceeds the given value TE1. Therefore, the first electric motor M1 has no need to bear reactive torque acting against engine torque $T_E$ like a phase when the differential portion 11 is placed in the step variable shifting state, thereby preventing an increase in size while suppressing the occurrence of degradation in durability. In other words, with the illustrated embodiment, the first electric motor M1 has a maximal output that is made smaller than reactive torque capacity required for the maximum value of engine torque $T_E$. That is, no output of the first electric motor M1 comply with the reactive torque capacity for engine torque $T_E$ to exceed the given value TE1, enabling the miniaturization to be realized.

In addition, the maximal output of the first electric motor M1 is a rated value that is obtained upon experimental tests in conformity to a related usage environment. Moreover, as used herein, the term "switching judgment value for engine torque $T_E$" refers to a value equivalent to the maximum value of engine torque $T_E$ or a value lower than the maximum value by a given level that enables the first electric motor M1 to bear reactive torque. The switching judgment value is a value obtained upon preliminary experimental tests so as to suppress the occurrence of degradation in durability of the first electric motor M1.

Figure 9:
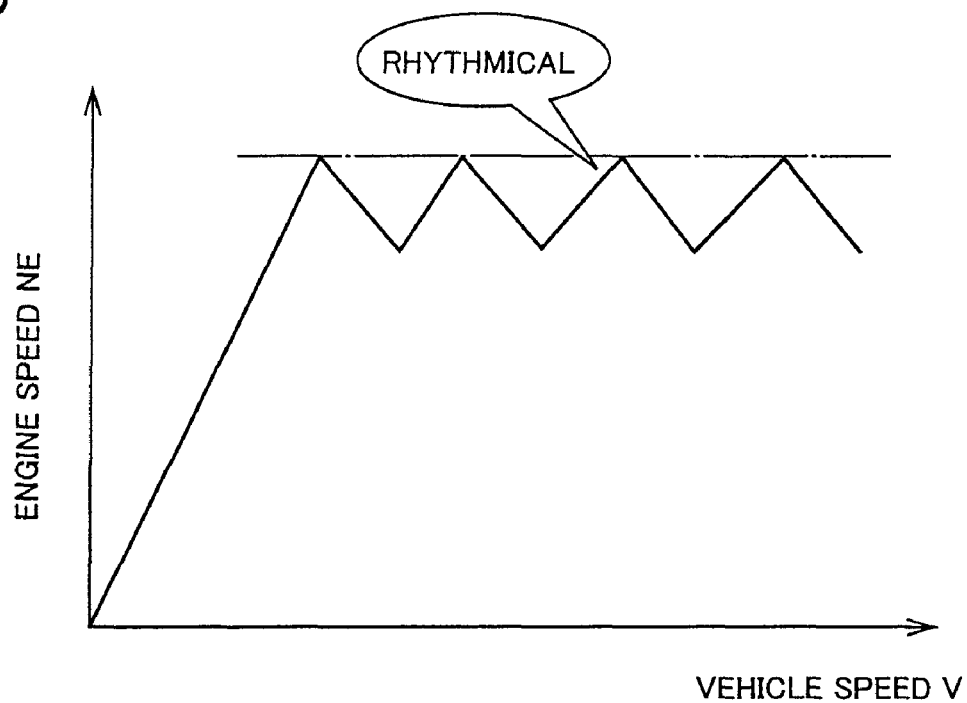
FIG. 9 is a graph showing fluctuation in an engine rotation speed caused in up-shift in a step variable transmission.

According to other viewpoint, in the high speed running, the requirement in the drive for the driver precedes the requirement in the mileage. Therefore, the shifting mechanism 10 is switched to the step variable shifting state (fixed shifting state) rather than the continuously variable shifting state. This allows a driver to enjoy a change in the engine rotation speed $N_E$ resulting from the up-shifting in the step variable automatic shift running region as shown in, for instance, FIG. 9, that is, a rhythmical change in the rotating speed $N_E$ of the engine.

Figure 10:
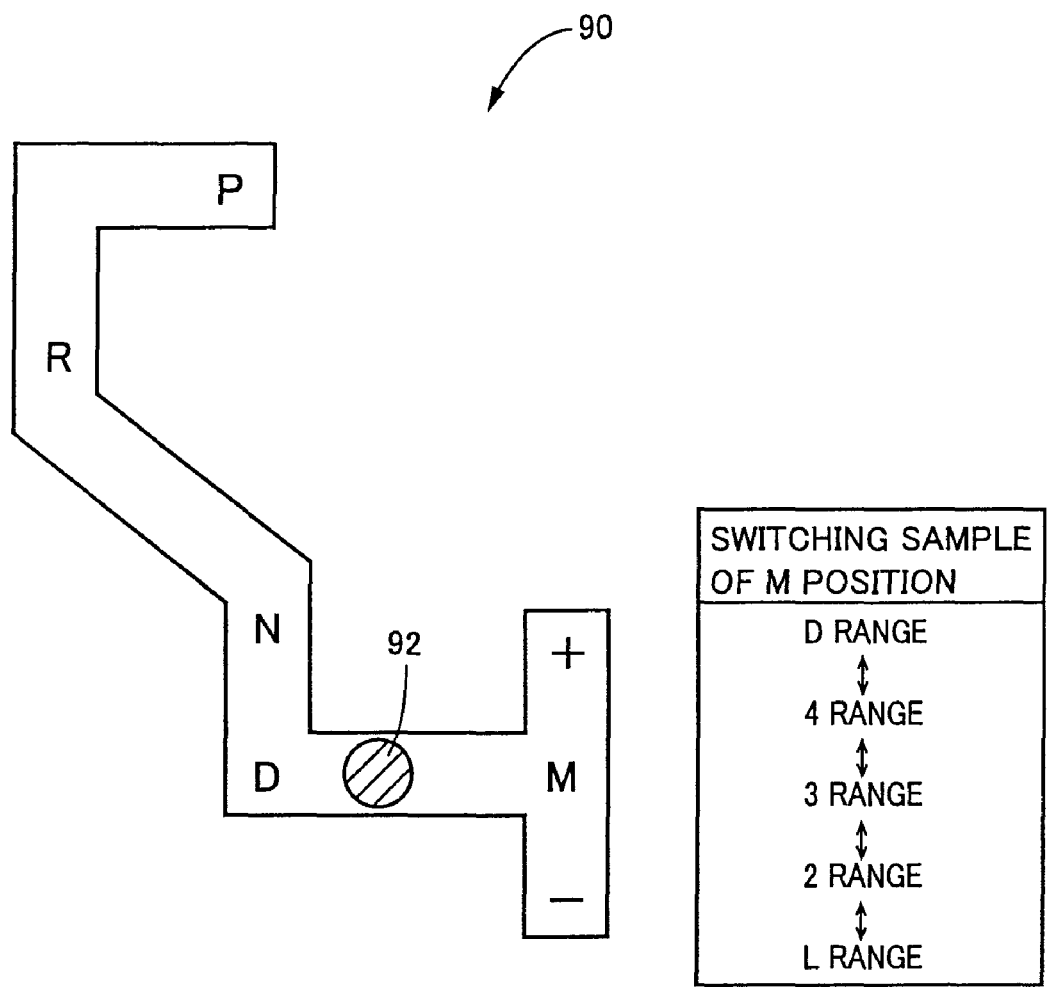
FIG. 10 is a view showing one sample of a shift operation device provided with a shift lever and being operated to select one of plural kinds of shift positions.

FIG. 10 shows on sample of a switch device 90 to be switched by manual operation to one of plural kinds of shift positions. This switch device 90 includes a shift lever i.e., switch lever 92 disposed for example at lateral side of the driver's seat and manually operated to select one of plural kinds of shifting positions. This switch lever 92 is selectively shifted to one of a parking position "P (parking)", rearward running position "R (reverse)" for rearward running, neutral position "N (neutral)", forward automatically shifted running drive position "D (drive)", and forward manually shifted running drive position "M (manual)". In the "P (parking)", none of the engaging device such as the first clutch C1 and the second clutch C2 are not engaged to set the interrupt state of the power transmitting path in the shifting mechanism 10, that is the automatic shifting portion 20, and to lock rotation of the output shaft 22. In the "N (neutral)", the power transmitting path in the shifting mechanism 10 is interrupted.

For example, in conjunction with manual operations of the switch lever 92 to the respective shift positions, manual valves in the hydraulically operated control circuit 42 mechanically connected to the switch lever 92, are switched. The hydraulically operated control circuit 42 is thereby mechanically switched so that the reverse-gear position "R," the neutral position "N," or the forward-gear position "D," etc., shown in the engagement operation table of FIG. 2, is established. The respective gear positions from the first to fifth gear positions in the "D" or "M" position, shown in the engagement operation table of FIG. 2, are established by electrical switching of the solenoid-operated valves in the hydraulically operated control circuit 42.

Among the respective shifting positions "P" to "M," at each of the non-running positions such as "P" and "N," for example, both the first clutch C1 and the second clutch C2 are disengaged or released as shown in the engagement operation table of FIG. 2. These are non-drive positions for selecting a state in which the power transmitting path in the automatic shifting portion 20 is cut off to disable the vehicle drive. That is, this is a non-drive state in which the path of power transmission is cut off or interrupted by the first clutch C1 and the second clutch C2.

Also, at each of the running positions "R" "D" and "M" for example, at least one of the first clutch C1 and the second clutch C2 is engaged as shown in the engagement operation table of FIG. 2. These are drive positions for selecting a state in which the power transmitting path in the automatic shifting portion 20 is connected to enable the vehicle drive. That is, these are the drive position for selecting a transmitting state of the power transmitting path by both or one of the first clutch C1 and the second clutch C2.

Specifically, the second clutch C2 is engaged by manual operation of the switch lever 92 from the "P" position or the "N" position to the "R" position, so that the power transmitting path in the automatic shifting portion 20 is switched from a power transmission cutoff state to a power transmissive state. At least the first clutch C1 is engaged by manual operation of the switch lever 92 from the "N" position to the "D" position, so that the power transmitting path in the automatic shifting portion 20 is switched from a power transmission cutoff state to a power transmissive state. Also, the "D" position is the running position at the maximum speed, and the "4" range to "L" range in the "M" position are engine brake ranges for obtaining an engine brake effect.

The "M" position is located at the same position as the "D" position in the longitudinal direction of the vehicle, and is adjacent thereto in the lateral direction of the same. The switch lever 92 is operated to the "M" position, for manually selecting one of the above-indicated "D" through "L" positions. Specifically, for the "M" position, an upshift position "+" and a downshift position "−" are provided in the front-rear direction of the vehicle. The shift lever 92 is manipulated to the upshift position "+" and the downshift position "−" to select any of the "D" range to the "L" range.

For example, the five shifting ranges of the "D" range to the "L" range which are selected at the "M" position correspond to, in the changeable range of the overall speed ratio γT which can control the shifting mechanism 10 automatically, different kinds of shifting ranges in which the overall speed ratio γT at higher speed side (minimum gear ratio side) are different. Also, these five shifting ranges limit the shifting range i.e., scope of the shifting position (gear position) so that the maximum side shifting position which can control the shifting of the automatic shifting portion 20 is different.

The shift lever 92 is urged by urge means such as a spring from the upshift position "+" and the downshift position "−" to be automatically returned to the "M" position. In addition, the switch device 90 is provided with a shift position sensor (not shown) for detecting each of the shift positions of the shift lever 92. A signal representing the shift position $P_{SH}$ of the shift lever 92, and the number of manipulation at the "M" position are outputted to the electronic control device 40.

If the shift lever 92 is shifted to, for instance, the position "D", the switching control means 50 effectuates automatic switching control for the shifting state of the shifting mechanism 10 based on the preliminarily stored shifting map or switching map shown in FIG. 6. In addition, the hybrid control means 52 allows the power distributing mechanism 16 to perform continuously variable shifting control and the step variable shifting control means 54 allows the automatic shifting portion 20 to execute automatic shifting control.

During the running of the vehicle under, for instance, the step variable transmission where the shifting mechanism 10 is placed in the step variable shifting state, automatic shifting control is performed within a range from the 1st-gear to the 5th-gear positions as shown, for instance, in FIG. 2. The shifting mechanism 10 performs automatic shifting control, within a variable range of the overall speed ratio γT obtained in the continuously variable shifting range of the power distributing mechanism 16 and the respective gear positions resulting from the automatic shifting control executed by the automatic shifting portion 20 in a range from 1st-gear to 4th-gear positions. As used herein, the position "D" refers to a shift position for a running mode (automatic mode) with automatic shifting representing a control pattern for the shifting mechanism 10 to execute automatic shifting control.

Further, if the shift lever 92 is shifted to, for instance, the position "M", the switching control means 50, the hybrid control means 52 and the step variable shifting control means 54 allows the shifting mechanism 10 to perform automatic shift control within the shifting ranges of the overall speed ratio γT. During the running of the vehicle under the step variable shifting state where the shifting mechanism 10 is switched to the step variable shifting state, the shifting mechanism 10 performs the automatic shifting control within the various shifting ranges of the overall speed ratio γT.

During the running of the vehicle under the continuously variable shifting state where the shifting mechanism 10 is switched to the continuously variable shifting state, automatic shifting control is performed within the ranges of the overall speed ratio γT available to be shifted in the respective shifting ranges, with the continuously variable shifting ratio width of the power distributing mechanism 16 and the ranges of the respective gear positions for the automatic shifting portion 20 to be available to shift depending on the respective shifting ranges. As used herein, the term position "M" also refers to a shift position for a manual shift running mode (manual mode) to be selected in a control pattern for the shifting mechanism 10 to execute manual shift control.

Thus, with the illustrated embodiment, the shifting mechanism 10 (the differential portion 11, the power distributing mechanism 16) can be selectively switched to the continuously variable shifting state (differential state) and the non-continuously variable shifting (step variable shifting state, locked state). In particular, the switching control means 50 determines the shifting state for the differential portion 11 to be switched based on the vehicle condition, upon which the differential portion 11 is selectively switched to either the continuously variable shifting state or the non-continuously variable shifting state (step variable shifting state).

In the step variable shifting state of the differential portion 11, the hybrid control means 52 can not perform the shifting of the differential portion 11 in synchronous with the shifting of the automatic shifting portion 20. This can be expressed that, in other word, with the electrical CVT function (differential operation) of the differential portion 11 by the hybrid control means 52, the variation the engine rotation speed $N_E$ is suppressed, that is for example is maintained in the predetermined value, before and after the shifting. For this reason, upon the shifting of the automatic shifting portion 20 in the step variable shifting state of the differential portion 11, the rotation speed $N_{18}$ of the transmitting member 18 or the engine rotation speed $N_E$ stepwise changes, to thereby cause the shifting shock.

In the illustrated embodiment, during the shifting of the automatic shifting portion 20, the shifting mechanism 10 performs the shifting so as to minimize the occurrence of the shifting shocks not only in one case with the differential portion 11 placed in the continuously variable shifting state of but also in the other case with the differential portion 11 placed in the step variable shifting state. Hereunder, such a shifting operation will be described below in detail.

Turning back to FIG. 5, when the execution of the shifting of the automatic shifting portion 20 is determined, the differential state determining means 80 determines whether or not the power distributing mechanism 16 is placed in the differential state, that is the differential portion 11 is placed in the continuously variable shifting state. As used herein, the phrase "the execution of the shifting is determined" refers to a case in which, for instance, the step variable shift control means 54 determines a gear position to be shifted in the automatic shifting portion 20 based on a vehicle condition by referring to a shifting diagram shown in FIG. 6.

For instance, the differential state determining means 80 determines whether or not the differential portion 11 is placed in the continuously variable shifting state, depending on whether or not a continuously variable control region is present for placing the shifting mechanism 10 in the continuously variable shifting state, based on the vehicle condition represented by a vehicle speed V and output torque $T_{OUT}$ by referring to the shifting diagram shown in FIG. 6. FIG. 6 shows the shifting diagram for the switching control means 50 to determine whether or not the shifting mechanism 10 is placed in a step variable control region for the shifting mechanism 10 to be controllably switched to the step variable shifting state or the continuously variable shifting region for the shifting mechanism 10 to be controllably switched to the continuously variable shifting state.

During the operation of the step variable shift control means 54 for performing the shifting of the automatic shifting portion 20, there is likelihood in that the differential state determining means 80 determines that the differential portion 11 is placed in the continuously variable shifting state. In this case, the hybrid control means 52 executes the shifting of the differential portion 11 so as to maintain, for instance, the engine rotation speed $N_E$ at a nearly constant level such that during the inertia phase in the course of the shifting of the automatic shifting portion 20, the engine rotation speed $N_E$ continuously varies due to the differential action, that is the electrically controlled continuously variable shifting action of the differential portion 11. For instance, the hybrid control means 52 varies the gear ratio γ of the differential portion 11 in a direction opposite to that in which the gear ratio γ is varied during the inertia phase in the course of the shifting of the automatic shifting portion 20.

Inertia phase initiation determining means 82 determines whether or not the inertia phase is initiated in the course of the shifting of the automatic shifting portion 20. The determination depends on, for instance, whether or not the step variable shift control means 54 determines the shifting of the automatic shifting portion 20 upon which the on-disengaging side engaging device is disengaged after which the on-engaging side engaging device begins to have a engaging torque capacity accompanied by the initiation of the variation in the rotation speed of the transmitting member 18 (second electric motor M2).

For instance, the inertia phase initiation determining means 82 determines whether or not the rotation speed $N_{M2}$ of the second electric motor M2 begins to vary due to the initiation of an increase in the engaging torque capacity of the on-engaging side engaging device in the course of the shifting of the automatic shifting portion 20, effectuated by the step variable shift control means 54, depending on phenomena described below. A first phenomenon depends on whether or not the actual rotation speed $N_{18}$ of the transmitting member 18, i.e., the rotation speed $N_{M2}$ of the second electric motor M2, varies in a given variable that is preliminarily and experimentally fixed for determining whether or not the inertia phase is initiated.

A second phenomenon depends on whether or not a given time interval, preliminarily and experimentally determined as a time for the on-engaging side engaging device to begin to have the engaging torque capacity, has elapsed after the step variable shift control means 54 determines that the automatic shifting portion 20 performs the shifting. In addition, a third phenomenon depends on whether or not a engaging hydraulic pressure of the on-engaging side engaging device reaches a engaging transition hydraulic pressure (command) value Pc that is preliminarily and experimentally determined as a hydraulic pressure (command) value for the engaging torque capacity to be initiated.

Further, with the differential portion 11 placed in the continuously variable shifting state, the step variable shift control means 54 executes the shifting of the automatic shifting portion 20 so as to allow the input rotation speed $N_{IN}$ of the automatic shifting portion 20, i.e., the rotation speed $N_{18}$ of the transmitting member 18 to achieve a given variation.

More particularly, during the shifting (shift transition period) of the automatic shifting portion 20, effectuated by the step variable control means 54, when the differential state determining means 80 determines that the differential portion 11 is placed in the continuously variable shifting state, engaging pressure control means 84 controls the engaging pressure. That is, the engaging pressure control means 84 controls a control variable of the engaging device, associated with the shifting of the automatic shifting portion 20, for use in the hydraulic pressure command (shifting output) to be output to a hydraulic control circuit 42 by the step variable shift control means 54 for performing the shifting such that the rotation speed $N_{18}$ of the transmitting member 18 establishes the given variation.

As used herein, the term "the given variation" for the rotation speed $N_{18}$ of the transmitting member 18 refers to a varying state, i.e., for instance, a given varying rate that is preliminarily and experimentally obtained. That is, the given variation, preliminarily obtained so as to allow the rotation speed $N_{18}$ of the transmitting member 18 to lie in an idealistic state uniquely determined with the vehicle speed V and the gear ratio γ of the automatic shifting portion 20, is defined with, for instance, a percentage change $N_{18}'$ ($=dN_{18}/dt$) of the rotation speed $N_{18}$ of the transmitting member 18. It is regarded to be a comfortable feeling in a shifting response with an increase in a rotation speed percentage change $N_{18}'$ and it is regarded to have an ease of suppressing the shifting shocks in a slow shifting response with a decrease in the rotation speed percentage change $N_{18}'$.

Further, with the differential portion 11 placed in the step variable shifting state, the step variable shift control means 54 executes the shifting of the automatic shifting portion 20 so as to allow the rotation speed $N_{18}$ of the transmitting member 18, or the engine rotation speed $N_E$ to achieve a given variation.

More particularly, during the shifting of the automatic shifting portion 20, effectuated by the step variable control means 54, when the differential state determining means 80 determines that the differential portion 11 is placed in the step variable shifting state, engaging pressure control means 84 controls the engaging pressure. That is, the engaging pressure control means 84 controls a control variable of the engaging device, associated with the shifting of the automatic shifting portion 20, for use in the hydraulic pressure command (shifting output) to be output to a hydraulic control circuit 42 by the step variable shift control means 54 for performing the shifting such that the rotation speed $N_{18}$ of the transmitting member 18 or the engine rotation speed $N_E$ establishes the given variation.

As used herein, the term "the given variation" for the engine rotation speed $N_E$ similar to the rotation speed $N_{18}$ of the transmitting member 18 refers to a varying state, i.e., for instance, a given varying rate that is preliminarily and experimentally obtained. That is, the given variation, preliminarily obtained so as to allow the engine rotation speed $N_E$ to lie in an idealistic state uniquely determined with the vehicle speed V and the gear ratio γ of the automatic shifting portion 20 in the non-differential state of the differential portion 11, is defined with, for instance, a percentage change $N_E'$ ($=dN_E/dt$) of the engine rotation speed $N_E$. It is regarded to be a comfortable feeling in a shifting response with an increase in a rotation speed percentage change $N_E'$ and it is regarded to have an ease of suppressing the shifting shocks in a slow shifting response with a decrease in the engine rotation speed percentage change $N_E'$.

In the illustrated embodiment, meanwhile, with the differential portion 11 placed in the continuously variable shifting state during the operation of the step variable shift control means 54 executing the shifting of the automatic shifting portion 20, the hybrid control means 52 allows the differential portion 11 to perform the shifting so as to continuously vary the engine rotation speed $N_E$ on the stage before and after the shifting of the automatic shifting portion 20 such that, for instance, the engine rotation speed $N_E$ is maintained at a nearly constant level. This suppresses the occurrence of the shifting shocks and provides improved fuel consumption.

When this takes place, there is likelihood in that a target value of the total gear ratio γT is caused to significantly vary on the stage before and after the shifting of the automatic shifting portion 20. Even under such a situation, since the total gear ratio γT continuously varies, once the differential portion 11 executes the shifting so as to maintain the engine rotation speed $N_E$ at the nearly constant level on the stage before and after the shifting of the automatic shifting portion 20, the differential portion 11 further executes the shifting so as to allow the total gear ratio γT to continuously vary toward the target total gear ratio γT. In such a case, however, there is an idea that the user can have a more comfortable feeling when varying the total gear ratio γT step-by-step (in a non-continuous manner) with improved shifting response rather than continuously varying the total gear ratio γT.

In a case where the automatic shifting portion 20 performs the shifting with a variation in vehicle speed V as shown by a transition a↔b indicated by a solid line B in FIG. 6, less variation or almost no variation takes place in the total gear ratio γT on the stage before and after the shifting of the automatic shifting portion 20. Accordingly, it is favorable to minimize the shifting shocks or provide improved fuel consumption rather than to have improved shifting response.

However, if the automatic shifting portion 20 performs the shifting with a variation in demanded output torque $T_{OUT}$ caused by, for instance, a rapid depression or rapid release of an accelerator pedal as shown by a transition c↔d indicated a solid line C in FIG. 6, the total gear ratio γT varies in a greater varying width on the stage before and after the shifting of the automatic shifting portion 20 than that in which the total gear ratio γT varies along the solid line B. Accordingly, there is an idea that it is preferable to change the total gear ratio γT step-by-step (in the non-continuous manner) to have improved shifting response rather than to continuously vary the total gear ratio γT on the stage before and after the shifting of the automatic shifting portion 20 for obtaining minimized shifting shocks to have improved fuel consumption.

Therefore, if less variation or almost no variation occurs in the varying width of the total gear ratio γT on the stage before and after the shifting of the automatic shifting portion 20, the total gear ratio γT may be continuously varied on the stage before and after the shifting to obtain the minimized shifting shocks and improved fuel consumption rather than to obtain the improved shifting response. In addition, if the total gear ratio γT varies in a significantly increased varying width on the stage before and after the shifting of the automatic shifting portion 20, then, the total gear ratio γT may be caused to skip so as to interrupt the occurrence of a continuous change in the total gear ratio γT on the stage before and after the shifting, that is, to vary the gear ratio step-by-step.

From another point of view, in a case where the accelerator pedal is rapidly depressed or rapidly released to cause a significant increase in the varying width of the total gear ratio γT on the stage before and after the shifting of the automatic shifting portion 20, it seems to be comfortable for the user to have a so-called skipped shifting in which the total gear ratio γT skips step-by-step. From the foregoing reasons, the total gear ratio γT may be preferably skipped upon using a stepwise variation in the gear ratio γ of the automatic shifting portion 20.

More particularly, when the differential state determining means 80 determines that the differential portion 11 is placed in the continuously variable shifting state and the total gear ratio γT varies in an increased varying width during the operation of the step variable control means 54 for the shifting of the automatic shifting portion 20 to be executed, the hybrid control means 52 performs, in addition to the function mentioned above, a control as described below. That is, the hybrid control means 52 allows the differential portion 11 to vary the gear ratio γ depending on the variation in the gear ratio γ in synchronism with the shifting of the automatic shifting portion 20 with no occurrence of a continuous change in the total gear ratio γT.

Instead of such an operation, the differential portion 11 solely executes the shifting independently of the shifting of the automatic shifting portion 20, that is, in non-synchronism with the shifting thereof, thereby varying the total gear ratio γT toward a target value thereof. This enables the total gear ratio γT to be varied toward the target value upon utilizing the stepwise change in gear ratio of the automatic shifting portion 20 so as to add a change in gear ratio of the differential portion 11 to (or subtract the same from) such a stepwise change in gear ratio. This allows the total gear ratio γT to be varied step-by-step on the stage before and after the shifting of the automatic shifting portion 20 with a resultant improvement in a shifting response.

For instance, the expression "the total gear ratio γT varies in an increased varying width" refers the targeted total gear ratio γT with the varying width exceeding a given variable due to the accelerator pedal being rapidly depressed or rapidly released as shown by the transition c↔d indicated by the solid line C in FIG. 6. This is supposed to be a case wherein the so-called skipped shifting occurs with the total gear ratio γT varying in the non-continuous manner, i.e., skipping stepwise. As used herein, the term "given variable" refers to a value, preliminarily and experimentally obtained, which is deemed to be preferable for the user to cause the targeted total gear ratio γT not to continuously vary but to vary stepwise (that is, in non-continuous manner).

In a case where the execution on the shifting of the automatic shifting portion 20 is determined, gear ratio change determining means 86 determines the presence of a change in the total gear ratio γT when, for instance, the step variable shift control means 54 determines a gear position to be shifted in the automatic shifting portion 20 based on the vehicle condition by referring to the shifting diagram shown in FIG. 6.

In a case where the execution of the shifting of the automatic shifting portion 20 is determined, the accelerator pedal is deeply depressed or released in a manner as shown by the transition c↔d on the solid line C in FIG. 6 to allow the targeted total gear ratio γT to vary in the varying width exceeding the given variable. When this takes place, the gear ratio change determining means 86 determines whether or not the so-called skipped shifting is present with the total gear ratio γT varying in the non-continuous manner, i.e., skipping stepwise.

If the gear ratio change determining means 86 determines that no skipped shifting is present, then, the hybrid control means 52 executes the shifting of the differential portion 11 so as to continuously vary the engine rotation speed $N_E$ on the stage before and after the shifting. In contrast, if the determination is made that the skipped shifting is present, then, the hybrid control means 52 executes the shifting of the differential portion 11 independently of the shifting of the automatic shifting portion 20.

Further, even if the gear ratio change determining means 86 determines that no skipped shifting is present or that the skipped shifting is present, the step variable control means 54 executes the shifting of the automatic shifting portion 20 with the differential portion 11 placed in the continuously variable shifting state so as to allow the rotation speed $N_{18}$ of the transmitting member 18 to achieve the given variation.

More particularly, if the differential state determining means 80 determines that the differential portion 11 is placed in the continuously variable shifting state, the engaging pressure control means 84 performs a control, as described below, so as to allow the rotation speed $N_{18}$ of the transmitting member 18 to achieve the given variation during the operation of the step variable shift control means 54 for executing the shifting of the automatic shifting portion 20, regardless of the determining result as to whether or not the gear ratio change determining means 86 determines that the skipped shifting is present. That is, the operation is executed to control the engaging pressure of the engaging device, associated with the shifting of the automatic shifting portion 20, for use in the engaging command (shifting output) to be output from the step variable shift control means 54 to the hydraulic control circuit 42.

Thus, with the differential portion 11 placed in the non-continuously variable shifting state, the rotation speed $N_{18}$ of the transmitting member 18 and the engine rotation speed $N_E$ are uniquely determined with the vehicle speed V and the gear ratio γ of the automatic shifting portion 20. To this end, the engaging pressure control means 84 controls the engaging pressure of the engaging device so as to allow the rotation speed $N_{18}$ of the transmitting member 18 and the engine rotation speed $N_E$ to achieve the given variations. However, when the differential portion 11 is placed in the continuously variable shifting state, the engine rotation speed $N_E$ lies in a freely rotating state due to the differential action of the differential portion 11. Therefore, the engaging pressure of the engaging device is controlled such that the rotation speed $N_{18}$ of the transmitting member 18, uniquely determined with the vehicle speed V and the gear ratio γ of the automatic shifting portion 20, achieves the given variation.

Torque-down control means 88 performs operations to decrease torque to be transferred to the drive wheels 38. Such operations include: throttling the opening of an electronic control throttle valve 94; decreasing a fuel quantity to be supplied by a fuel injection device 96; and initiating an ignition device 98 for retarding an ignition timing of the engine 8. Thus, with the engine torque down control executed for decreasing engine torque $T_E$, reductions occur in torque, transferred to the drive wheels 38, such as for instance input torque $T_{IN}$ or output torque $T_{OUT}$ of the automatic shifting portion 20. Moreover, the torque down control means 88 executes a motor torque down control in addition to the engine torque down control or in independent manner.

During the motor torque down control, the inverter 58 controls the second electric motor M2 so as to temporarily generate reverse drive torque and to allow the second electric motor M2 to temporarily generate reverse drive torque or regenerative braking torque for the charging of the electric storage device 60 to be performed. This results in a reduction in torque transferred to the drive wheels 38.

Now, description is made of a case where the switching control means 50 switches the differential portion 11 (shifting mechanism 10) to the step variable shifting state to cause a whole of the shifting mechanism 10 to function as the step variable automatic transmission. In this case, if the step variable shift control means 54 executes, for instance, the up shifting in the automatic shifting portion 20, the input rotation speed $N_{IN}$ of the automatic shifting portion 20, i.e., the rotation speed $N_{18}$ of the transmitting member 18 vary (in the so-called inertia phase) with the occurrence of the up shifting in the source of the shifting. In the inertia phase, the engine 8 temporarily releases energy with a decrease in the engine rotation speed $N_E$. This results in a torque increment in torque, transferred to the drive wheels 38, such as, for instance, a torque increment of input torque $T_{IN}$ or torque increment of output torque $T_{OUT}$ (in so-called inertia torques). Such inertia torques result in likelihood of the occurrence of shifting shocks.

Alternately, for instance, if the step variable shift control means 54 executes the shifting of the automatic shifting portion 20, the inertia phase occurs in the course of the shifting. This results in a reduction in the rotation speed of the second rotary element RE2 or the third rotary element RE3 of the differential portion 11 and/or a reduction in the rotation speed of at least one of the fourth rotary element RE4 to the eighth rotary element RE8 of the differential portion 11. This leads to likelihood of the shifting shocks occurring due to inertia torque appearing as the torque increment in torque transferred to the drive wheels 38.

Description is made of a case in which the switching control means 50 switches the shifting mechanism 10 to the continuously variable shifting state to render a whole of the shifting mechanism 10 operative to function as the continuously variable shifting portion. In this case, the step variable shift control means 54 executes the shifting of the automatic shifting portion 20. This allows the hybrid control means 52 to execute the shifting of the differential portion 11 and, in the course of such a shifting, almost no variation takes place in the engine rotation speed $N_E$ or the variation in the engine rotation speed $N_E$ is minimized. The differential portion 11 performs the shifting such that no variation takes place in the total gear ratio γT of the shifting mechanism 10 on the stage before and after the shifting of the automatic shifting portion 20, or such a variation is minimized and made to be continuous.

Even in such a case, however, as the shifting of the automatic shifting portion 20 is performed, the inertia phase appears in the course of the shifting. When this takes place, inertia torque occurs as torque increases of torque transferred to the drive wheels 38. This results in likelihood of the shifting shocks occurring due to inertia torque arising as the torque increments in torque transferred to the drive wheels 38. The torque increments are transferred with decreases in the rotation speeds of the second and third rotary elements RE2 and RE3 of the differential portion 11 and/or a decrease in the rotation speed of at least one rotary element of the rotary elements forming the fourth rotary elements RE4 to the eighth rotary elements RE8 of the automatic shifting portion 20.

Therefore, the torque down control means 88 decreases torque, such as for instance input torque $T_{IN}$ or output torque $T_{OUT}$ of the automatic shifting portion 20, to be transferred to the drive wheels 38 during the operation of the step variable shift control means 54 for executing the shifting of the automatic shifting portion 20. In particular, the torque down control means 88 executes the engine torque down control and the motor torque down control in isolation or in combination thereof for thereby decreasing torque to be transferred to the drive wheels 38. This is because the torque increment, corresponding to the inertia torque, is cancelled in input torque $T_{IN}$ or output torque $T_{OUT}$ to some extents for suppressing the shifting shocks resulting from the inertia torque. The torque down control means 88 may execute the reduction in torque transferred to the drive wheels 38, during the inertia phase in the course of the shifting of the automatic shifting portion 20 at the same timing as that at which the hybrid control means 52 initiates the synchronizing control in the differential portion 11.

Further, the torque down control means 88 performs the operation, in place of the function described above or in addition thereto, for decreasing torque transferred to the drive wheels 38 during the operation of the step variable shift control means 54 for executing the shifting of the automatic shifting portion 20. This cancels a fluctuation in torque, resulting from the engaging device being completely engaged in the automatic shifting portion 20, to some extent for thereby minimizing the engaging shock.

Thus, the torque down control means 88 decreases input torque $T_{IN}$ with a resultant suppression of the shifting shocks. Such a reduction in input torque $T_{IN}$ is executed so as to cancel inertia torque arising from the fluctuation in the rotation speed of the rotary element forming the automatic shifting portion 20 caused by the shifting thereof, and the torque increment corresponding to the inertia torque resulting from the fluctuation in the rotation speed of the rotary element inside the differential portion 11, which involves the fluctuation in the engine rotation speed $N_E$. In parallel to such an operation or in isolation therefrom, the fluctuation in torque resulting from the engaging device being completely engaged in the automatic shifting portion 20, is cancelled to some extent for thereby suppressing the shifting shocks.

Further, the hybrid control means 52 may perform a function, besides the function described above, to serve as rotation control means for positively (forcibly) varying the rotation speed $N_{18}$ of the transmitting member 18 using the motor M1 and/or the second electric motor M2. This is because the rotation speed $N_{18}$ of the transmitting member 18 achieves the given variation during the operation of the step variable shift control means 54 for executing the shifting of the automatic shifting portion 20.

Sometimes the rotation speed $N_{18}$ of the transmitting member 18 varies with the shifting of the automatic shifting portion 20 which is initiated with the use of the engaging pressure controlled with the engaging pressure control means 84 so as to allow the rotation speed $N_{18}$ of the transmitting member 18 to achieve the given variation. In contrast to such an affect, the illustrated embodiment has a capability of compelling the rotation speed $N_{18}$ of the transmitting member 18 to be further closer to the given variation.

Here, the engaging pressure control means 84 controls the engaging pressure of the engaging device, associated with the shifting of the automatic shifting portion 20, for use in the hydraulic pressure command (shifting output) to be outputted to the hydraulic pressure control circuit 42 by the step variable shift control means 54. This is because the rotation speed $N_{18}$ of the transmitting member 18 achieves the given variation with the differential portion 11 placed in the continuously variable shifting state during the operation of the step variable shift control means 54 for executing the shifting of the automatic shifting portion 20 or the rotation speed $N_{18}$ of the transmitting member 18 or the engine rotation speed $N_E$ achieves the given variation with the differential portion 11 placed in the non-continuously variable shifting state.

The engaging pressure control means 84 executes the operation so as to achieve, for instance, the given variation upon learning the engaging pressure of the engaging device. As set forth above, with the differential portion 11 placed in the continuously variable shifting state, the engine rotation speed $N_E$ is kept under the freely rotating state due to the differential action of the differential portion 11. With the differential portion 11 placed in the continuously variable shifting state, the engaging pressure control means 84 learns the engaging pressure of the engaging device so as to allow the rotation speed $N_{18}$ of the transmitting member 18, uniquely determined with the vehicle speed V and the gear ratio γ of the automatic shifting portion 20, to achieve the given variation. The operation of the engaging pressure control means 84 for learning the engaging pressure will be described below in detail.

The engaging pressure control means 84 includes engaging pressure learning control means 100 acting as engaging pressure learning control means for learning the engaging pressure of the engaging device so as to achieve the given variation, learning control determining means 102 for determining whether or not the engaging pressure of the engaging device is learned, and learned value selecting means 104 for selecting a learned value for the engaging pressure of the engaging device for use in the shifting of the automatic shifting portion 20. Thus, the shifting results of the automatic shifting portion 20 are learned and the engaging pressures of the automatic shifting portion 20 for a subsequent cycle are corrected with corrected values being stored as hydraulic pressure learned value maps (control-variable learned value maps) on the engaging pressures of the engaging device as shown in FIG. 11.

FIG. 11 shows examples of the hydraulic pressure learned value maps, which are classified in up-shifting maps and down-shifting maps with FIG. 11A showing the up-shifting map and FIG. 11B showing the down-shifting map. The hydraulic pressure learned value maps, shown in FIG. 11, are divided in hierarchies (in distinction) based on magnitudes 1 to 7 of engine torque, respectively, and include respective hydraulic pressure learned values identified for a kind of gear positions such as "1→2" gear ratio and "2→3" gear ratio, etc., respectively.

For instance, in the up-shifting in "1→2" gear ratio with engine torque "1", the on-disengaging side engaging device has a hydraulic pressure learned value of "Pb3u121" and the on-engaging side engaging device has a hydraulic pressure learned value of "Pb2u121". In addition, the hydraulic pressure learned value maps are obtained as default values on the respective hydraulic pressure learned values preliminarily acquired on experiments and stored in, for instance, storage means 56 with the default values being rewritten to hydraulic pressure learned values with a progress of the learning executed by the engaging pressure learning control means 100. The engaging pressure learning control means 100 calculates engine torque based on the relationship, preliminarily and experimentally obtained, between the engine rotation speed $N_E$, varying on for instance a throttle valve opening $\theta_{TH}$ as a parameter, and estimated engine torque $T_E'$. The calculation is executed based on an actual throttle opening $\theta_{TH}$ and the engine rotation speed $N_E$.

Shift completion determining means 106 determines whether or not the step variable shift control means 54 completes the shifting of the automatic shifting portion 20. Such a determination depends on whether or not a given shift time, preliminarily and experimentally obtained, of the automatic shifting portion 20 has elapsed or whether or not an actual rotation speed $N_{18}$ of the transmitting member 18 is brought into synchronism with the rotation speed $N_{18}$ of the transmitting member 18 (that is, the rotation speed $N_{18}$ of the transmitting member 18 uniquely determined with the vehicle speed V and a subsequent gear ratio γ of the automatic shifting portion 20 appearing after the shifting thereof) resulting after the shifting.

Learning precondition establishment determining means, i.e., establishment determining means 108 determines whether or not a learning precondition is established for the engaging pressure learning control means 100 to learn the engaging pressure. For instance, the establishment determining means 108 determines whether or not the learning precondition is established depending on whether or not the shifting is normally executed and completed under a condition wherein: the fluctuation in engine torque falls in a given range during the shifting of the automatic shifting portion 20; the engine 8 has an engine water temperature $TEMP_w$ representing a complete warm-up of the engine 8; and an actuating oil temperature of the automatic shifting portion 20 falls in a predetermined appropriate value. As used herein, the expression "the given range in the fluctuation in engine torque" refers to a predetermined determination value representing that engine torque, appearing during the shifting, is present in any one of the hierarchies indicated in terms of the engine torques 1 to 7 in the hydraulic learned value maps shown in FIG. 11.

With the differential portion 11 placed in the continuously variable shifting state during the operation of the step variable shift control means 54 for executing the shifting of the automatic shifting portion 20, the engaging pressure learning control means 100 monitors the variation in the actual rotation speed $N_{18}$ of the transmitting member 18. Alternatively, with the differential portion 11 placed in the non-continuously variable shifting state, the engaging pressure learning control means 100 monitors the variation in the actual rotation speed $N_{18}$ of the transmitting member 18 or the actual engine rotation speed $N_E$ during the shifting of the automatic shifting portion 20 for comparison to the given variation.

Further, the engaging pressure learning control means 100 executes the learning control for correcting the engaging pressure of the engaging device so as to minimize a difference between the actual variation in the rotation speed and a given variation in a subsequent shifting operation. That is, the engaging pressure learning control means 100 makes an adjustment to increase or decrease the engaging pressure of the engaging device used in an immediately preceding shifting operation so as to achieve the given variation on a subsequent shifting cycle. Further, the engaging pressure learning control means 100 allows, in the hydraulic pressure learned value map shown in FIG. 11, the hydraulic pressure values, corresponding to engine torque and a kind of the shifting during the shifting, which are targeted to be learned, to be written to hydraulic pressures subsequent to the engaging pressures being corrected (after the regulation) on a current learning control for storage as new learned values.

During the operation of the step variable shift control means 54 for executing the shifting of the automatic shifting portion 20, sometimes the hybrid control means 52, acting as the rotation control means, varies the rotation speed $N_{18}$ of the transmitting member 18 so as to achieve the given variation using the first electric motor M1 and/or the second electric motor M2. In this case, the engaging pressure learning control means 100 inhibits the learning of the engaging pressure of the engaging device with no learning operation to be performed.

That is, forcibly varying the rotation speed $N_{18}$ of the transmitting member 18 using the first electric motor M1 and/or the second electric motor M2 allows the rotation speed $N_{18}$ of the transmitting member 18 to vary in a way closer to the given variation. This results in a learned value with a lessened corrected value in the engaging pressure during the learning control executed by the engaging pressure learning control means 100. It is considered that with no rotation speed $N_{18}$ of the transmitting member 18 being forcibly varied using the first electric motor M1 and/or the second electric motor M2, executing the shifting using such a learned value results in an increase in a difference between the variation in the actual rotation speed $N_{18}$ of the transmitting member 18 and the given variation by a forcibly increased variable using the first electric motor M1 and/or the second electric motor M2. For this reason, the engaging pressure learning control means 100 does not execute the leaning on the engaging pressure of the engaging device when the rotation speed $N_{18}$ of the transmitting member 18 is forcibly changed using the first electric motor M1 and/or the second electric motor M2.

Alternately, during the operation of the step variable shift control means 54 for executing the shifting of the automatic shifting portion 20, the hybrid control means 52, acting as the rotation control means, varies the rotation speed $N_{18}$ of the transmitting member 18 so as to achieve the given variation using the first electric motor M1 and/or the second electric motor M2, during which the engaging pressure learning control means 100 performs controls as described below. In place of performing the learning on the engaging pressure of the engaging device, the engaging pressure learning control means 100 learns the engaging pressure of the engaging device on consideration of the rotation speed $N_{18}$ of the transmitting member 18 being varied using the first electric motor M1 and/or the second electric motor M2.

That is, under a situation where no rotation speed $N_{18}$ of the transmitting member 18 is forcibly varied using the first electric motor M1 and/or the second electric motor like the situation under which no engaging pressure of the engaging device is learned, if the shifting is executed using such a learned value, an issue is deemed to arise as described below. Such an issue appears in an increase in a difference between the variation in the actual rotation speed $N_{18}$ of the transmitting member 18 and the given variation due to the forcible variable component caused by the use of the first electric motor M1 and/or the second electric motor M2. With the rotation speed $N_{18}$ of the transmitting member 18 caused to forcibly change with the use of the first electric motor M1 and/or the second electric motor M2, the engaging pressure learning control means 100 allows the engaging pressure of the engaging device to be learned in consideration of such a forcible variable component, i.e., in other words, upon subtracting such a forcible variable component.

In the illustrated embodiment, the shifting mechanism 10 has states in three modes depending on: whether or not the differential portion 11 is placed in the continuously variable shifting state with the step variable shift control means 54 executing the shifting of the automatic shifting portion 20; or whether the total gear ratio $\gamma T$ continuously varies or varies in the skipped shifting with the differential portion 11 placed in the continuously variable shifting state.

An inertia mass, as viewed the engine 8 from the automatic shifting portion 20, takes different values during the shifting depending on the continuously variable shifting state or the non-continuously variable shifting state of the differential portion 11 during the shifting of the automatic shifting portion 20. In the continuously variable shifting state, the rotation speed $N_{18}$ of the transmitting member 18 is caused to freely vary due to the differential action, regardless of the variation in the rotation speed $N_{18}$ of the transmitting member 18. In the non-continuously variable shifting state, the engine rotation speed $N_E$ is caused to vary with the variation in the rotation speed $N_{18}$ of the transmitting member 18. In other words, with the differential portion 11 placed in the non-continuously variable shifting state, the engine rotation speed $N_E$ varies with the inertia increasing to be greater during the shifting than that appearing in the continuously variable shifting state.

With the differential portion 11 placed in the continuously variable shifting state, the varying widths of the engine rotation speed $N_E$ and the rotation speed of the rotary member forming the differential portion 11 are different from each other depending on whether the total gear ratio $\gamma T$ continuously varies or the total gear ratio $\gamma T$ varies in the skipped shifting. With the total gear ratio $\gamma T$ varying in the skipped shifting with an increased variation in the engine rotation speed $N_E$, there is sometimes a greater inertia torque than that occurring when the total gear ratio $\gamma T$ continuously varies with, for instance, the rotation speed $N_{M1}$ of the first electric motor M1 varied to suppress the variation in the engine rotation speed $N_E$.

Accordingly, it is conceived that the engaging pressure of the engaging device forming the automatic shifting portion 20 for the given variation to be achieved has different values depending on the three modes in status of the shifting mechanism 10. Thus, in shifting of the automatic shifting portion 20, the engaging pressure learning control means 100 is required to execute the learning control on the engaging pressure in consideration to which of the three modes the state of the shifting mechanism 10 is related.

To this end, the engaging pressure learning control means 100 discriminates the hydraulic pressure learned values on the engaging pressure of the engaging device based on whether or not the differential portion 11 is placed in the continuously variable shifting state during the operation of the step variable shift control means 54 for executing the shifting of the automatic shifting portion 20. In addition, with the differential portion 11 placed in the continuously variable shifting state during the shifting of the automatic shifting portion 20, the engaging pressure learning control means 100 discriminates the hydraulic pressure learned values on the engaging pressure of the engaging device based on whether the variation of the total gear ratio $\gamma T$ belongs to the continuous variation or to the skipped shifting.

For instance, under a circumstance where during the operation of the step variable shift control means 54 for executing the shifting of the automatic shifting portion 20, the differential portion 11 is placed in the continuously variable shifting state and the variation of the total gear ratio $\gamma T$ belongs to the continuous variation, the engaging pressure learning control means 100 organizes a currently incident learned value as a pattern "A". Further, under another circumstance where the differential portion 11 is placed in the continuously variable shifting state and the variation of the total gear ratio $\gamma T$ belongs to the skipped shifting, the engaging pressure learning control means 100 organizes another currently incident learned value as a pattern "B".

Furthermore, under another circumstance where the differential portion 11 is placed in the non-continuously variable shifting state, the engaging pressure learning control means 100 organizes another currently incident learned value as a pattern "C". As a result, the patterns "A", "B" and "C" are stored as the hydraulic pressure learned value maps as shown in FIG. 11 in the three modes of the shifting mechanism 10 for the shifting of the automatic shifting portion 20.

The hydraulic pressure learned value maps for the patterns "A", "B" and "C" have default values originally stored for the patterns "A", "B" and "C" upon which the learning control is executed to rewrite the default values to related learned values for storage. The default values of the patterns "A", "B" and "C" are preliminarily and experimentally determined in consideration of the status of the shifting mechanism 10 during the shifting thereof.

For instance, the default value in the pattern "C", corresponding to the non-continuously variable shifting state of the differential portion 11 with an increase in the inertial mass during the shifting, is set such that the hydraulic pressure of the on-engaging side engaging device is higher than those of the on-engaging side engaging device in the patterns "A" and "B" corresponding to the continuously variable shifting state of the differential portion 11. This allows the on-engaging side engaging device to have an appropriate engaging torque capacity during the shifting of the automatic shifting portion 20. Moreover, the default value in the pattern "B", corresponding to the total gear ratio γT belonging to the skipped shifting with likelihood of an increase in inertia torque during the shifting, is set such that the hydraulic pressure of the on-engaging side engaging device is set to be further higher than that of the on-engaging side engaging device in the pattern "A" corresponding to the total gear ratio γT belonging to the continuous variation.

Thus, the engaging pressure learning control means 100 organizes the hydraulic pressure learned value maps as the patterns "A", "B" and "C" to be stored for the three modes of the shifting mechanism 10 during the shifting of the automatic shifting portion 20, respectively. From another point of view, during the shifting of the automatic shifting portion 20, the engaging device of the automatic shifting portion 20 needs to have different engaging pressures depending on which of the three modes is related to the status of the shifting mechanism 10. Therefore, the engaging pressure learning control means 100 learns the different engaging pressures of the engaging device for the three modes of the shifting mechanism 10, respectively, so as to obtain the hydraulic pressure learned value maps for the patterns "A", "B" and "C", respectively, for the three modes of the shifting mechanism 10, respectively. Thus, it can be said that methods of learning the hydraulic pressure learned values on the engaging pressure of the engaging device are altered based on the three modes of the shifting mechanism 10.

That is, the learning needs to be established on respective premises: one premise is that for the patterns "A" or "B" to be learned, at least the differential portion 11 is placed in the continuously variable shifting state; and the other premise is that for the pattern "C" to be learned, at least the differential portion 11 is placed in the non-continuously variable shifting state. Therefore, during the operation of the step variable shift control means 54 for executing the shifting of the automatic shifting portion 20, the engaging pressure learning control means 100 alters the method of learning the hydraulic pressure learned value on the engaging pressure of the engaging device, depending on whether or not the differential portion 11 is placed in the continuously variable shifting state.

Further, for the pattern "A" to be learned, it is a premise for the learning to be established that with at least the differential portion 11 placed in the continuously variable shifting state, the variation of the total gear ratio γT belongs to the continuous variation. Furthermore, for the pattern "B" to be learned, it is a premise for the learning to be established that with at least the differential portion 11 placed in the continuously variable shifting state, the variation of the total gear ratio γT belongs to the non-continuous variation, i.e., the skipped shifting. To this end, with the differential portion 11 placed in the continuously variable shifting state during the operation of the step variable shift control means 54 for executing the shifting of the automatic shifting portion 20, the engaging pressure learning control means 100 alters the method of learning the hydraulic pressure learned value of the engaging pressure of the engaging device depending on whether or not the variation of the total gear ratio γT belongs to the continuous variation or the skipped shifting.

During the operation of the step variable shift control means 54 for executing the shifting of the automatic shifting portion 20, the learned value selecting means 104 selects the hydraulic pressure learned value, organized and stored by the engaging pressure learning control means 100 as the patterns "A", "B" and "C", based on the state of the shifting mechanism 10 during the shifting of the automatic shifting portion 20. At the same time, the engaging pressure learning control means 100 selects the learned value on the engaging pressure of the engaging device for use in the automatic shifting portion 20 based on engine torque $T_E$ and the kind of the shifting.

However, it is not necessarily the case that the engaging pressure learning control means 100 executes the learning on a whole of the predetermined default values for the hydraulic pressure learned value maps on the patterns "A", "B" and "C". In view of this, if the selection is made of the default value which is not yet learned with the learned value selecting means 104 does as the learned value on the engaging pressure of the engaging device, the engaging pressure learning control means 100 corrects the relevant default value based on a already learned learning values distinguished by the same engine torque and the kind of gear positions in the different hydraulic pressure learned value maps. Hereunder, such a control action will be described below with reference to the three modes of the shifting mechanism 10 initiated during the shifting of the automatic shifting portion 20.

During the shifting of the automatic shifting portion 20, sometimes the hydraulic pressure learning map (pattern "A" or pattern "B") used in the differential portion 11 placed in the continuously variable shifting state belongs to an unlearned default value "A", and the hydraulic pressure learning map (pattern "C") for use in the differential portion 11 placed in the non-continuously variable shifting state belongs to the learned value "C". In this case, the engaging pressure learning control means 100 corrects the default value "A" for the continuously variable shifting state based on the learned value "C" acquired upon the learning thereof in the non-continuously variable shifting state.

On the contrary, during the shifting of the automatic shifting portion 20, sometimes the hydraulic pressure learning map (pattern "C") used in the differential portion 11 placed in the continuously variable shifting state belongs to an unlearned default value "C" and the hydraulic pressure learning map (pattern "A" or pattern "B"), for use in the differential portion 11 placed in the continuously variable shifting state, belongs to a learned value "A". In this case, the engaging pressure learning control means 100 corrects the default value "C" for the non-continuously variable shifting state based on the learned value "A" acquired upon the learning thereof in the continuously variable shifting state.

Thus, the engaging pressure learning control means 100 alters the method of learning the hydraulic pressure learned value on the engaging pressure of the engaging device, based on whether or not the differential portion 11 is placed in the continuously variable shifting state during the operation of the step variable shift control means 54 for the shifting of the automatic shifting portion 20.

Further, during the shifting of the automatic shifting portion 20, sometimes the hydraulic pressure learning map (pattern "A"), used in the differential portion 11 placed in the continuously variable shifting state and the variation of the total gear ratio γT belonging to the continuous variation, belongs to the unlearned default value "A", and the hydraulic pressure learning map (pattern "B"), for use in the differential portion 11 placed in the continuously variable shifting state with the variation of the total gear ratio γT belonging to the skipped shifting, belongs to the learned value "B". In this case, the engaging pressure learning control means 100 correct the default value "A" based on the learned value "B" acquired upon the learning.

On the contrary, during the shifting of the automatic shifting portion 20, sometimes the hydraulic pressure learning map (pattern "B"), used in the differential portion 11 placed in the continuously variable shifting state and the variation of the total gear ratio γT belonging to the skipped shifting, belongs to the unlearned default value "B", and the hydraulic pressure learning map (pattern "A"), for use in the differential portion 11 placed in the continuously variable shifting state with the variation of the total gear ratio γT belonging to the continuous variation, belongs to the learned value "A". In this case, the engaging pressure learning control means 100 corrects the default value "A" based on the default value "B" acquired upon the learning.

Thus, during the operation of the step variable shift control means 54 for the shifting of the automatic shifting portion 20, the engaging pressure learning control means 100 alters the method learning the hydraulic pressure learned value of the engaging pressure of the engaging device, based on whether or not the differential portion 11 is placed in the continuously variable shifting state and whether the variation of the total gear ratio γT belongs to the continuous variation or the skipped shifting.

More particularly, the engaging pressure learning control means 100 corrects the default value "A" for the hydraulic pressure learned values Pb3u121 and Pb2u121, distinguished by the upshift "1→2" gear ratio in engine torque 1 in the hydraulic pressure learned value map for the pattern "A", based on the default value "B" for the hydraulic pressure learned values Pb3u121 and Pb2u121, distinguished by the upshift "1→2" gear ratio in engine torque 1 in the hydraulic pressure learned value map for the pattern "B".

For instance, if the learned value "B" has a trend to be corrected in an underlapping-side, the engaging pressure learning control means 100 corrects the default value "A" toward the underlapping-side to some increment to store the corrected default value "A" as the learned value "A". In contrast, if the learned value "B" has a trend to be corrected an overlapping-side, the engaging pressure learning control means 100 corrects the default value "A" toward the overlapping-side to some increment to store the corrected default value "A" as the learned value "A". That is, no easy comparison can be made because the hydraulic pressure values are originally distinguished from each other in terms of the same engine torque and the kind of the gear positions in the patterns "A", "B" and "C". Thus, a predetermined percentage of the default values are corrected in terms of the trend in the learning for the default value "B" in the learned value "B".

The learned value selecting means 104 selects the learned value "A" as the learned value on the engaging pressure of the engaging device to be used in the shifting of the automatic shifting portion 20. In addition, if no learning is executed in the different hydraulic pressure learned value maps with no correction made on the default value A by the engaging pressure learning control means 100, the default value "A" is selected intact as the learned value on the engaging pressure of the engaging device for use in the shifting of the automatic shifting portion 20.

Thus, the engaging pressure learning control means 100 indirectly corrects the engaging pressure of the engaging device using the method of learning the hydraulic pressure learned value for correcting the default value based on the learned value for which the learning has been already executed. This correction is performed independently of the method of learning the hydraulic pressure learned value in which the engaging pressure of the engaging device is directly corrected so as to suppress a difference between an actual variation in the rotation speed and the given variation in a subsequent shifting operation. That is, it can be said that the engaging pressure learning control means 100 alters the method of learning the hydraulic pressure learned value of the engaging pressure of the engaging device, depending on the direct correction on the engaging pressure based on the actual shifting and the indirect correction on the engaging pressure based on the other learned value.

The learning control determining means 102 determines whether or not the engaging pressure learning control means 100 learns the respective default values on the respective hydraulic learned value maps for the patterns "A", "B" and "C". This determination belongs to a judgment whether or not the engaging pressure learning control means 100 already rewrites the hydraulic pressure values in the respective hydraulic learned value maps for the patterns "A", "B" and "C" to the learned values.

Figure 12:
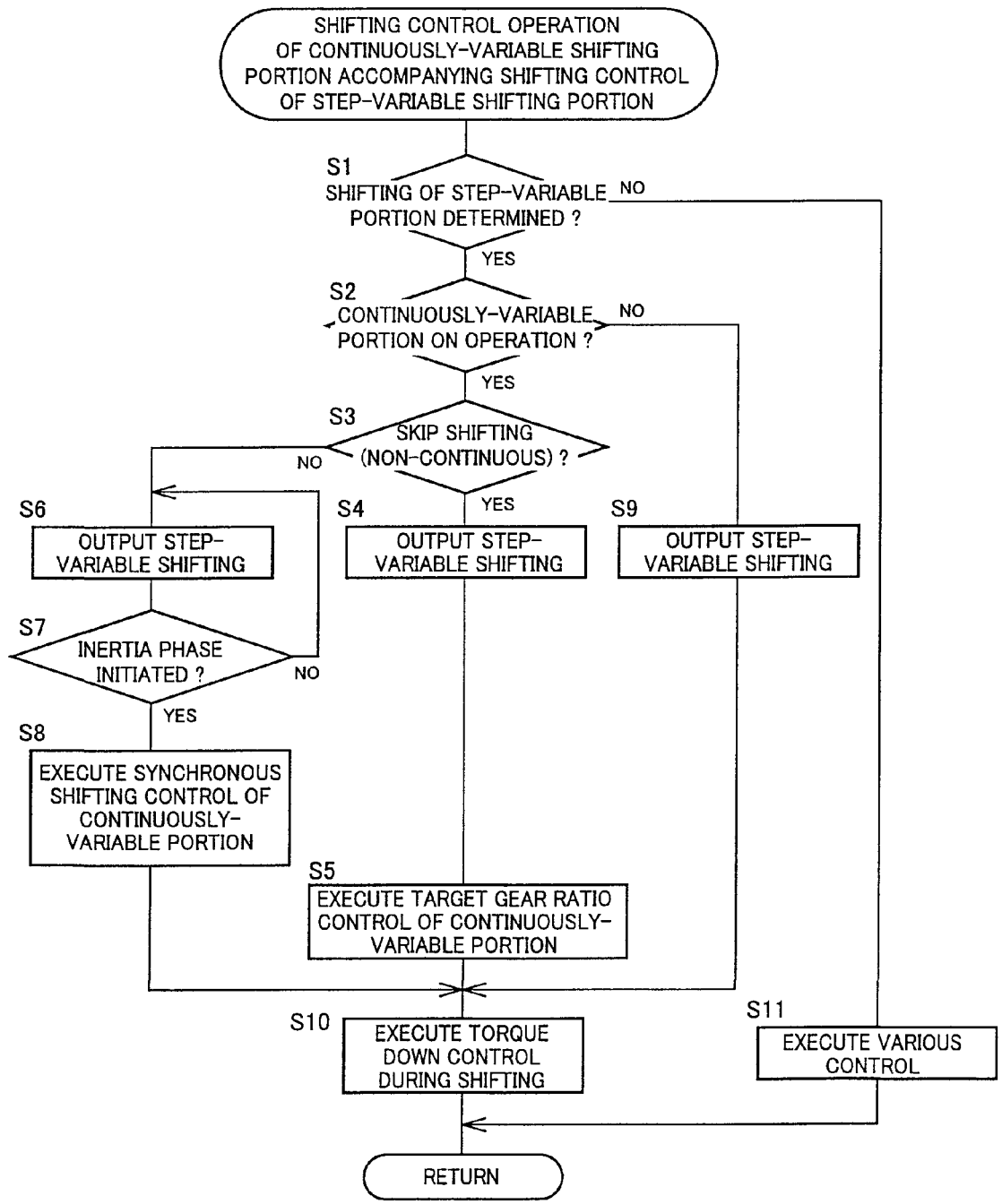
FIG. 12 is a flowchart for illustrating control operations to be executed by an electronic control device shown in FIG. 5, i.e., shifting control operations to be executed by a continuously variable shifting portion during a shifting control of the automatic shifting portion.
Figure 13:
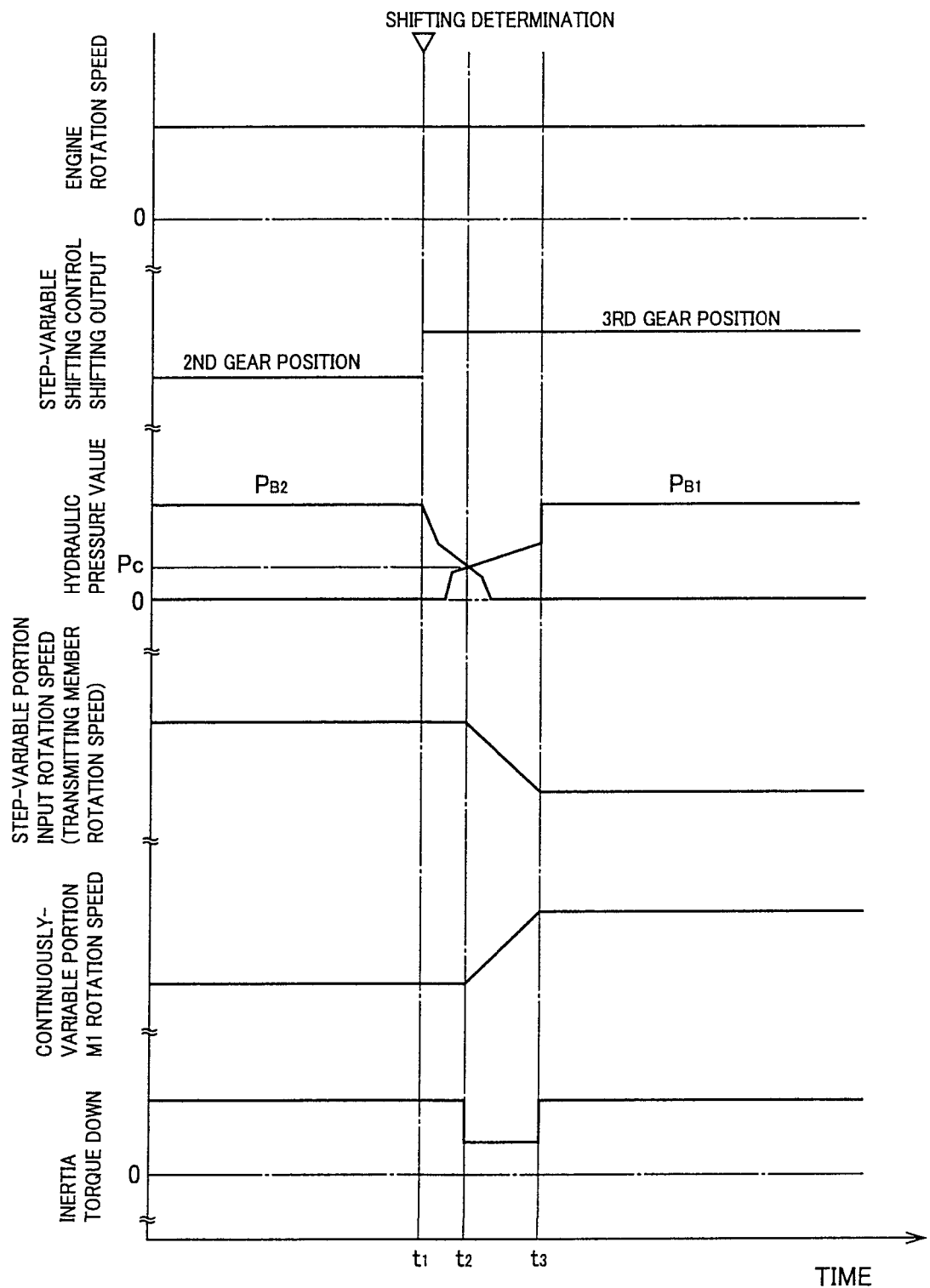
FIG. 13 is a timing chart, illustrating the control operations shown in the flowchart of FIG. 12, which represents a control operation when the automatic shifting portion executes an up-shifting in 2nd→3rd gear ratio with the differential portion placed in the continuously variable shifting state.
Figure 14:
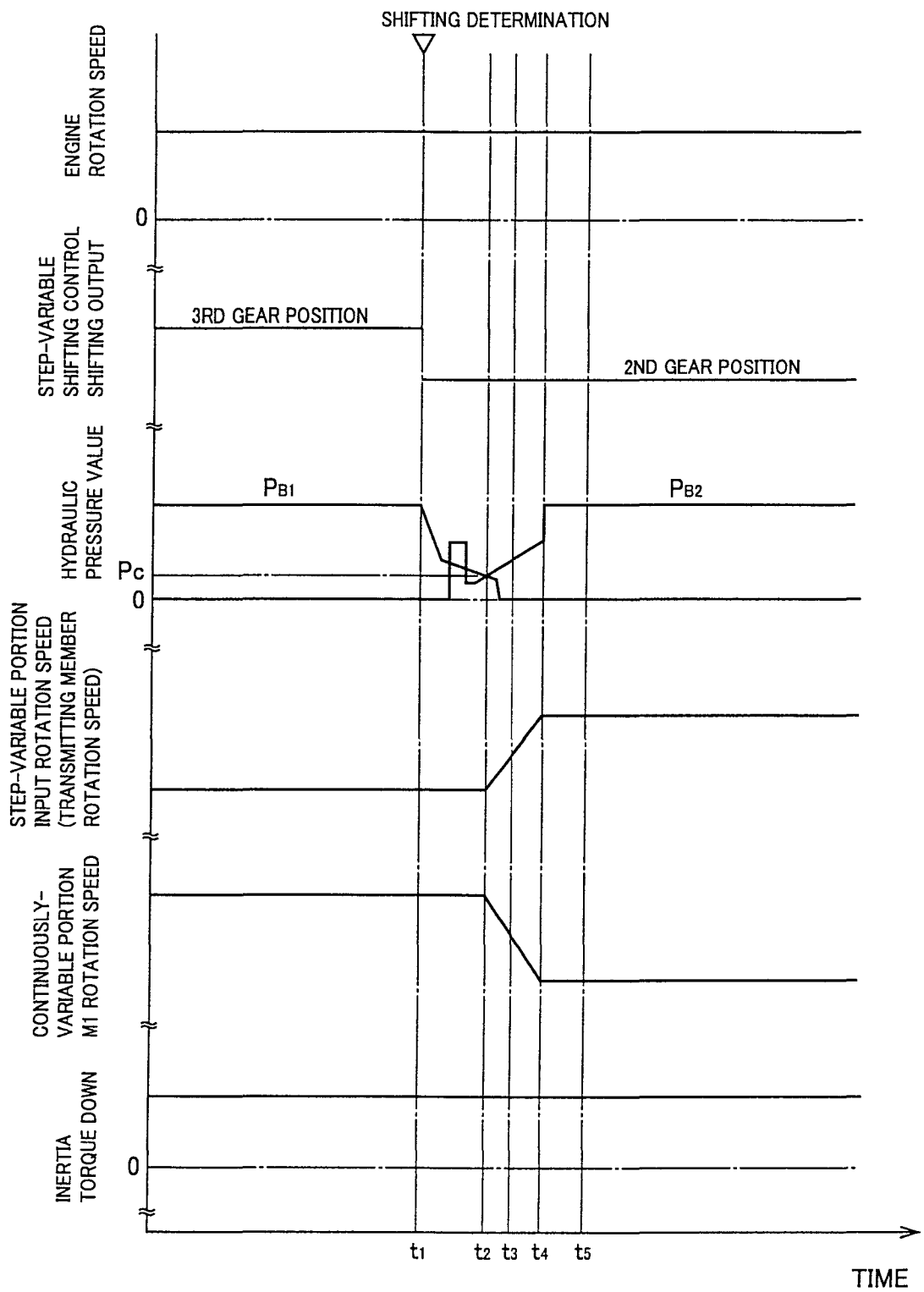
FIG. 14 is a timing chart, illustrating the control operations shown in the flowchart of FIG. 12, which represents a control operation when the automatic shifting portion executes a downshifting in 3rd→2nd gear ratio with the differential portion placed in the continuously variable shifting state.

FIG. 12 is a flowchart illustrating an essence of control operations to be executed by the electronic control device 40, that is, the shifting control operations to be executed by the shifting mechanism 10. This sequence is repeatedly executed on an extremely short cycle time in the order of about several milliseconds to several tens milliseconds. FIG. 13 is a timing chart, illustrating the control operations represented in the flowchart shown in FIG. 12, which represents the control operations to be executed when executing the up-shifting "2nd→3rd" gear ratio in the automatic shifting portion 20 with the differential portion 11 placed in the continuously variable shifting state. FIG. 14 is a timing chart, illustrating the control operations represented in the flowchart shown in FIG. 12, which represents the control operations to be executed when executing a coast downshifting "3rd→2nd" in the automatic shifting portion 20 with the differential portion 11 placed in the continuously variable shifting state.

Figure 15:
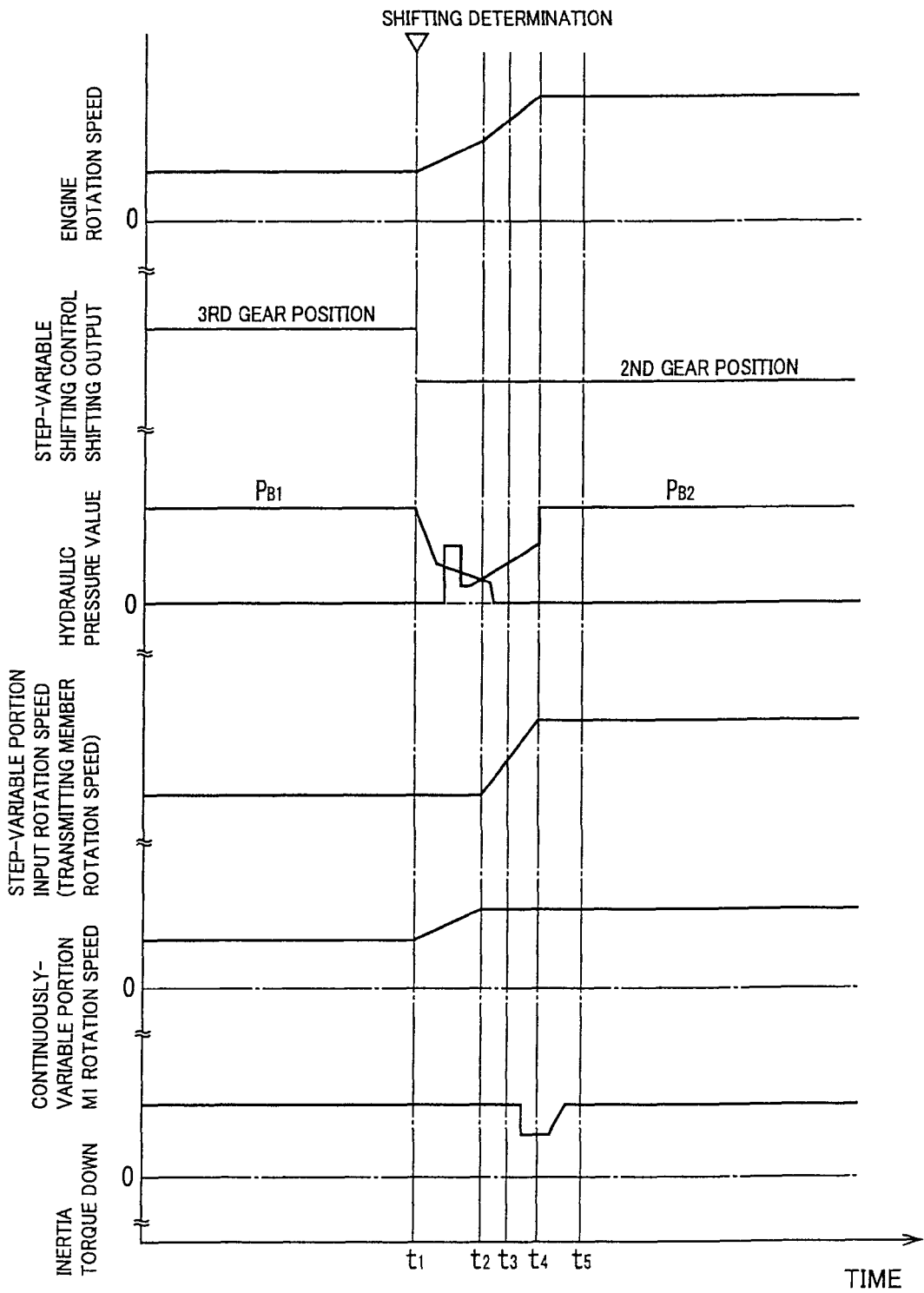
FIG. 15 is a timing chart, illustrating the control operations shown in the flowchart of FIG. 12, which represents a control operation when the automatic shifting portion executes a power-on downshifting in 3rd→2nd gear ratio with the differential portion placed in a skipped shifting state.
Figure 16:
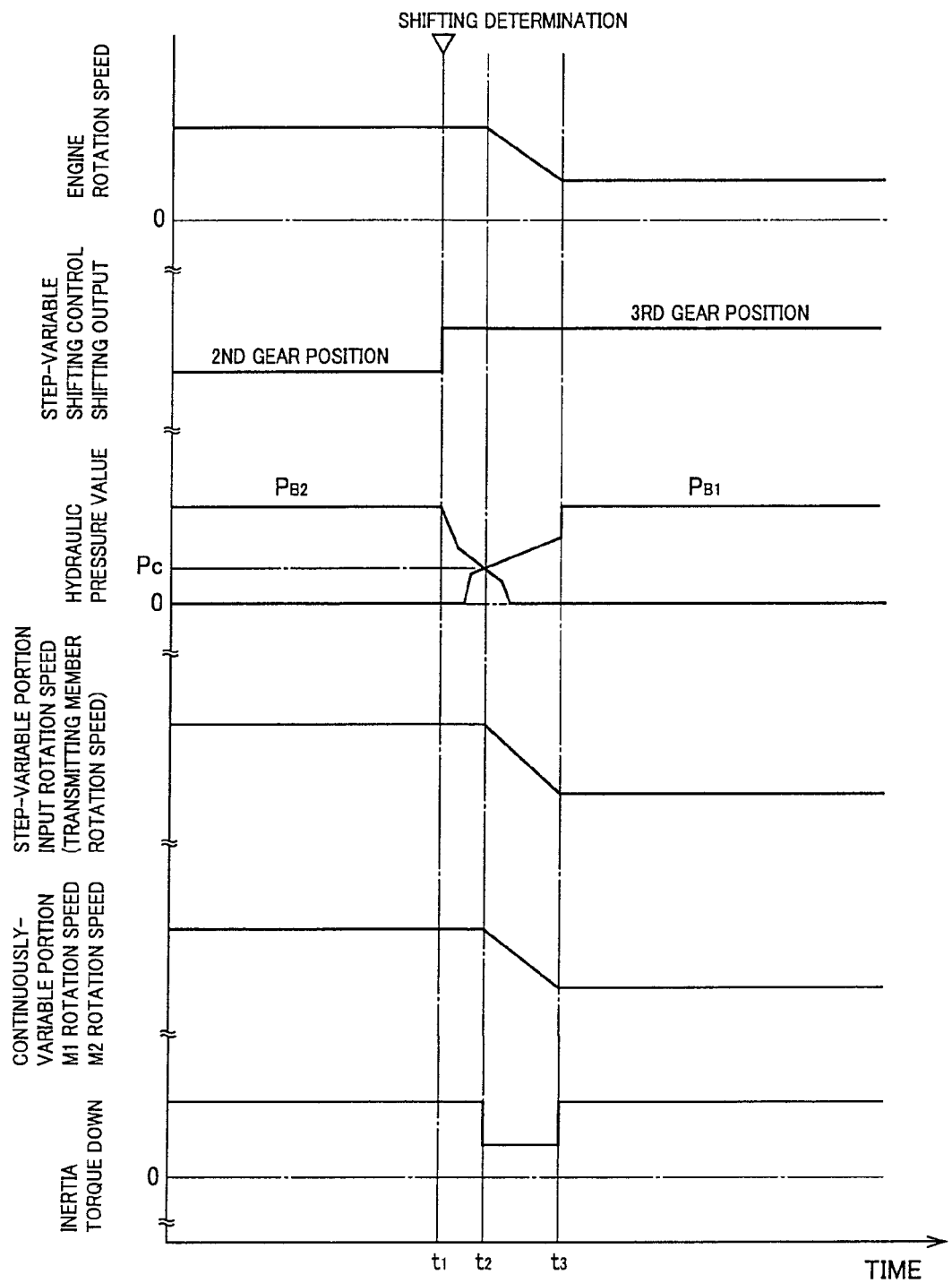
FIG. 16 is a timing chart, illustrating the control operations shown in the flowchart of FIG. 12, which represents a control operation when the automatic shifting portion executes the up-shifting in 2nd→3rd gear ratio with the differential portion placed in a step variable shifting state (locked state).
Figure 17:
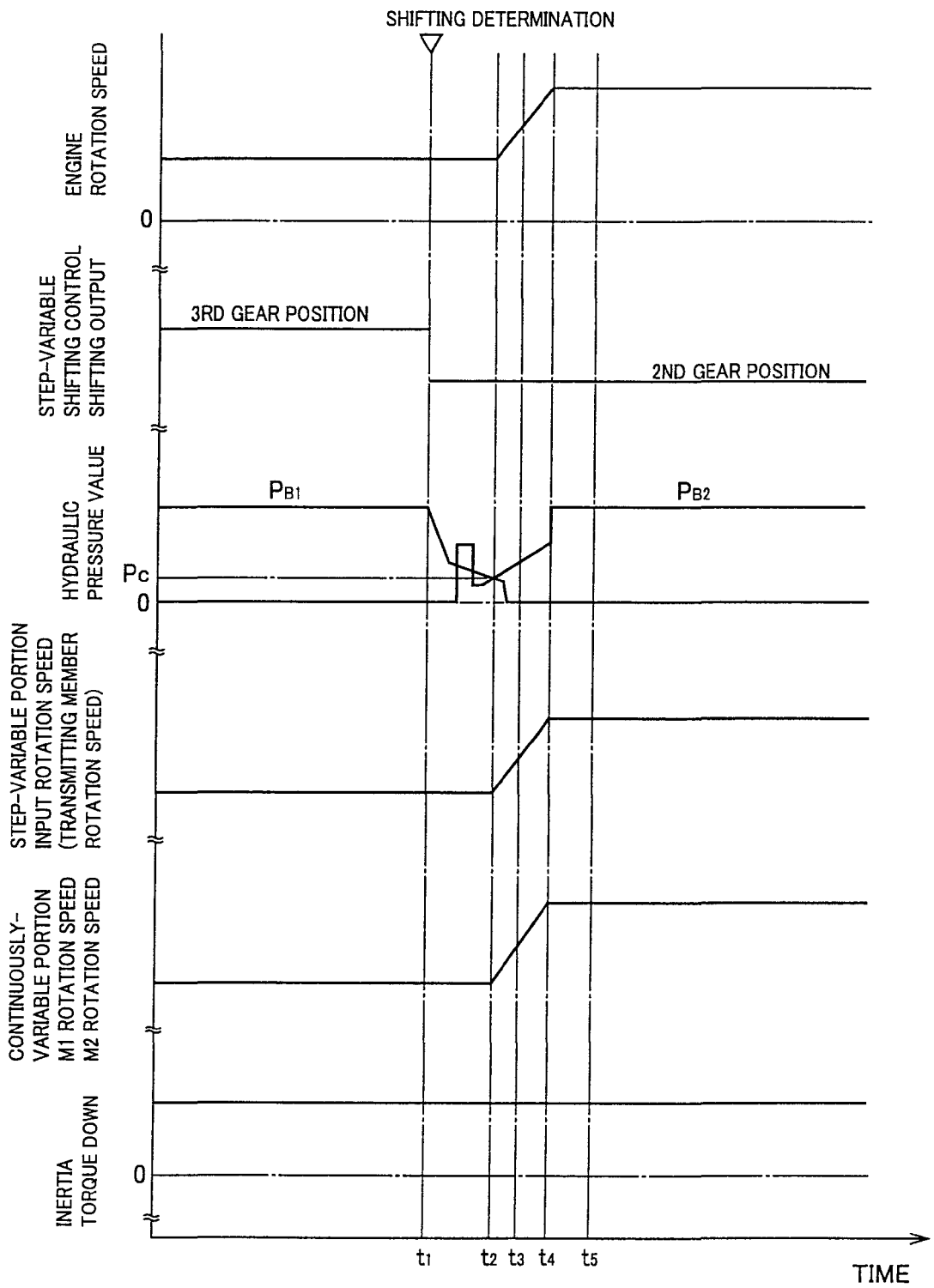
FIG. 17 is a timing chart, illustrating the control operations shown in the flowchart of FIG. 12, which represents a control operation when the automatic shifting portion executes a coast-downshifting in 3rd→2nd gear ratio with the differential portion placed in a step variable shifting state (locked state).

FIG. 15 is a timing chart, illustrating the control operations represented in the flowchart shown in FIG. 12, which represents the control operations to be executed when executing a power-on downshifting "3rd→2nd" gear ratio in the skipped shifting in the automatic shifting portion 20 with the differential portion 11 placed in the continuously variable shifting state. FIG. 16 is a timing chart, illustrating the control operations represented in the flowchart shown in FIG. 12, which represents the control operations to be executed when executing an up-shifting "2nd→3rd" gear ratio in the automatic shifting portion 20 with the differential portion 11 placed in the step variable shifting state (locked state). FIG. 17 is a timing chart, illustrating the control operations represented in the flowchart shown in FIG. 12, which represents the control operations to be executed when executing a coast downshifting "3rd→2nd" gear ratio in the automatic shifting portion 20 with the differential portion 11 placed in the step variable shifting state (locked state).

First, in step S1 corresponding to the step variable shift control means 54, the determination is made whether or not the shifting of the automatic shifting portion 20 is executed. The determination depends on whether or not the gear position to be shifted in the automatic shifting portion 20 is determined based on the vehicle condition represented by the vehicle speed V and the output torque $T_{OUT}$ of the automatic shifting portion 20 by referring to, for instance, the shifting diagram shown in FIG. 6.

A time instant $t_1$ in FIG. 13 and a time instant $t_1$ in FIG. 16 represent that the up-shifting "2nd→3rd" gear ratio in the automatic shifting portion 20 is determined. Further, a time instant $t_1$ in FIG. 14 and a time instant $t_1$ in FIG. 17 represent that the downshifting "3rd→2nd" gear ratio in the automatic shifting portion 20 is determined.

With the determination in step S1 made positive, then, in step S2 corresponding to the differential state determining means 80, the determination is made whether or not the power distributing mechanism 16 is placed in the differential state, that is, the differential portion (continuously variable shifting portion) 11 is placed in the continuously variable shifting state. The determination is based on whether or not the vehicle condition is located within a continuously variable control region to render the shifting mechanism 10 to be placed in the continuously variable shifting state by referring to, for instance, the shifting diagram shown in FIG. 6.

If the determination in step S2 is made positive, then, in step S9 corresponding to the step variable shift control means 54, a shift command (hydraulic pressure command) is output to the hydraulic pressure control circuit 42 for the gear position, determined in step S1, to be shifted in the automatic shifting portion 20. The learned value selecting means 104 selects the hydraulic pressure, used in such a hydraulic pressure command, based on the hydraulic pressure learned value map for the pattern "C" learned and stored such that during the shifting the rotation speed $N_{18}$ of the transmitting member 18 to achieve the given variation or the engine rotation speed $N_E$ achieves the given variation.

The time instant $t_1$ in FIG. 16 indicates a timing at which with the differential portion 11 remained under the locked state, a shift command is output for the automatic shifting portion 20 to perform a shift in the 3rd-gear position to begin decreasing an disengaging hydraulic pressure $P_{B2}$ of the second brake B2 acting as the on-disengaging side engaging device.

During a time period from $t_1$ to $t_3$, a engaging hydraulic pressure $P_{B1}$ of the first brake B1 acting as the on-engaging side engaging device is raised, and at time instant $t_3$, the engaging action of the first brake B1 is completed to finish a series of shifting operations. A transition hydraulic pressure in the on-disengaging side engaging device and a transition hydraulic pressure in the on-engaging side engaging device are preliminarily set, as shown in the drawing, using the learned value for the up-shifting "2nd 3rd" gear ratio selected from the hydraulic pressure learned value in the pattern "C" such that the rotation speed $N_{18}$ of the transmitting member 18 achieves the given variation, or the engine rotation speed $N_E$ achieves the given variation.

In the illustrated embodiment shown in FIG. 16, the shifting is performed with the differential portion 11 held in the locked state, causing the shifting mechanism 10 as a whole to function as the step variable transmission. Therefore, with the vehicle speed V remains constant, the input rotation speed $N_{IN}$ (the rotation speed $N_{18}$ of the transmitting member 18) of the automatic shifting portion 20 is caused to decrease with a decrease in the engine rotation speed $N_E$ during the occurrence of the up-shifting as shown in the drawing. With the differential portion 11 held in the locked state like the illustrated embodiment, the rotation speed $N_{18}$ of the transmitting member 18 and/or the engine rotation speed $N_E$ may be positively varied to be close to the given variations using the first electric motor M1 and/or the second electric motor M2 in a substantially synchronism with the initiation of the inertia phase from the time instant $t_2$.

The time instant $t_1$ in FIG. 17 represents a timing at which with the differential portion 11 remained in the locked state, the shift command is output for the automatic shifting portion 20 to establish the 2nd-gear position and a drop begins to occur in the engaging hydraulic pressure $P_{B1}$ of the first brake B1 acting as the on-disengaging side engaging device. During a time period from $t_1$ to $t_4$, the engaging hydraulic pressure $P_{B2}$ of the second brake B2 acting as the on-engaging side engaging device is raised, and at a time instant $t_4$, the engaging action of the second brake B2 is completed to finish a series of shifting operations. A transition hydraulic pressure in the on-disengaging side engaging device and a transition hydraulic pressure in the on-engaging side engaging device are preliminarily set using the learned value for the downshifting "3rd→2nd" gear ratio selected from the hydraulic pressure learned value for the pattern "C", as shown in the drawing, such that the rotation speed $N_{18}$ of the transmitting member 18 achieves the given variation or the engine rotation speed $N_E$ achieves the given variation.

For, instance, as the on-engaging side engaging device begins to be supplied with the hydraulic pressure as shown in FIG. 17, a high hydraulic pressure command is output to rapidly charge actuating oil so as to immediately narrow a back-clearance of the on-engaging side engaging device. Thus, if the engaging device remains engaged with a high hydraulic pressure intact, sometimes a shocks occur during the engaging. With such likelihood in mind, a low hydraulic pressure value command is output once at an engaging initiating time, after which a hydraulic pressure value command is output so as to increment or decrement the hydraulic pressure value toward a targeted hydraulic pressure value for the engaging to be completed.

In the illustrated embodiment shown in FIG. 17, further, since the differential portion 11 executes the shifting under the locked state, the shifting mechanism 10 is caused to function as the step variable transmission as a whole. Therefore, with the vehicle speed V kept constant, the input rotation speed $N_{IN}$ (the rotation speed $N_{18}$ of the transmitting member 18) of the automatic shifting portion 20 and the engine rotation speed $N_E$ are caused to increase with the occurrence of the downshift as shown in the drawing. With the differential portion 11 held in the locked state like the illustrated embodiment, further, the rotation speed $N_{18}$ of the transmitting member 18 and/or the engine rotation speed $N_E$ may be positively varied so as to approach the given variations using the first electric motor M1 and/or the second electric motor M2 in substantially synchronism with the initiation of the inertia phase from the time instant $t_2$.

However, if the determination in step S2 is made positive, then in step S3 corresponding to the gear ratio change determining means 86, the accelerator pedal is deeply depressed or released as shown in the transition "c↔d" indicated by the solid line C in FIG. 6. This causes the total gear ratio γT to have a varying width greater than a given value. Therefore, the determination is made whether or not the variation of the total gear ratio γT belongs to the non-continuous variation, i.e., the so-called skipped shifting with the total gear ratio γT skipping step-by-step.

If the determination in step S3 is made positive, then in step S4 corresponding to the step variable shift control means 54, the shift command (hydraulic pressure command) is output to the hydraulic pressure control circuit 42 for the automatic shifting portion 20 to be initiated in the gear position determined in step S1. The learned value selecting means 104 selects the hydraulic pressure value used in such a hydraulic pressure command, from the hydraulic pressure learned values in the pattern "B" learned and stored so as to allow the rotation speed $N_{18}$ of the transmitting member 18 to achieve the given variation during the shifting.

At nearly the same time with step S4, in step S5 corresponding to the hybrid control means 52, the differential portion 11 executes the shifting so as to control the actual total gear ratio γT toward the targeted total gear ratio γT with the use of a stepwise gear ratio change caused by the shifting of the automatic shifting portion 20 executed in step S4. This shifting is independently executed in non-synchronism with the shifting of the automatic shifting portion 20. In steps S4 and S5, the so-called skipped shifting is executed to allow the total gear ratio γT to skip step-by-step.

The time instant $t_1$ in FIG. 15 indicates a timing at which the shift command is output for the automatic shifting portion 20 to be shifted in the 2nd-speed, with a drop in the disengaging hydraulic pressure $P_{B1}$ of the first brake B1 acting as the on-disengaging side engaging device. During a time period from $t_1$ to $t_4$, the engaging hydraulic pressure $P_{B2}$ of the second brake B2 acting as the on-engaging side engaging device is raised, and at the time instant $t_4$, the second brake B2 is disengaged to complete the shifting of the automatic shifting portion 20.

The transition hydraulic pressure of the on-disengaging side engaging device and the transition hydraulic pressure of the on-engaging side engaging device are preset so as to allow the rotation speed $N_{18}$ of the transmitting member 18 to achieve the given variation upon using the learned value for achieving the downshifting in "3rd→2nd" gear position selected from the hydraulic pressure learned values in the pattern "B" as shown in the drawing. Like the illustrated embodiment shown in FIG. 17, for instance, a high hydraulic pressure value command is output at a timing when the hydraulic pressure begins to be supplied to the on-engaging side engaging device. At the engaging commencing timing, a low hydraulic pressure value command is output once, after which a hydraulic pressure value command is output so as to gradually increase the hydraulic pressure value toward the hydraulic pressure value for the engaging to be completed.

In the illustrated embodiment shown in FIG. 15, further, the rotation speed $N_{M1}$ of the first electric motor M1 is raised after the time instant t1 to increase the gear ratio γ0 of the differential portion, thereby raising the engine rotation speed $N_E$. Thus, the input rotation speed $N_{IN}$ (the rotation speed $N_{18}$ of the transmitting member 18) of the automatic shifting portion 20 increases with the downshifting of the automatic shifting portion 20. In addition, the engine rotation speed $N_E$ increases with the rotation speed $N_{M1}$ of the first electric motor M1 kept substantially constant. The differential portion 11 executes the shifting using at least the first electric motor M1 due to the differential action of the differential portion 11 so as to allow the differential portion 11 to finally regulate the total gear ratio γT toward the targeted total gear ratio γT.

Thus, with the illustrated embodiment belonging to the skipped shifting, the total gear ratio γT is caused to vary non-continuously (stepwise). To this end, the differential portion 11 executes the shifting in non-synchronism with the shifting of the automatic shifting portion 20 to utilize the stepwise change in gear ratio resulting from the shifting such that the total gear ratio γT approaches the targeted total gear ratio γT, i.e., the engine rotation speed $N_E$ to be achieved after the shifting. This results in improved shifting response. With the differential portion placed in the continuously variable shifting state like this illustrated embodiment, further, the rotation speed $N_{18}$ of the transmitting member 18, variable with the shifting of the automatic shifting portion 20, may be positively varied using the second electric motor M2 in nearly synchronism with the initiation of the inertia phase from the time instant $t_2$ so as to approach the given variation.

If the determination in step S3 is made negative, then in step S6 corresponding to the step variable shift control means 54, the shift command is output to the hydraulic pressure control circuit 42 for the automatic shifting portion 20 to be shifted to the gear position determined in step S1. The learned value selecting means 104 selects the hydraulic pressure value for use in such a hydraulic pressure command based on the hydraulic pressure learned values in the pattern "A" learned and stored so as to cause the rotation speed $N_{18}$ of the transmitting member 18 to achieve the given variation during the shifting.

The time instant $t_1$ in FIG. 13 indicates a timing at which a shift command is output for the automatic shifting portion 20 to be shifted in a 3rd-gear ratio with the commencement of a drop in the engaging hydraulic pressure $P_{B2}$ of the second brake B2 acting as the on-disengaging side engaging device. During a time period from $t_1$ to $t_3$, the engaging hydraulic pressure $P_{B1}$ of the first brake B1 acting as the on-engaging side engaging device is raised and at the time instant $t_3$, the engaging action of the first brake B1 is completed finishing the shifting of the automatic shifting portion 20. During the time period between the time instants $t_1$ and $t_3$, the transition hydraulic pressure in the on-disengaging side engaging device and the transition hydraulic pressure in the on-engaging side engaging device are preset using the learned value for achieving the up-shifting of the "2nd→3rd" gear ratio selected from the hydraulic pressure learned value in the pattern "A", as shown in the drawing, such that the rotation speed $N_{18}$ of the transmitting member 18 achieves the given variation.

The time instant $t_1$ in FIG. 14 indicates a timing at which a shift command is output for the automatic shifting portion 20 to be shifted in a 2nd-gear ratio with the commencement of a drop in the engaging hydraulic pressure $P_{B1}$ of the first brake B1 acting as the on-disengaging side engaging device. During a time period from $t_1$ to $t_4$, the engaging hydraulic pressure $P_{B2}$ of the second brake B2 acting as the on-engaging side engaging device is raised, and at the time instant $t_4$, the engaging action of the second brake B2 is completed finishing the shifting of the automatic shifting portion 20. During the time period between the time instants $t_1$ and $t_4$, the transition hydraulic pressure of the on-disengaging side engaging device and the transition hydraulic pressure in the on-engaging side engaging device are preset using the learned value for achieving the up-shifting of "3rd→2nd" gear ratio selected from the hydraulic pressure learned value in the pattern "A", as shown in the drawing, such that the rotation speed $N_{18}$ of the transmitting member 18 achieves the given variation.

Like the illustrated embodiments shown in FIGS. 15 and 17, for instance, a high hydraulic pressure command is output at a hydraulic pressure supply commencement timing of the on-engaging side engaging device and at a engaging commencement timing, a low hydraulic pressure value command is output once. Thereafter, a hydraulic pressure value command is output so as to gradually increase the hydraulic pressure value toward the hydraulic pressure value for the engaging to be completed.

Subsequently, in step S7 corresponding to the inertia phase initiation determining means 82, the determination is made whether or not the inertia phase is initiated in the course of the shifting of the automatic shifting portion 20. This determination depends on one of following statuses. A first state is whether or not the actual rotation speed $N_{M2}$ of the second electric motor M2 varies in a given value preliminarily and experimentally determined for the initiation of the inertia phase to be determined.

A second state is whether or not a time interval for the on-engaging side engaging device to have a engaging torque capacity has elapsed a given time interval that is preliminarily and experimentally determined. A third state is whether or not the engaging hydraulic pressure of the on-engaging side engaging device reaches the engaging transition hydraulic pressure (command) value Pc that is preliminarily and experimentally determined. Thus, the determination is made as to whether or not the on-engaging side engaging device begins to have the engaging torque capacity to cause the rotation speed $N_{M2}$ of the second electric motor M2 to vary in the initiation of the inertia phase.

The time instants $t_2$ in FIG. 13 and the time instants $t_2$ in FIG. 14 indicate that the initiation of the inertia phase is determined. Such a determination depends on one of the following statuses. A first state is whether or not the actual rotation speed $N_{M2}$ of the second electric motor M2 varies in the given value preliminarily and experimentally determined for the initiation of the inertia phase to be determined. A second state is whether or not the time interval for the on-engaging side engaging device to have the engaging torque capacity has elapsed a given time interval that is preliminarily and experimentally determined. A third state is whether or not the engaging hydraulic pressure of the on-engaging side engaging device reaches the engaging transition hydraulic pressure (command) value Pc that is preliminarily and experimentally determined.

If the determination in step S7 is made negative, then, the operation in step S7 is repeatedly executed. If the determination in step S7 is made positive, then in step S8 corresponding to the hybrid control means 52, the differential portion 11 executes the shifting so as to continuously vary the engine rotation speed $N_E$ due to the differential action, that is, the electrically controlled continuously variable shifting operation of the differential portion 11. For instance, the differential portion 11 varies the gear ratio γ0 in a direction opposite to a direction in which the automatic shifting portion 20 varies the gear ratio γ such that the engine rotation speed $N_E$ is maintained at a nearly fixed level. In steps S6 to S8, the shifting mechanism 10 continuously varies the total gear ratio γT thereof on a stage before and after the shifting of the automatic shifting portion 20. Moreover, the determination about whether or not the inertia phase is initiated can be executed in Step 8 which can abolish or remove the operation in step S7.

The time period between $t_2$ and $t_3$ in FIG. 13 and the time period between $t_2$ and $t_4$ in FIG. 14 indicate that during the inertia phase occurring in the course of the shifting of the automatic transmission, the differential portion 11 performs the differential action to control the rotation speed $N_{M1}$ of the first electric motor M1 to cause the differential portion 11 to change the gear ratio in a direction opposite to that, in which the automatic shifting portion 20 changes the gear ratio, by a variable corresponding to a change in such a gear ratio. During such a time period, the differential portion 11 performs the differential action on the stage before and after the shifting of the automatic shifting portion 20 so as to prevent the automatic shifting portion 20 from changing the total gear ratio γT, i.e., such that the engine rotation speed $N_E$ is maintained at a nearly fixed level. If the differential portion 11 is placed in the continuously variable shifting state like the illustrated embodiment, the rotation speed $N_{18}$ of the transmitting member 18, variable with the shifting of the automatic shifting portion 20, may be positively varied using the second electric motor M2 in nearly synchronism with the inertia phase occurring at the time instant $t_2$.

During the shifting in steps S4, S5, the shifting in steps S6 to S8 or the shifting in step S9, in step S10 corresponding to the torque down control means 88, the torque down control is executed so as to decrease torque being transferred to the drive wheels 38, i.e., for instance, input torque $T_{IN}$ or output torque $T_{OUT}$ of the automatic shifting portion 20.

For instance, with a reduction in the rotation speed of the rotary element forming the automatic transmission or a reduction in the rotation speed of the rotary element forming the differential portion 11, inertia torque occurs as a torque increment in torque being transferred to the drive wheels 38 such as, for instance, a torque increment in output torque $T_{OUT}$. With a reduction in the engine rotation speed $N_E$ during the up-shifting, inertia torque occurs as a torque increment in torque being transferred to the drive wheels 38. It is likely that engaging shocks occur due to a fluctuation in torque occurring upon a completed engaging of the engaging device during the shifting of the automatic shifting portion 20.

Therefore, in step S10, the torque down control is executed so as to cancel the torque increment corresponding to the inertia torque in input torque $T_{IN}$ or output torque $T_{out}$ of the automatic shifting portion 20 to some extent (that is, to be absorbed to some extent), or to suppress the fluctuation in torque caused upon the completed engaging of the engaging device for thereby suppressing the engaging shocks. Thus, for instance, the engine torque down control for lowering engine torque $T_E$ or the motor torque down control using the second electric motor M2 are executed independently or in combination, causing a reduction in torque being transferred to the drive wheels 38. However, with the accelerator pedal released in downshifting to cause the vehicle to run under deceleration, i.e., in a coast downshifting, the drive wheels 38 provide torque in a reversed input and no torque down control may be executed with no need for step S10 to be executed.

During the time period between $t_2$ and $t_3$ in FIG. 13, the variation in the engine rotation speed $N_E$ is minimized during the shifting. This allows a torque component, corresponding to inertia torque occurring as the torque increment in torque being transferred to the drive wheels 38 to be cancelled to some extent. Torque increment is resulted from the variation in the rotation speed of the rotary element of the automatic shifting portion 20 or the variation in the rotation speed of the rotary element of the differential portion 11. That is, this represents that the torque down control is executed.

FIG. 14 represents that the illustrated embodiment is involved in the coast downshifting and no torque down control is executed. However, during the downshifting with torque being transferred to the drive wheels 38, the torque down control may be executed canceling the inertia torque component like the operation performed in the illustrated embodiment shown in FIG. 13.

During a time period between $t_3$ and $t_5$ in FIG. 15, the power-on downshifting is performed. This allows the fluctuation in torque, resulting from the completed engaging (with a locked state in a structure having a one-way clutch, although no one-way clutch is provided in the illustrated embodiment) of the engaging device of the automatic shifting portion 20, to be cancelled to some extent, thereby suppressing the engaging shocks. That is, this represents that input torque $T_{IN}$ is decreased at a terminal shifting.

During a time period between $t_2$ and $t_3$ in FIG. 16, the operation is executed to allow the torque component, corresponding to inertia torque representing the torque increment in torque transferred to the drive wheels 38 to be cancelled to some extent. Torque increment is resulted from the variation in engine rotation speed $N_E$, the variation in the rotation speed of the rotary element forming the automatic shifting portion 20 or the variation in the rotation speed of the rotary element forming the differential portion 11. That is, this represents that the torque down control is executed.

FIG. 17 represents the illustrated embodiment for the coast downshifting to be executed and shows that no torque down control is executed. However, during the downshifting with torque being transferred to the drive wheels 38, the torque down control may be executed canceling the inertia torque component like the operation executed in the illustrated embodiment shown in FIG. 16.

If the determination in step S1 is made negative and no shifting of the automatic shifting portion 20 is executed in step S11, various control means of the electronic control device 40 execute control operations or the current routine is terminated. For instance, with the shifting mechanism 10 placed in the continuously variable shifting state, the hybrid control means 52 executes the shifting of the differential portion 11 based on the vehicle condition.

Figure 18:
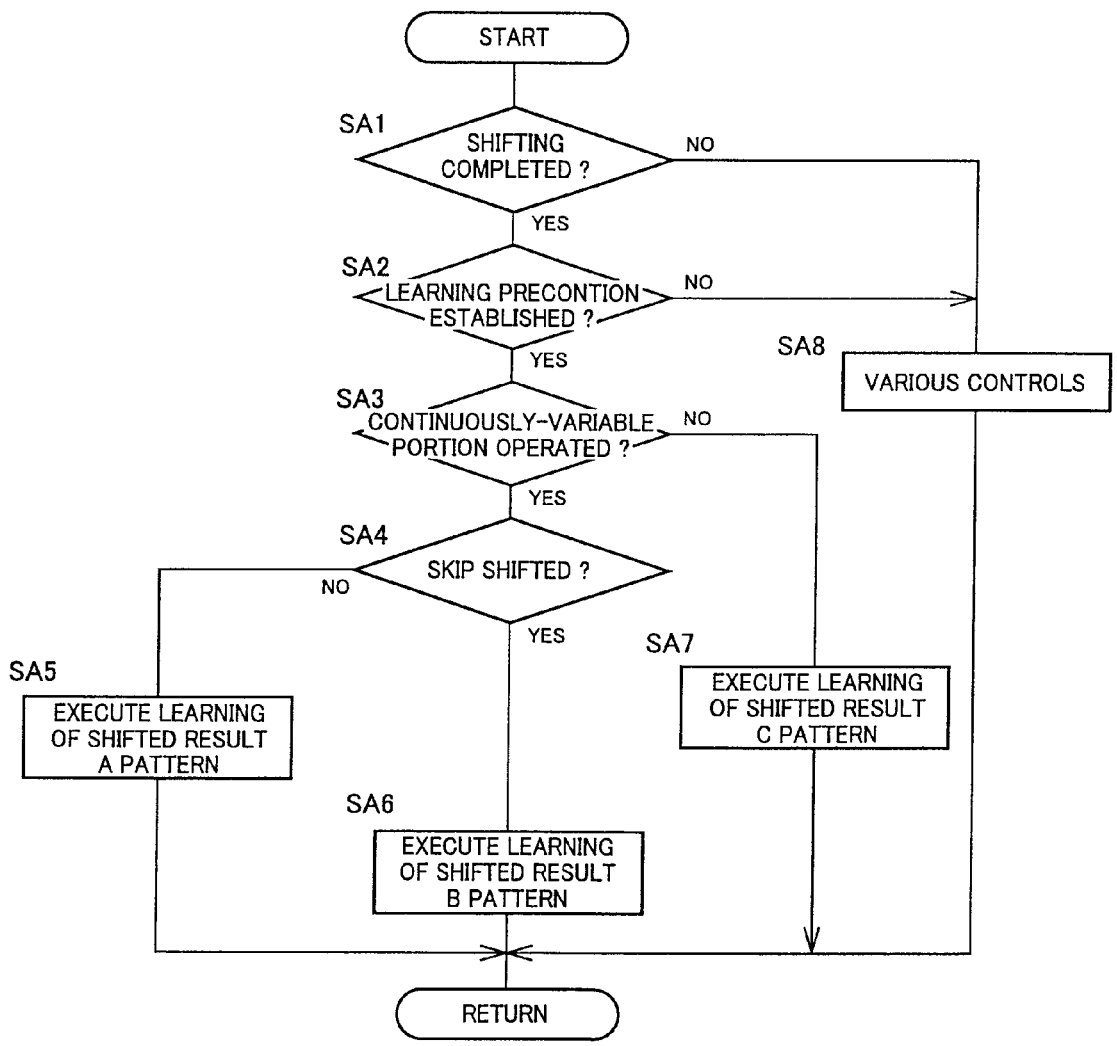
FIG. 18 is a flowchart, illustrating the control operations to be executed by an electronic control device shown in FIG. 5, i.e., control operations for learning a hydraulic pressure value of the engaging device for use in the shifting of the automatic shifting portion.

FIG. 18 is a flowchart illustrating an essence of control operations to be executed by the electronic control device 40, i.e., control operations for learning the hydraulic pressure value on the engaging device. Such a basic sequence is repeatedly executed on an extremely short cycle time in the order of, for instance, several milliseconds to several tens milliseconds.

First, in step SA1 corresponding to the shift completion determining means 106, the determination is made whether or not the shifting is completed in the automatic shifting portion 20. This determination depends on whether or not the shifting is completed in the automatic shifting portion 20 during the operations executed in steps S4, S6 or S9. For instance, determination depends whether or not a given time interval has elapsed in the automatic shifting portion 20, or whether or not the actual rotation speed $N_{18}$ of the transmitting member 18 is brought into nearly synchronism with a subsequent rotation speed $N_{18}$ of the same after the shifting.

If the determination in step SA1 is made negative, then in step SA2 corresponding to the learning precondition establishment determining means 108, the determination is made whether or not a precondition is established for learning the hydraulic pressure value (engaging pressure) of the engaging device for use in the shifting of the automatic shifting portion 20. This determination depends on whether or not the shifting is normally executed and completed. Such a shifting is involved in a case wherein the variation in engine torque lies in a given value during the shifting of the automatic shifting portion 20, the engine 8 has an engine water temperature TEMP$_W$ with a warm-up of the engine 8 deemed to be completed, and an actuating oil temperature of the automatic shifting portion 20 lies in an appropriate predetermined value. Thus, the determination is made whether or not the learning precondition is established.

If the determination in step SA2 is made positive, then in step SA3 corresponding to the differential state determining means 80, the determination is made whether or not the differential portion (continuously variable shifting portion) 11 is placed in the continuously variable shifting state during the shifting of the automatic shifting portion 20. During such operation, for instance, the determined result in step S2 is used.

If the determination in step SA3 is made positive, then in step SA4 corresponding to the gear ratio change determining means 86, the determination is made whether or not the total gear ratio $\gamma T$ varies in the so-called skipped shifting to skip step-by-step during the shifting of the automatic shifting portion 20. During such operation, for instance, the determined result in step S3 is used.

If the determination in step SA4 is made negative, then in step SA5 corresponding to the engaging pressure learning control means 100, a comparison is made between the variation of an actual rotation speed $N_{18}$ of the transmitting member 18, monitored during the shifting, and a given variation of the rotation speed $N_{18}$ of the transmitting member 18. The learning control is executed for correcting the engaging pressure (hydraulic pressure value) of the engaging device so as to suppress a difference between the variation in actual rotation speed and a given variation on a subsequent shifting operation, that is, on the shifting of the automatic shifting portion 20 to be executed in, for instance, step S6 in FIG. 12.

Further, the hydraulic pressure value, subsequent to the correction made on the current learning control, is organized as the hydraulic pressure learned value map for the pattern "A" for storage. That is, in the hydraulic pressure learned value map for the pattern "A", a default value or a preceding learned value, associated with engine torque, and a kind of the shifting appearing during the shifting targeted to be learned, is rewritten to the hydraulic pressure value subsequent to the correction upon the current learning and newly stored as a learned value.

If the determination in step SA4 is made positive, then in step SA6 corresponding to the engaging pressure learning control means 100, the operation is executed like the operation in step SA5 to make a comparison between the variation in the actual rotation speed $N_{18}$ of the transmitting member 18 monitored during the shifting, and the given variation in the rotation speed $N_{18}$ of the transmitting member 18. The learning control is executed for correcting the engaging pressure (hydraulic pressure value) of the engaging device so as to suppress a difference between both the variations on a subsequent shifting, i.e., on the shifting of the automatic shifting portion 20 to be executed in, for instance, step S12 in FIG. 12. In addition, the hydraulic pressure value, subsequent to the correction in the current learning control, is organized as the hydraulic pressure learned value map for the pattern "B" for storage.

If the determination in step SA3 is made negative, then in step SA7 corresponding to the engaging pressure learning control means 100, a comparison is made between the variation in the actual rotation speed $N_{18}$ of the transmitting member 18, monitored during the shifting, and the given variation in the rotation speed $N_{18}$ of the transmitting member 18 or between the variation of the engine rotation speed $N_E$, monitored during the shifting, and the given variation of the engine rotation speed $N_E$.

Then, the learning control is executed for correcting the engaging pressure (hydraulic pressure value) of the engaging device like the operations in steps SA5 and SA6 so as to suppress a difference between the actual change in the rotation speed and the given variation in the subsequent shifting, i.e., in the shifting of the automatic shifting portion 20 to be executed in, for instance, step S9 in FIG. 12. In addition, the hydraulic pressure value, subsequent to the correction on the current learning control, is organized as the hydraulic pressure learned value map for the pattern "C" for storage.

As a result, the hydraulic pressure learned value maps are stored as the patterns "A", "B" and "C" as shown in FIG. 11.

If the determination in step SA1 or the determination in step SA2 is made negative, then in step SA8, the various control means of the electronic control device 40 executes the control operation or the current routine is terminated with no the learning of the engaging pressure of the engaging device of the automatic shifting portion 20 being executed.

Figure 19:
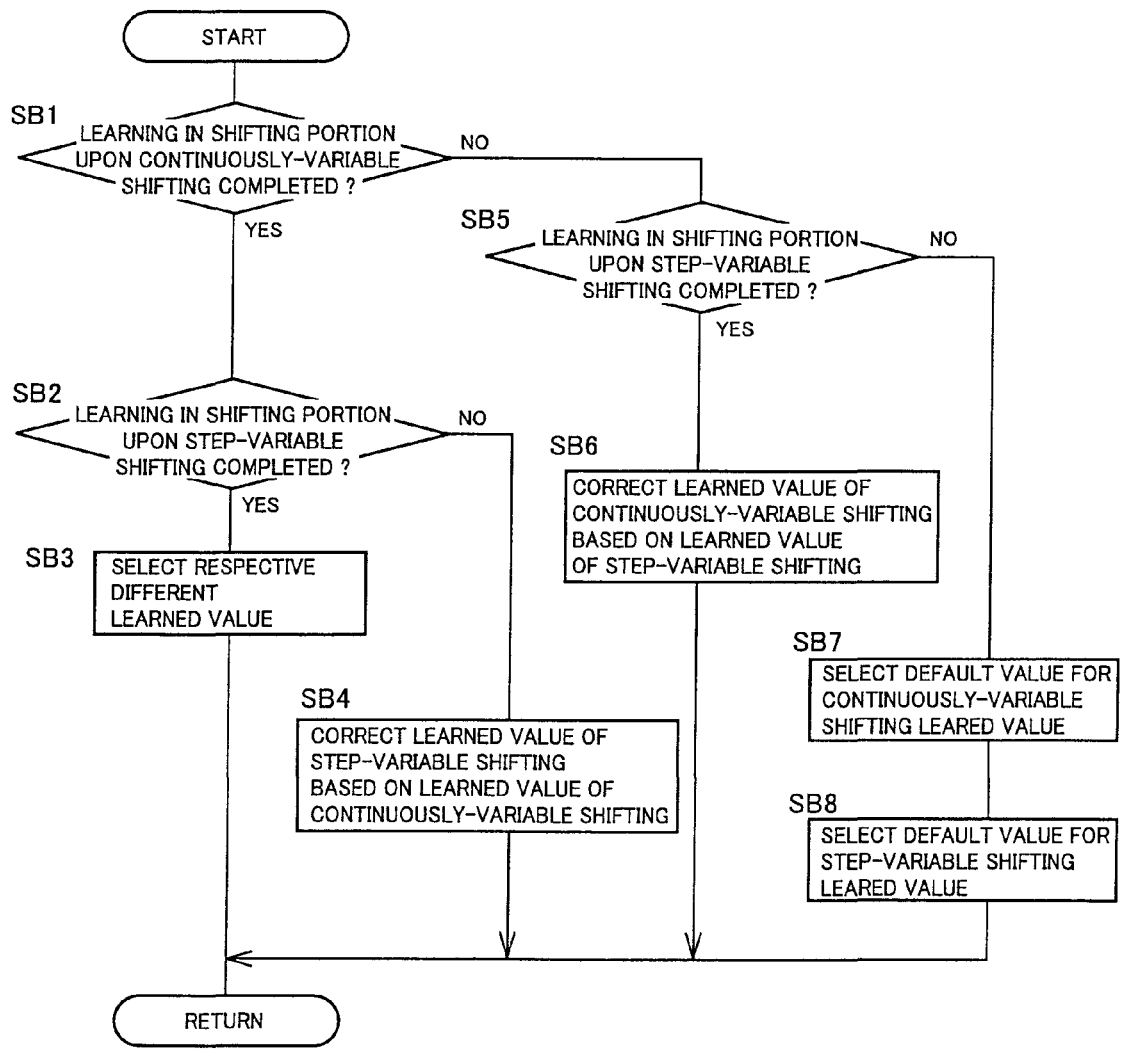
FIG. 19 is a flowchart illustrating control operations to be executed by the electronic control device shown in FIG. 5, i.e., control operations for selecting the hydraulic pressure value of the engaging device for use in the shifting of the automatic shifting portion.

FIG. 19 is a flowchart illustrating an essence of control operations to be executed by the electronic control device 40, that is, control operations for selecting the learned value on the engaging pressure of the engaging device for use in the shifting of the automatic shifting portion 20. Such a basic sequence is repeatedly executed in an extremely short cycle time in the order of, for instance, several milliseconds to the several tens milliseconds.

In the illustrated embodiment, as set forth above, there are three hydraulic pressure learned value maps for the patterns "A", "B" and "C". Description is made of the control operations for selecting the learned value with reference to an exemplary case with the differential portion 11 placed in the continuously variable shifting state or the non-continuously variable shifting state in FIG. 19. Of the patterns "A" and "B", the pattern "A" is herein used as the hydraulic pressure learned value map for the differential portion 11 to be placed in the continuously variable shifting state and the pattern "C" is used as the hydraulic pressure learned value map for the differential portion 11 to be placed in the non-continuously variable shifting state.

First, in step SB1 corresponding to the learning control determining means 102, the determination is made whether or not the learning of the engaging pressure for use in the shifting of the automatic shifting portion 20 is completed with the differential portion 11 placed in the continuously variable shifting state. This determination depends on whether or not the respective default values in the hydraulic pressure learned value map for the pattern "A" for use in the shifting of the automatic shifting portion 20 in, for instance, step S6 in FIG. 12 are learned.

If the determination in step SB1 is made positive, likewise, in step SB2 corresponding to the learning control means 102, the determination is made whether or not the learning of the engaging pressure for use in the shifting of the automatic shifting portion 20 is completed with the differential portion 11 placed in the non-continuously variable shifting state. This determination depends on whether or not the respective default values in the hydraulic pressure learned value map for the pattern "C" for use in the shifting of the automatic shifting portion 20 in, for instance, step S9 in FIG. 12 are learned.

If the determination in step SB2 is made positive, then in SB3 corresponding to the learned value selecting means 104, the operation is executed to select the hydraulic pressure learned value map based on a status of the shifting mechanism 10 during the relevant shifting thereof by referring to the hydraulic pressure learned value maps organized and stored as the patterns "A" and "C", respectively. At the same time, the operation is executed to select the learned value on the engaging pressure of the engaging device for use in the shifting of the automatic shifting portion 20 based on engine torque $T_E$ and the kind of the shifting by referring to the selected hydraulic pressure learned value map.

If the determination in step SB2 is made negative, then in step SB4 corresponding to the engaging pressure learning control means 100, the operation is executed to correct the default value in the hydraulic pressure learned value map for the pattern "C" for use in the shifting of the automatic shifting portion 20 with the differential portion 11 placed in the non-continuously variable shifting state. Such a correction is executed based on the learned value distinguished in terms of the same engine torque and the kind of the shifting in the hydraulic pressure learned value map for the pattern "A" obtained through the learning in the shifting of the automatic shifting portion 20 with the differential portion 11 placed in the continuously variable shifting state.

For instance, during the continuously variable shifting state, i.e., with the learned value for the pattern "A" corrected in a trend deviated toward the underlapping side, the hydraulic pressure value appearing in the non-continuously variable shifting state, i.e., the default value for the pattern "C" is corrected in a trend slightly deviated toward the underlapping side and stored as a learned value.

On the contrary, if the learned value for the pattern "A" is corrected in the trend deviated toward the overlapping side, the default value for the pattern "C" is corrected in a trend slightly deviated toward the overlapping side and stored as the learned value. During the shifting of the automatic shifting portion 20, the learned value selecting means 104 selects the relevant corrected (corrected) learned value as a learned value for the engaging pressure of the engaging device for use in the shifting of the automatic shifting portion 20.

If the determination in step SB1 is made negative, then in step SB5 corresponding to the learning control means 102, the determination is made whether or not the learning of the engaging pressure for use in the shifting of the automatic shifting portion 20 is completed with the differential portion 11 placed in the non-continuously variable shifting state. If the determination in step SB5 is made positive, then in step SB6 corresponding to the engaging pressure learning control means 100, the operation is executed to correct the default value in the hydraulic pressure learned value map for the pattern "A" for use in the shifting of the automatic shifting portion 20 with the differential portion 11 placed in the continuously variable shifting state. Such a correction depends on the learned value distinguished in terms of the same engine torque and the kind of the shifting in the hydraulic pressure learned value map for the pattern "C" obtained through the learning in the shifting of the automatic shifting portion 20 with the differential portion 11 placed in the non-continuously variable shifting state.

For instance, during the non-continuously variable shifting state, i.e., with the learned value for the pattern "C" corrected in a trend deviated toward the underlapping side, then, the hydraulic pressure value, appearing when placed in the continuously variable shifting state, i.e., the default value for the pattern "A" is corrected in a trend slightly deviated toward the underlapping side and stored as a learned value. On the contrary, if the learned value for the pattern "C" is corrected in a trend deviated toward the overlapping side, the default value for the pattern "A" is corrected in a trend slightly deviated toward the overlapping side and stored as a learned value. During the shifting of the automatic shifting portion 20, the learned value selecting means 104 selects the relevant corrected (corrected) learned value as a learned value for the engaging pressure of the engaging device for use in the shifting of the automatic shifting portion 20.

If the determination in step SB5 is made negative, none of both the learning on the hydraulic pressures for use in the shifting under the continuously variable shifting state and the shifting under the non-continuously variable shifting state is completed. That is, none of the operations are executed to perform the learning on the default value of the hydraulic pressure learned value map for the pattern "A" and the default value of the hydraulic pressure learned value map for the pattern "C". During the shifting of the automatic shifting portion 20 with the differential portion 11 placed in the continuously variable shifting state, in step SB7 corresponding to the learned value selecting means 104, the default value set for the continuously variable shifting state, i.e., for the pattern "A" is selected intact as the hydraulic pressure value of the engaging device for use in the shifting of the automatic shifting portion 20.

During the shifting of the automatic shifting portion 20 with the differential portion 11 placed in the non-continuously variable shifting state, next, in step SB8 corresponding to the learned value selecting means 104, the default value set for the non-continuously variable shifting state, i.e., for the pattern "C" is selected intact as the hydraulic pressure value of the engaging device for use in the shifting of the automatic shifting portion 20. This is because the default values for the hydraulic pressure learned value map for the pattern "A" and for the hydraulic pressure learned value map for the pattern "C" are not learned.

With the illustrated embodiment, as set forth above, the engaging pressure control means 84 controls the engaging pressure of the engaging device forming the automatic transmission 20 so as to allow the rotational speed $N_{18}$ of the transmitting member 18 to vary in a given variation during the shifting of the automatic transmission 20 with the differential part 11 placed in the continuously variable shifting state. This allows the rotational speed $N_{18}$ of the transmitting member 18, uniquely determined with the vehicle speed V and the speed ratio γ of the automatic transmission 20, to vary in the given variation. This provides a balance between a rapid response wherein the rotational speed $N_{18}$ of the transmitting member 18 has an increased varying rate $N_{18}'$ regarded to have, for instance, a comfortable feeling and a slow response wherein the rotational speed $N_{18}$ of the transmitting member 18 has a decreased varying rate $N_{18}'$ regarded to provide an ease of suppressing shifting shocks, thereby suppressing the occurrence of shifting shocks.

In the illustrated embodiment, further, during the shifting of the automatic transmission 20 with the differential part 11 placed in the non-continuously variable shifting state, the engaging pressure control means 84 controls the engaging pressure of the engaging device forming the automatic transmission 20 such that the rotational speed $N_{18}$ of the transmitting member 18 or the engine rotational speed $N_E$ achieves a given variation. Thus, with the differential part 11 placed in the non-continuously variable shifting state, the rotational speed $N_{18}$ of the transmitting member 18 or the engine rotational speed $N_E$, uniquely determined with the vehicle speed V and the speed ratio γ of the automatic transmission 20, to achieve the given variation so as to provide the balance between the rapid response, wherein the rotational speed $N_{18}$ has the increased varying rate $N_{18}'$ regarded to provide, for instance, the comfortable feeling, and the slow response wherein the rotational speed $N_{18}$ has the decreased varying rate $N_{18}'$ regarded to provide the ease of suppressing the shifting shocks. This suppresses the occurrence of shifting shocks.

In the illustrated embodiment, furthermore, the hybrid control means 62 varies the rotational speed $N_{M1}$ of the first electric motor M1 so as to continuously vary the engine rotational speed $N_E$ on a stage before and after the shifting of the automatic transmission 20. This enables the shifting shocks to be further suppressed than those suppressed when the engine rotational speed $N_E$ is caused to non-continuously vary, i.e., step by step.

In the illustrated embodiment, moreover, the engaging pressure control means 84 learns the engaging pressure of the engaging device of the automatic transmission 20 so as to allow the rotational speed $N_{18}$ of the transmitting member 18 or the engine rotational speed $N_E$ to achieve the given variation described above. This results in a further suppression of the shifting shocks.

In the illustrated embodiment, furthermore, with the hybrid control means 52 varying the rotation speed $N_{18}$ of the transmitting member 18, the engaging pressure control means 84 inhibits learning the engaging pressure of the engaging device during the shifting of the automatic shifting portion 20. Accordingly, this suppresses the occurrence of shifting shocks when the hybrid control means 52 does not vary the rotation speed $N_{18}$ of the transmitting member 18.

In the illustrated embodiment, moreover, with the hybrid control means 52 varying the rotation speed $N_{18}$ of the transmitting member 18, the engaging pressure control means 84 learns the engaging pressure of the engaging device in consideration of the variation caused in the rotation speed $N_{18}$ of the transmitting member 18. Consequently, the engaging pressure of the engaging device is learned with a consequence of subtracting a shifting shock suppressing effect caused by the operation of the hybrid control means 52 in varying the rotation speed $N_{18}$ of the transmitting member 18, thereby suppressing the occurrence of shifting shocks caused when no rotation speed $N_{18}$ of the transmitting member 18 is varied by the hybrid control means 52.

Hereinafter, another embodiments of the present invention will be explained. In the following description, members or portions common to the embodiments are added the same reference numerals and are omitted in the explanations thereof.

Embodiment 2

Figures 20, 21:
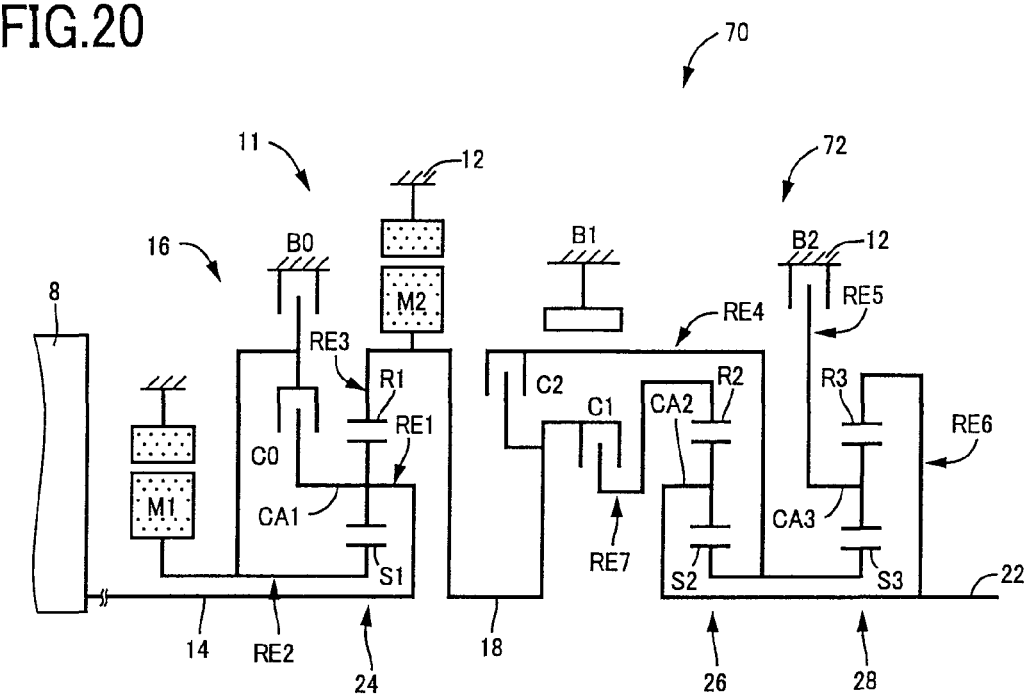
FIG. 20 is a skeleton view explaining a structure of a drive apparatus for hybrid vehicle of another embodiment according to the present invention.
FIG. 21 is an operation Table indicating a relation between a shifting operation of the drive apparatus of the hybrid vehicle of the embodiment shown in FIG. 20 operable in a continuously variable shifting state or a step variable shifting state, and operation combinations of hydraulic-type frictionally engaging devices used therefore, corresponding to FIG. 2.
Figure 22:
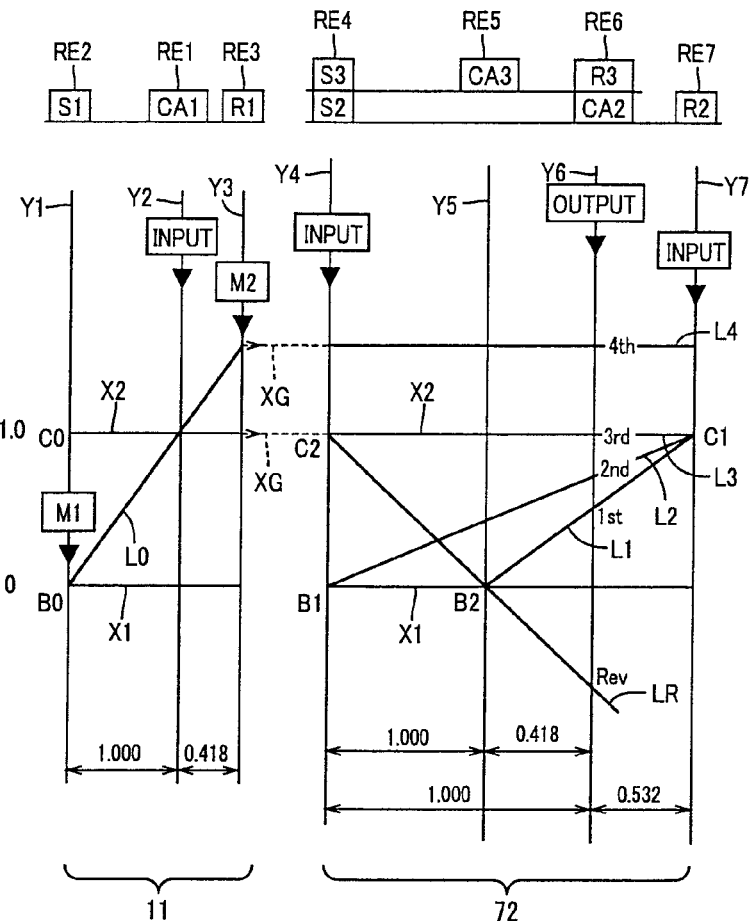
FIG. 22 is a collinear chart showing relative rotating speeds of rotary elements in each of different gear positions when the drive apparatus of the hybrid vehicle of the embodiment shown in FIG. 20 is operated in the step variable shifting state, corresponding to FIG. 3.

FIG. 20 is a skeleton view explaining structure of a shifting mechanism 70 according to another embodiment of the present invention. FIG. 21 is an operation Table indicating a relation between a shifting position of the shifting mechanism 70, and operation combinations of hydraulic-type friction engaging devices used therefor. FIG. 22 is a collinear chart explaining a shifting operation of the shifting mechanism 70.

Like the illustrated embodiment described above, the shifting mechanism 70 comprises the differential portion 11 including the first electric motor M1, the power distributing mechanism 16 and the second electric motor M2, and an automatic shifting portion 72 with three forward-gear positions connected to the differential portion 11 and the output shaft 22 in series via the transmitting member 18. The power distributing mechanism 16 includes the first planetary gear unit 24 of the single pinion type having a given speed ratio ρ1 of, for instance, about 0.418, the switching clutch C0 and the switching brake B0. The automatic shifting portion 72 includes the second planetary gear unit 26 of the single pinion type having a given speed ratio ρ2 of, for instance, about 0.532, and the third planetary gear unit 28 of the single pinion type having a given speed ratio ρ3 of, for instance, about 0.418.

The sun gear S2 of the second planetary gear unit 26 and the sun gear S3 of the third planetary gear unit 28 are integrally connected to each other. These sun gears S2 and S3 are selectively engaged to the transmitting member 18 via the second clutch C2 and also selectively engaged to the case 12 via the first brake B1. The second carrier CA2 of the second planetary gear unit 26 and the third ring gear R3 of the third planetary gear unit 28 integrally connected to each other are connected to the output shaft 22. The second ring gear R2 is selectively connected to the transmitting member 18 via the first clutch C1, and the third carrier CA3 is selectively engaged to the case 12 via the second brake B2.

With the shifting mechanism 70 thus constructed, the switching clutch C0, the first clutch C1, the second clutch C2, the switching brake B0, the first brake B1 and the second brake B2 are selectively engaged as shown by, for instance, the operation Table shown in FIG. 21. One of a 1st-gear position (1st-speed position) to a 4th-gear position (4th-speed position), a reverse-gear position (rear-drive position) or a neutral position is selectively established. In this moment, each gear position has a speed ratio γ (=input shaft speed $N_{IN}$/output shaft speed $N_{OUT}$) that substantially varies in equal ratio.

In particular, with the present embodiment, the power distributing mechanism 16 incorporates the switching clutch C0 and the switching brake B0. With either the switching clutch C0 or switching brake B0 being engaged, the differential portion 11 can be structured to assume the continuously variable shifting state operative as the continuously variable transmission and, in addition thereto, the fixed shifting state operative as a transmission with a fixed speed ratio. Accordingly, with either the switching clutch C0 or switching brake B0 brought into engagement, the shifting mechanism 70 can take a structure for the step variable shifting state operative as the step variable transmission with the differential portion 11 placed in the fixed shifting state, and the automatic shifting portion 72.

With both the switching clutch C0 and switching brake B0 brought into disengaging states, the shifting mechanism 70 can take the continuously variable shifting state operative as the electrically controlled continuously variable transmission with the differential portion 11 placed in the continuously variable shifting state, and the automatic shifting portion 72. In other words, the shifting mechanism 70 is switched to the step variable shifting state upon engaging either the switching clutch C0 or the switching brake B0, and switched to the continuously variable shifting state upon disengaging both the switching clutch C0 and switching brake B0.

For the shifting mechanism 70 to function as the step variable transmission, as shown for instance in FIG. 21, the switching clutch C0, the first clutch C1 and the second brake B2 are engaged, which establishes the 1st-gear position having the highest speed ratio γ of, for instance, about 2.804. With the switching clutch C0, the first clutch C1 and the first brake B1 being engaged, a 2nd-gear position is established with a speed ratio γ2 of, for instance, about 1.531 that is lower than that of the 1st-gear position. With the switching clutch C0, the first clutch C1 and the second clutch C2 being engaged, a 3rd-gear position is established with a speed ratio γ3 of, for instance, about 1.000 that is lower than that of the 2nd-gear position.

With the first clutch C1, the second clutch C2 and the switching brake B0 being engaged, a 4th-gear position is established with a speed ratio γ4 of, for instance, about 0.705 that is lower than that of the 3rd-gear position. Further, with the second clutch C2 and the second brake B2 being engaged, a reverse-gear position is established with a speed ratio γR of, for instance, about 2.393 that is intermediate between those of the 1st-gear and 2nd-gear positions. In addition, for the neutral "N" state to be established, for instance, only the switching clutch C0 is engaged.

In contrast, for the shifting mechanism 70 to function as the continuously variable transmission, both the switching clutch C0 and the switching brake B0 are unengaged as indicated in the operation Table shown in FIG. 21. This allows the differential portion 11 to function as the continuously variable transmission, and the automatic shifting portion 72 connected to the differential portion 11 in series to function as the step variable transmission. When this takes place, the rotating speed input to the automatic shifting portion 72 for the gear positions placed in the 1st-gear, 2nd-gear and 3rd-gear positions, respectively, that is, the rotating speed of the transmitting member 18, is caused to continuously vary. This allows the respective gear positions to have speed ratios in continuously variable ranges. Accordingly, the automatic shifting portion 72 has a speed ratio that is continuously variable across the adjacent gear positions, causing the entire shifting mechanism 70 to have the overall speed ratio γT variable in a continuous fashion as a whole.

FIG. 22 shows a collinear chart representing relative relations on the rotating speeds of the rotary elements engaged in differing states for the intended gear positions in the shifting mechanism 70, respectively. The shifting mechanism 70 is structured with the differential portion 11 functioning as the continuously variable shifting portion or first shifting portion, and the automatic shifting portion 72 functioning as the step variable shifting portion or a second shifting portion. For the switching clutch C0 and the switching brake B0 to be unengaged, and for the switching clutch C0 or the switching brake B0 to be engaged, the rotary elements of the power distributing mechanism 16 rotate at the same speeds as those stated above.

In FIG. 22, the automatic shifting portion 72 operates on four vertical lines Y4, Y5, Y6 and Y7 corresponding to fourth to seventh rotary elements RE4 to RE7 in order from the left, respectively. The fourth rotary element (fourth element) RE4 represents that the second and third sun gears S2 and S3 are connected to each other. The fifth rotary element (fifth element) RE5 corresponds to the third carrier CA3. The sixth rotary element (sixth element) RE6 represents that the second carrier CA2 and the third ring gear R3 are connected to each other. The seventh rotary element (seventh element) RE7 corresponds to the second ring gear R2. Further, in the automatic shifting portion 72, the fourth rotary element RE4 is selectively connected to the transmitting member 18 via the second clutch C2 and selectively connected to the case 12 via the first brake B1. The fifth rotary element RE5 is selectively connected to the case 12 via the second brake B2. The sixth rotary element RE6 is connected to the output shaft 22 of the automatic shifting portion 72. The seventh rotary element RE7 is selectively connected to the transmitting member 18 via the first clutch C1.

The automatic shifting portion 72 operates in a manner as shown in FIG. 22. That is, with both the first clutch C1 and the second brake B2 being engaged, an intersection point between an inclined straight line L1 and the vertical line Y6 represents the rotating speed of the output shaft 22 in the 1st-speed position. The inclined straight line L1 passes across an intersection point between the vertical line Y7 indicative of the rotating speed of the seventh rotary element (seventh element) RE7 (R2), and an intersection point between the vertical line Y5 indicative of the rotating speed of the fifth rotary element RE5 (CA3), and a horizontal line X1. The vertical line Y6 represents the rotating speed of the sixth rotary element (sixth element) RE6 (CA2, R3) connected to the output shaft 22.

Likewise, an intersection point between an inclined straight line L2 determined with both the first clutch C1 and the first brake B1 being engaged, and the vertical line Y6 indicative of the rotating speed of the sixth rotary element RE6 connected to the output shaft 22, represents the rotating speed of the output shaft 22 in the 2nd-speed position. An intersection point between a horizontal straight line L3 determined with both the first clutch C1 and the second clutch C2 being engaged, and the vertical line Y6 indicative of the rotating speed of the sixth rotary element RE6 connected to the output shaft 22, represents the rotating speed of the output shaft 22 in the 3rd-speed position.

For the 1st-speed to the 3rd-speed positions, as a result of the switching clutch C0 being engaged, the differential portion 11 inputs drive power to the seventh rotary element RE7 at the same rotating speed as the engine speed $N_E$. However, as the switching brake B0 is engaged in place of the switching clutch C0, the differential portion 11 inputs drive power to the seventh rotary element RE7 at a rotating speed higher than the engine speed $N_E$. Thus, an intersection point between a horizontal straight line L4 determined with the first clutch C1, the second clutch C2 and the switching brake B0 being engaged, and the vertical line Y6 indicative of the rotating speed of the sixth rotary element RE6 connected to the output shaft 22, represents the rotating speed of the output shaft 22 in the 4th-speed position.

Even with the present embodiment, the shifting mechanism 70 includes the differential portion 11, functioning as the continuously variable transmission or the first shifting portion, and the automatic shifting portion 72 functioning as the step variable transmission or the second shifting portion. This allows the shifting mechanism 70 to have the same advantageous effects as those of the embodiment described above.

Embodiment 3

Figure 23:
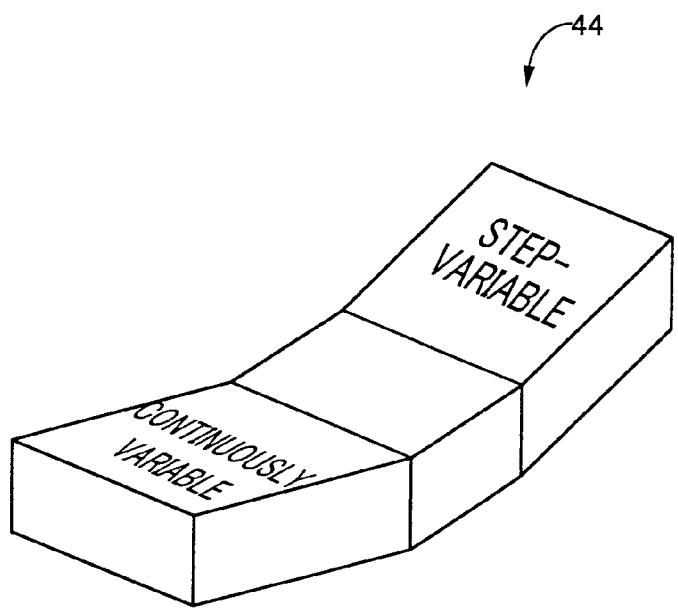
FIG. 23 is a view showing a seesaw type switch as a switching device, which is an example of a shifting state manual selection device to be manipulated by a vehicle driver for selecting a shifting state.

FIG. 23 shows an example a seesaw type switch 44 (hereinafter referred to as "switch 44"), acting as a shifting-state manual selection device, which is installed on a vehicle for a vehicle driver to manually operate. The switch 44 allows manual operation to cause the power distributing mechanism 16 to be selectively placed in the differential state and the non-differential state (locked state), that is, the continuously variable shifting state and the step variable shifting state of the shifting mechanism 10. The switch 44 allows the vehicle to run in a shifting state desired by the vehicle driver. The switch 44 has a continuously variable shift running command button with a display "CONTINUOUSLY VARIABLE", representing a continuously variable shift running mode, and a step variable shift running command button with a display "STEP VARIABLE" representing a step variable shift running mode. Upon depression of the vehicle driver on one of these buttons, the shifting mechanism 10 can be selectively placed in the continuously variable shifting state, operative as the electrically controlled continuously variable transmission, or the step variable shifting state operative as the step variable transmission.

The embodiments set forth above have been described with reference to the case wherein the shifting mechanism 10 performs the automatic switching control operation to be placed in the shifting state based on variations in the vehicle condition by referring to, for instance, the relational chart shown in FIG. 6. On the contrary, in place of the automatic switching control operation or in addition thereto, the switch 44 may be manipulated for thereby executing manual switching control for the shifting state of the shifting mechanism 10.

That is, the switching control means 50 may take priority to switch the shifting mechanism 10 to the continuously variable shifting state and the step variable shifting state, depending on the switch 44 selectively operated for the continuously variable shifting state and the step variable shifting state. For instance, if the vehicle driver, desiring a running mode with a touch of feeling in the continuously variable transmission and improved fuel economy, then manually selects the continuously variable shifting to be placed by the shifting mechanism 10. Further, if another running mode is desired with the step variable transmission performing the gear shifting accompanied by a rhythmical change in the engine rotating speed, the vehicle driver manually selects the step variable shifting state to be placed by the shifting mechanism 10.

Further, there exists a probability for the switch 44 not to be provided with a neutral position under which neither the continuously variable running mode nor the step variable running mode is selected. Under such a probability, if the switch 44 remains in a status with the neutral position, if no desired shifting state is selected by the vehicle driver or if the desired shifting state is under automatic switching mode, then, the automatic switching control may be executed for the shifting state of the shifting mechanism 10.

A case where the shifting state of the shifting mechanism 10 is subjected to the manually switched control by the manual operation of the switch instead the automatic switch control operation will be explained. In the flowchart shown in FIG. 2, whether or not the power distributing mechanism 16 is placed in the differential state, that is, the differential portion 11 is placed in the continuously variable shifting state, which is based on selection of the differential state of the power distributing mechanism 16, that is, the continuously variable shifting stated of the shifting mechanism 10.

Embodiment 4

Figure 24:
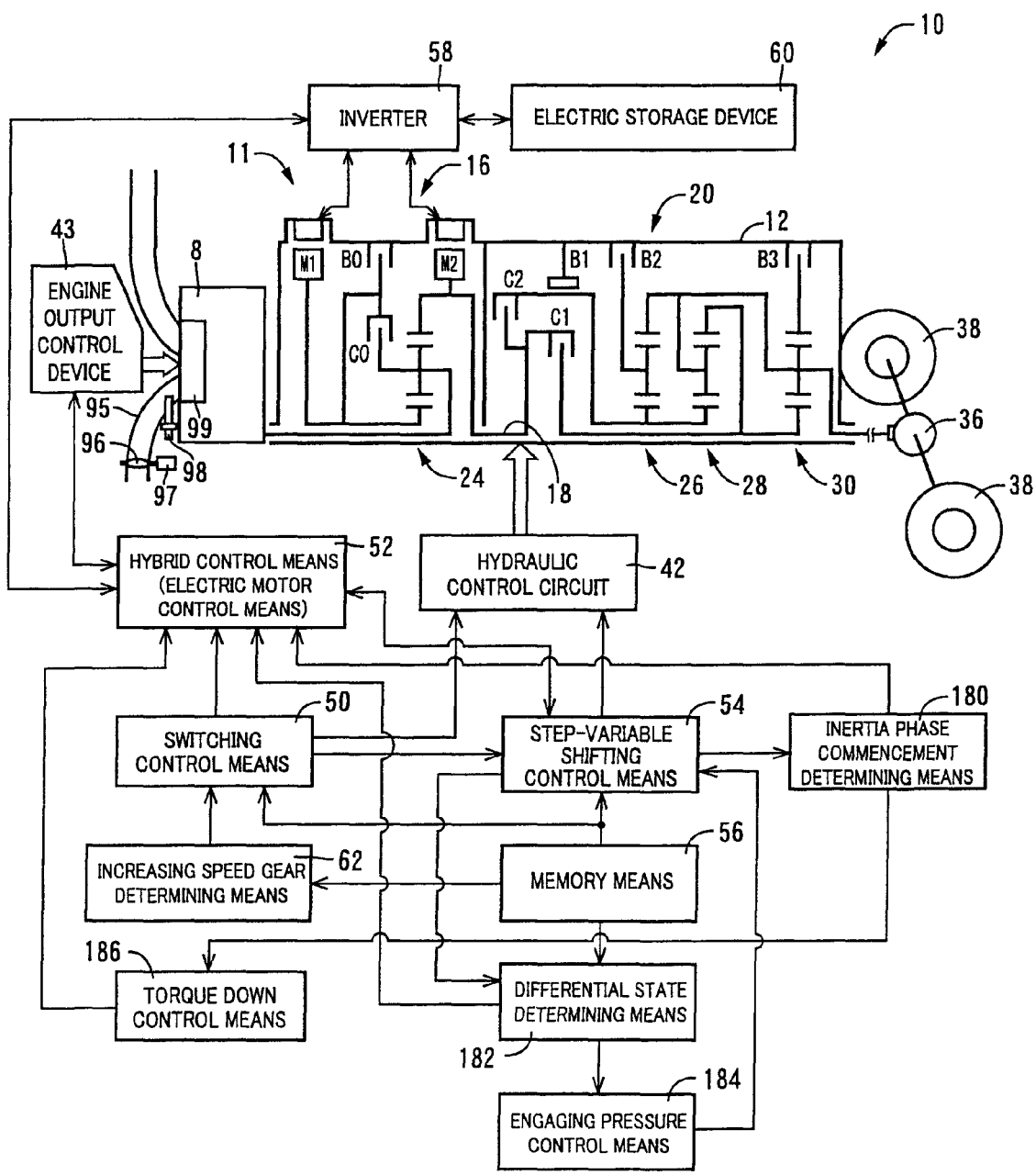
FIG. 24 is a function block diagram for explaining a main part of a control operation of the electronic control device shown in FIG. 4, in another embodiment of the present invention.

FIG. 24 is a functional block diagram showing a control function of the electronic control device 40. In this embodiment, control signals to the engine output control device 43 controlling the engine output are output from the electronic control device similar to above mentioned FIG. 4. The control signals include a drive signal to the throttle actuator 97 operating the throttle valve opening $\theta_{TH}$ of the electronic throttle valve 96 provided on the suction tube 95 of the engine 8, and a fuel supply quantity signal controlling the fuel supply quantity by the fuel injection device 98 to the suction tube 95 or the cylinder of the engine 8.

In the illustrated embodiment, the step variable shift control means 54 executes the shifting of the automatic shifting portion 20 to vary the speed ratio γT of the shifting mechanism 10 stepwise accompanied by a stepwise variation in the total speed ratio γT of the shifting mechanism on a stage before and after the shifting. This enables drive torque to be varied at a higher speed than that achieved in continuously varying the total speed ratio γT. On the contrary, there is likelihood that the shifting shocks occur or a difficulty is encountered in controlling the engine rotational speed $N_E$ so as to follow an optimum fuel consumption curve with a resultant deterioration in fuel consumption.

In view of the above situation, the hybrid control means 52 executes the shifting of the differential portion 11 in synchronism with the shifting of the automatic shifting portion 20. This suppresses the stepwise variation of the total speed ratio γT, i.e., a transitional variation of the total speed ratio γT is continuously varied during the shifting of the automatic shifting portion 20. In other words, the hybrid control means 52 executes the shifting of the differential portion 11 so as to allow the differential portion 11 to perform an electrically controlled CVT function (CVT action). This suppresses the variation in the engine rotational speed $N_E$ on a stage before and after the shifting of the automatic shifting portion 20.

More particularly, the automatic shifting portion 20 performs the shifting accompanied by the variation in the rotational speed $N_{18}$ of the transmitting member 18 (second electric motor M2) representing the input rotational speed $N_{IN}$ of the automatic shifting portion 20. The hybrid control means 52 executes the shifting of the differential portion 11 in synchronism with the shifting of the automatic shifting portion 20 regardless of variation of the rotational speed such that the engine rotational speed $N_E$ varies in a given status, i.e., at a speed less than a given engine rotational speed $N_E'$. As used herein the term "the given engine rotational speed $N_E'$" refers to a variation in engine rotational speed $N_E$ regarded that the variation in engine rotational speed $N_E$ is suppressed on a stage before and after the shifting of the automatic shifting portion 20 and the total speed ratio γT continuously achieves a transient change. That is, the given engine rotational speed $N_E'$ represents a given value, representing a target speed ratio γ0 to be varied during the shifting of the differential portion 11, which is preliminarily and experimentally obtained for storage.

For instance, the transient change of the total speed ratio γT does not non-continuously varies on the stage before and after the shifting of the automatic shifting portion 20, that is, the engine rotational speed $N_E$ is maintained at a nearly constant level. This allows the transient change of the total speed ratio γT to continuously vary. Therefore, the hybrid control means 52 executes the shifting of the differential portion 11 in synchronism with the shifting of the automatic shifting portion 20 such that the speed ratio γ0 varies in a direction opposite to that in which the speed ratio γ of the automatic shifting portion 20 is caused to vary, that is, the speed ratio γ0 is caused to vary by a variation quantity corresponding to the stepwise variation in the speed ratio γ of the automatic shifting portion 20.

Therefore, even if the speed ratio γ is caused to vary stepwise with the shifting of the automatic shifting portion 20, the stepwise variation in the total speed ratio γT is suppressed on the stage before and after the shifting of the automatic shifting portion 20, thereby suppressing the shifting shocks. Thus, the hybrid control mean 52 functions as electric motor control means for varying the rotational speed $N_{M1}$ of the first electric motor so as to preclude the variation in the engine rotational speed $N_E$ on the stage before and after the shifting of the automatic shifting portion 20. Such a function is executed regardless of the variation in the rotational speed (hereinafter referred to as "a rotational speed $N_{18}$) of the transmitting member 18 resulting form the shifting of the automatic shifting portion 20.

Further, the hybrid control means 52 allows the differential portion 11 to perform the electrically controlled CVT function for controlling the rotational speed $N_{M1}$ of the first electric motor M1 or the rotational speed $N_{M2}$ of the second electric motor M2, regardless of the vehicle remaining in a halted state or in a traveling state. This causes the engine rotational speed $N_E$ to be maintained at a nearly constant level or rotationally controlled at an arbitrary rotational speed. In other words, the hybrid control means 52 is possible to rotatably control the rotational speed $N_{M1}$ of the first electric motor M1 or the rotational speed $N_{M2}$ of the second electric motor M2 at the arbitrary rotational speed, while maintaining the engine rotational speed $N_E$ at the nearly constant level or controlling the engine rotational speed $N_E$ at the arbitrary rotational speed.

For instance, as will be seen from the collinear chart shown in FIG. 3, when raising the engine rotational speed $N_E$ during the running of the vehicle, the hybrid control means 52 executes the operation to raise the rotational speed $N_{M1}$ of the first electric motor, while maintaining the rotational speed $N_{M2}$ of the second electric motor M2 at a nearly constant level. Moreover, when maintaining the engine rotational speed $N_E$ at the nearly constant level during the shifting of the automatic shifting portion 20, the hybrid control means 52 varies the rotational speed $N_{M1}$ of the first electric motor in a direction opposite to that in which the rotational speed $N_{M2}$ of the second electric motor M2 is caused to vary depending on the shifting of the automatic shifting portion 20 while maintaining the engine rotational speed $N_E$ at the nearly constant level.

Upon switching the engaging/disengaging states of the engaging devices (the switching clutch C0 and the switching brake B0) based on the vehicle condition, the switching control means 50 selectively switches the continuously variable shifting state and the step variable shifting state, that is, the differential state and the locked state. For instance, the switching control means 50 determines whether the shifting state to be switched in the shifting mechanism 10 (differential portion 11) remains in a continuously variable control region for the shifting mechanism 10 to be placed in the continuously variable shifting state, or in a step variable control region for the shifting mechanism 10 to be placed in the step variable shifting state. This determination depends on the vehicle condition designated by the vehicle speed V and demanded output torque $T_{OUT}$ by referring to the shifting diagram (the shifting map and the relationship) plotted in a broken line or a long dash and short dash line of FIG. 6 preliminarily stored in the storage means 56. The switching control means 50 selectively switches the shifting mechanism 10 to any one of the continuously variable shifting state and the step variable shifting state depending on the determined result.

Thus, upon switching the engaging/disengaging state of the switching clutch C0 or the switching brake B0, the switching control means 50 functions as an electrically controlled differential device in a non-continuously variable shifting state, that is, differential action limiting means for limiting the operation of an electrically controlled continuously variable transmission. For instance, the switching control means 50 determines whether or not a failure or defective function occurs in control equipment, such as an electric motor or the like, of an electrical system for actuating the differential portion 11 as the electrically controlled continuously variable transmission. With such a failure or a defective function being present, the shifting mechanism 10 is placed in the step variable shifting state on a priority basis.

The shifting mechanism 10 of the present embodiment includes, in addition to the differential portion 11, the automatic shifting portion 20 and the step variable shift control means 54 execute the shifting based on the vehicle condition upon referring to, for instance, the shifting diagram shown in FIG. 6. With the shifting of the automatic shifting portion 20 being executed, the input rotational speed $N_{IN}$ of the automatic shifting portion 20 is caused to vary with the shifting provided that the vehicle speed V remains constant on a stage before and after the shifting.

The engaging hydraulic pressures of the on-disengaging side engaging device and the on-engaging side engaging device, associated with the shifting of the automatic shifting portion 20, and actuating timings at which these engaging devices are engaged or disengaged are uniformly set depending on engine torque $T_E$. This allows the input rotational speed $N_{IN}$, that is, the rotational speed $N_{18}$ of the transmitting member 18, variable with the shifting of the automatic shifting portion 20 to achieve a given varying state.

As used herein, the term "the given varying state of the rotational speed $N_{18}$ of the transmitting member 18" refers to a varying state, such as a given varying rate, which is preliminarily and experimentally obtained so as to cause the rotational speed $N_{18}$ of the transmitting member 18, uniquely determined with the vehicle speed V and the speed ratio γ of the automatic shifting portion 20, to achieve an idealistic state during the shifting of the automatic shifting portion 20. For instance, as the varying rate $N_{18}'$ (=d $N_{18}$/dt) of the rotational speed $N_{18}$ of the transmitting member 18 increases during the shifting of the automatic shifting portion 20, then, a rapid shifting response is obtained with a comfortable feeling effect. If the varying rate $N_{18}'$ decreases, then, a slow shifting response is obtained with an ease of suppressing the shifting shocks. That is, there is a combined effect between the shortening of the shifting time and the suppression of the shifting shocks.

However, the rotary elements, suffering inertia, will be different depending on a situation where, for instance, the shifting is independently executed in the automatic shifting portion 20, or a situation where the shifting of the differential portion 11 is performed in combination with the shifting of the automatic shifting portion 20. Therefore, if the engaging pressures of the engaging devices associated with the shifting of the automatic shifting portion 20 are uniquely set, then, the rotational speed $N_{18}$ of the transmitting member 18 becomes hard to achieve the given varying state with a resultant likelihood of an increase in shifting shocks. In contrast, if the engaging pressures of the engaging devices are controlled so as to allow the rotational speed $N_{18}$ of the transmitting member 18 to achieve the given varying state during the shifting of the automatic shifting portion 20, then, the relevant control becomes complicated with a resultant likelihood of an increase in shifting shocks.

The shifting mechanism 10 (the differential portion 11 and the power transmitting mechanism 16) of the present embodiment can be selectively switched to the continuously variable shifting state (differential state) and the non-continuously variable shifting state (locked state). The switching control means 50 executes the operation based on the vehicle condition to determine a shifting state to be switched in the differential portion 11, thereby selectively switching the differential portion 11 to either the continuously variable shifting state or the step variable shifting state.

If the automatic shifting portion 20 performs the shifting with the differential portion 11 placed in, for instance, the continuously variable shifting state, the hybrid control means 52 controls the electrically controlled CVT function (differential action) for thereby performing the shifting of the differential portion 11. In this moment, the differential portion 11 performs the shifting in synchronism with the shifting of the automatic shifting portion 20 so as to suppress the engine rotational speed $N_E$ on a stage before and after the shifting of the automatic shifting portion 20, that is, for instance, to maintain the rotational speed $N_{18}$ of the transmitting member 18 at a nearly constant level, regardless of the variation in the rotational speed $N_{18}$ of the transmitting member 18 resulting from the relevant shifting.

Further, if the automatic shifting portion 20 perform the shifting with the differential portion 11 placed in, for instance, the step variable shifting state, the speed ratio γ0 of the differential portion 11 is also fixed. This causes the engine rotational speed $N_E$, like the rotational speed $N_{18}$ of the transmitting member 18, to be uniquely determined with the vehicle speed V and the speed ratio γ of the automatic shifting portion 20. In other words, under a circumstance where the differential portion 11 is placed in the step variable shifting state, the hybrid control means 52 controls the electrically controlled CVT function (differential action) using the first electric motor M1 for shifting the differential portion 11 with no difficulty of suppressing the engine rotational speed $N_E$, in synchronism with the shifting of the automatic shifting portion 20 on the stage before and after the shifting thereof.

Then, as viewed the engine 8 from the automatic shifting portion 20, a different inertia mass occurs during the shifting depending on the continuously variable shifting state and the non-continuously variable shifting state of the differential portion 11. In the former state, the differential action allows the engine rotational speed $N_E$ to freely vary regardless of the variation in the rotational speed $N_{18}$ of the transmitting member 18. In the latter state, the engine rotational speed $N_E$ is caused to vary in a mode like the variation in the rotational speed $N_{18}$ of the transmitting member 18.

In other words, with the differential portion 11 placed in the non-continuously variable shifting state, the inertia increases during the shifting due to the resulting variation in the engine rotational speed $N_E$, than that appearing with the differential portion 11 placed in the continuously variable shifting state. Therefore, as set forth above, if the engaging device associated with the shifting of the automatic shifting portion 20 has the engaging pressure uniquely determined for the continuously variable shifting state and the non-continuously variable shifting state of the differential portion 11, the shifting shock tends to increase. This is because the rotational speed $N_{18}$ of the transmitting member 18 becomes hard to attain the given varying state.

In the illustrated embodiment, with the differential portion 11 placed in the continuously variable shifting state, as a matter of course, the shifting mechanism 10 performs the shifting during the shifting of the automatic shifting portion 20 even when placed in the step variable shifting state so as to suppress the occurrence of shifting shocks. Hereunder, detailed description will be made of such a shifting operation.

In FIG. 24, the hybrid control means 52 has, in addition to the function mentioned above, a function to act as electric motor control means for varying the rotational speed $N_{18}$ of the transmitting member 18, during the shifting (during a period in which the shifting transition occurs) of the automatic shifting portion 20. This is performed using the first electric motor M1 and/or the second electric motor M2. More particularly, the hybrid control means 52 varies the rotational speed $N_{18}$ of the transmitting member 18 so as to cause the same to achieve the given varying state using the first electric motor M1 and/or the second electric motor M2, during the inertia phase in the course of the shifting of the automatic shifting portion 20.

This allows the rotational speed $N_{18}$ of the transmitting member 18 to approach the given varying state to a further extent than that varying with the shifting of the automatic shifting portion 20 mainly caused thorough the engaging actions of the on-disengaging side engaging device and the on-engaging side engaging device. In addition, the hybrid control means 52 may suffice to vary the rotational speed $N_{18}$ of the transmitting member 18 mainly using the first electric motor M1 and/or the second electric motor M2. This results in a further simplification in control than that achieved when the engaging pressure of the engaging device is controlled in consideration of the shifting control executed in the differential portion 11.

As used herein, the expression "the rotational speed $N_{18}$ of the transmitting member 18 varying with the shifting of the automatic shifting portion 20 mainly caused thorough the engaging actions of the on-disengaging side engaging device and the on-engaging side engaging device" refers to the following case. This corresponds to a case employing the engaging pressure, preliminarily and uniquely determined, such that, for instance, the rotational speed $N_{18}$ of the transmitting member 18 achieves the given varying state.

Inertia phase commencement determining means 180 determines whether or not the inertia phase is commenced in the shifting process of the automatic shifting portion 20 in a manner described below. That is, this determination is made depending on whether or not the rotational speed $N_{18}$ of the transmitting member 18 begins to vary. This variation results from operation of the step variable shift control means 54 on determining the shifting of the automatic shifting portion 20 to disengage the on-disengaging side engaging device, after which the on-engaging side engaging device commences to have a engaging torque capacity.

For instance, the inertia phase commencement determining means 180 operates in any of the following modes to determine whether or not the rotational speed $N_{M2}$ of the second electric motor M2 commences to vary due to the operation of the on-engaging side engaging device commencing to have the engaging torque capacity. First, the determination depends on whether or not the actual rotational speed $N_{18}$ of the transmitting member 18, that is, the rotational speed $N_{M2}$ of the second electric motor M2, varies by a given amount preliminarily and experimentally obtained for determining the commencement of the inertia phase during the operation of the step variable shift control means 54 to perform the shifting of the automatic shifting portion 20.

Second, the determination depends on whether or not there is an elapse of a given time interval, preliminarily and experimentally obtained as a time for the on-engaging side engaging device to commence to have the engaging torque capacity, when the step variable shift control means 54 determines the shifting of the automatic shifting portion 20. Third, the determination depends on whether or not the engaging pressure of the on-engaging side engaging device reaches a engaging transition hydraulic pressure (command) value Pc preliminarily and experimentally obtained as a hydraulic pressure (command) value for the engaging pressure of the on-engaging side engaging device to begin to have the engaging torque capacity.

In the illustrated embodiment, the shifting mechanism 10 is operative to be selectively switched to the continuously variable shifting state and the non-continuously variable shifting state. During the shifting (sifting transition period) of the automatic shifting portion 20 with the shifting mechanism 10 placed in the continuously variable shifting state, like the rotational speed $N_{18}$ of the transmitting member 18, the engine rotational speed $N_E$ can be uniquely determined with the vehicle speed V and the speed ratio γ of the automatic shifting portion 20. Accordingly, the hybrid control means 52 may function as the electric motor control means for varying the engine rotational speed $N_E$ using the first electric motor M1 and/or the second electric motor M2. Hereunder, detailed description will be given of control operations for altering a varying method of the rotational speed $N_{18}$ of the transmitting member 18 or the engine rotational speed $N_E$, depending on whether during the shifting of the automatic shifting portion 20, the differential mechanism 11 is placed in the continuously variable shifting state or in the non-continuously variable shifting state.

If the determination is made that the automatic shifting portion 20 has executed the shifting, the differential state determining means 182 determines whether or not the power distributing mechanism 16 is placed in the differential state, that is, whether or not the differential portion 11 is placed in the continuously variable shifting state. The determination on shifting is made when, for instance, the step variable shifting control means 54 determines a speed position to be shifted in the automatic shifting portion 20 based on the vehicle condition upon referring to the shifting diagram shown in FIG. 6.

For instance, the differential state determining means 182 determines whether there is a step variable control region for the switching control means 50 to controllably switch the shifting mechanism 10 to the step variable shifting state or a continuously variable control region for the continuously variable shifting state to be switched. For this purpose, the determination is made whether or not the differential portion 11 is placed in the continuously variable shifting state, based on whether or not there is the continuously variable control region depending on the vehicle condition represented by the vehicle speed V and output torque $T_{OUT}$ by referring to the shifting diagram shown in FIG. 6.

During the operation of the step variable shift control means 54 for executing the shifting of the automatic shifting portion 20, sometimes the differential state determining means 182 determines that the differential portion 11 is placed in the continuously variable shifting state. When this takes place, the hybrid control means 52 varies the rotational speed $N_{18}$ of the transmitting member 18 using the first electric motor M1 and/or the second electric motor M2 so as to allow the same to achieve the given varying state during the inertia phase in the course of the shifting of the automatic shifting portion 20.

Further, during the inertia phase in the course of the shifting of the automatic shifting portion 20, the hybrid control means 52 executes the shifting of the differential portion 11. The shifting is executed so as to allow the differential portion 11 to perform the differential action, that is, the electrically controlled continuously variable shifting action for maintaining the engine rotational speed $N_E$ at a nearly constant level on a stage before and after the shifting of the automatic shifting portion 20, regardless of the variation in the rotational speed $N_{18}$ of the transmitting member 18. For instance, the hybrid control means 52 varies the speed ratio γ of the differential portion 11 in a direction opposite to that in which the speed ratio γ of the automatic shifting portion 20 is caused to vary during the inertia phase such that the engine rotational speed $N_E$ is maintained at a nearly constant level.

Alternately, during the operation of the step variable shift control means 54 for executing the shifting of the automatic shifting portion 20, sometimes the differential state determining means 182 determines that the differential portion 11 is placed in the non-continuously variable shifting state. When this takes place, the hybrid control means 52 varies the rotational speed $N_{18}$ of the transmitting member 18 or the engine rotational speed $N_E$ using the first electric motor M1 and/or the second electric motor M2 during the inertia phase in the course of the shifting of the automatic shifting portion 20. That is, the operation is executed such that the rotational speed $N_{18}$ of the transmitting member 18 achieves the given varying state or the engine rotational speed $N_E$ achieves the given varying state.

As used herein, the term "the given varying state of the engine rotational speed $N_E$" refers to a varying state, such as a given varying rate, which is preliminarily and experimentally obtained, so as to cause the engine rotational speed $N_E$, uniquely determined with the vehicle speed V and the speed ratio γ of the automatic shifting portion 20, to achieve an idealistic state of the engine rotational speed $N_E$ during non-differential state of the differential portion 11, similar to the given varying state of the input rotational speed $N_{IN}$ of the automatic shifting portion 20.

For instance, as the varying rate $N_E'$ (=d $N_E$/dt) of the engine rotational speed $N_E$ increases during the shifting of the automatic shifting portion 20, then, a rapid shifting response is obtained with a comfortable feeling effect. If the varying rate $N_E'$ decreases, then, a slow shifting response is obtained with an ease of suppressing the shifting shocks. That is, there is a combined effect between the shortening of the shifting time and the suppression of the shifting shocks.

This allows the rotational speed $N_{18}$ of the transmitting member 18 and the engine rotational speed $N_E$ (only in the non-differential shifting state of the differential portion 11) to approach the given varying state to a further extent than that varying with the shifting of the automatic shifting portion 20 mainly caused through the engaging actions of the on-disengaging side engaging device and the on-engaging side engaging device.

In addition, the hybrid control means 52 may suffice to vary the rotational speed $N_{18}$ of the transmitting member 18 or the engine rotational speed $N_E$ (only in the non-differential shifting state of the differential portion 11) mainly using the first electric motor M1 and/or the second electric motor M2. This results in a further simplification in control than that achieved when the engaging pressure of the engaging device is controlled in consideration of the shifting control executed in the differential portion 11.

As used herein, the expression "the rotational speed $N_{18}$ of the transmitting member 18 and the engine rotational speed $N_E$ (only in the non-differential shifting state of the differential portion 11) varying with the shifting of the automatic shifting portion 20 mainly caused thorough the engaging actions of the on-disengaging side engaging device and the on-engaging side engaging device" refers to the following case. This corresponds to a case employing the engaging pressure, preliminarily and uniquely determined, such that, for instance, the rotational speed $N_{18}$ of the transmitting member 18 or the engine rotational speed $N_E$ (only in the non-differential shifting state of the differential portion 11) achieves the given varying state.

Thus, during the inertia phase in the course of the shifting of the automatic shifting portion 20 with the differential portion 11 placed in the continuously variable shifting state, the hybrid control means 52 varies the rotational speed $N_{18}$ of the transmitting member 18 and the engine rotational speed $N_E$ using the first electric motor M1 and/or the second electric motor M2. This allows the rotational speed $N_{18}$ of the transmitting member 18 to achieve the given varying state and the engine rotational speed $N_E$ to be maintained at the nearly constant level. In contrast, during the inertia phase in the course of the shifting of the automatic shifting portion 20 with the differential portion 11 placed in the non-continuously variable shifting state, the hybrid control means 52 varies the rotational speed $N_{18}$ of the transmitting member 18 or the engine rotational speed $N_E$ using the first electric motor M1 and/or the second electric motor M2. This allows the rotational speed $N_{18}$ of the transmitting member 18 or the engine rotational speed $N_E$ to achieve the given varying states.

Thus, during the operation of the step variable shift control means 54 for executing the shifting of the automatic shifting portion 20, the operation is executed to alter the varying method of the rotational speed $N_{18}$ of the transmitting member 18 or the engine rotational speed $N_E$ during the inertia phase using the first electric motor M1 and/or the second electric motor M2, based on whether the differential portion 11 is placed in the continuously variable shifting state or the non-continuously variable shifting state.

The step variable shift control means 54 executes the shifting of the automatic shifting portion 20 through the engaging operations of the on-disengaging side engaging device and the on-engaging side engaging device using the engaging pressures uniquely and preliminarily determined such that the rotational speed $N_{18}$ of the transmitting member 18 achieves the given varying state. During the operation in such shifting, the hybrid control means 52 varies the rotational speed $N_{18}$ of the transmitting member 18 using the first electric motor M1 and/or the second electric motor M2 such that the rotational speed $N_{18}$ of the transmitting member 18 achieves the given varying state. In addition, the engaging pressure of the engaging device may be controlled so as to allow the rotational speed $N_{18}$ of the transmitting member 18 to further approach the given varying state or to compensate the operations of the first electric motor M1 and/or the second electric motor M2 for the purpose of further suppressing the shifting shocks.

More particularly, during the shifting (shifting transition period) of the automatic shifting portion 20, the engaging pressure control means 184 varies the engaging pressure of the engaging device associated with the shifting of the automatic shifting portion 20. That is, the operation is executed to control the engaging pressures of the on-disengaging side engaging device and the on-engaging side engaging device associated with the shifting of the automatic shifting portion 20. The engaging pressure is varied in phase with the operation of the hybrid control means 52 for varying the rotational speed $N_{18}$ of the transmitting member 18 using the first electric motor M1 and/or the second electric motor M2.

In addition, during the shifting (shifting transition period) of the automatic shifting portion 20 with the shifting mechanism 10 placed in the non-continuously variable shifting state, like the rotational speed $N_{18}$ of the transmitting member 18, the engine rotational speed $N_E$ is uniquely determined based on the vehicle speed V and the speed ratio γ of the automatic shifting portion 20. Therefore, the engaging pressure control means 184 may vary the engine rotational speed $N_E$ upon controlling the engaging pressure of the engaging device associated with the shifting of the automatic shifting portion 20.

For instance, during the operation of the step variable shift control means 54 for executing the shifting of the automatic shifting portion 20, sometimes the differential state determining means 182 determines that the differential portion 11 is placed in the continuously variable shifting state. In this moment, the step variable shifting control means 54 controls the engaging pressure of the engaging device associated with the shifting of the automatic shifting portion 20 for use in a hydraulic pressure command (shift command) to be output to the hydraulic pressure control circuit 42. The engaging pressure is controlled in phase with the operation of the hybrid control means 52 for varying the rotational speed $N_{18}$ of the transmitting member 18 using the first electric motor M1 and/or the second electric motor M2.

During the operation of the step variable shift control means 54 for executing the shifting of the automatic shifting portion 20, differential state determining means 182 determines during the operation of the step variable control means 54 for executing the shifting of the automatic shifting portion 20 that the differential portion 11 is placed in the non-continuously variable shifting state. In this moment, the engaging pressure control means 184 controls the engaging pressure of the engaging device associated with the shifting of the automatic shifting portion 20 for use in the hydraulic pressure command (shifting output) to be output to the hydraulic pressure control circuit 42 by the step variable control means 54.

This is because such a control enables the rotational speed $N_{18}$ of the transmitting member 18 to achieve the given varying state, or the engine rotational speed $N_E$ to achieve the given varying state during the inertia phase, in the course of the shifting of the automatic shifting portion 20. The engaging pressure is controlled in phase with the operation of the hybrid control means 52 for controlling the rotational speed $N_{18}$ of the transmitting member 18 or the engine rotational speed $N_E$ so as to cause the same to achieve the given varying state using the first electric motor M1 and/or the second electric motor M2.

Torque-down control means 186 decreases torque to be transferred to the drive wheels 38. To this end, for instance, a command on engine torque-down control is output to the hybrid control means 52 for throttling the opening of an electronic throttle valve 96, actuating a fuel injection valve 98 to reduce a fuel supply quantity and actuating an ignition device 99 to retard an ignition timing of an engine 8, for thereby decreasing engine torque $T_E$. This achieves a reduction in torque, such as, for instance, input torque $T_{IN}$ and output torque $T_{out}$ of the automatic shifting portion 20, which is transferred to the drive wheels 38.

Further, the torque-down control means 186 outputs, in addition to the engine torque-down control, the command on the electric motor torque-down control in combination with or in a sole manner to the hybrid control means 52. Such a command allows the inverter 58 to control the second electric motor M2 so as to temporarily generate reverse drive torque or regenerative braking torque for charging the electric storage device 60. This enables a reduction in torque being transferred from the second electric motor M2 to the drive wheels 38.

The switching control means 50 often switches the differential portion 11 (shifting mechanism 10) to the step variable shifting state to allow a whole of the shifting mechanism 10 to function as a step variable automatic transmission. For instance, as the step variable shift control means 54 executes the up-shifting of the automatic shifting portion 20 accompanied by the occurrence of a variation in the input rotational speed $N_{IN}$ of the automatic shifting portion 20, that is, the rotational speed $N_{18}$ of the transmitting member 18. During such a so-called inertia phase, energy temporarily released from the engine 8 with the occurrence of a reduction in the engine rotational speed $N_E$ appears as a torque increment of torque being transferred to the drive wheels 38, a torque increment of input torque $T_{IN}$ or a torque increment of output torque $T_{OUT}$. Such a so-called inertia torque has a probability to cause shifting shocks to occur.

Alternately, for instance, during the inertia phase in the course of the shifting of the automatic shifting portion 20 initiated by the step variable shift control means 54, a drop occurs in a rotational speeds of at least one of the second rotary element RE2 and the third rotary element RE3 of the differential portion 11 and/or the fourth to eighth rotary elements RE4 to RE8 of the automatic shifting portion 20. Such a drop in rotational speed causes inertia torque to occur as the torque increment of torque being transferred to the drive wheels 38, resulting in the shifting shocks.

Further, under a circumstance where the switching control means 50 switches the shifting mechanism 10 to the continuously variable shifting state to allow the whole of the shifting mechanism 10 to function as the continuously variable transmission, for instance, the step variable shift control means 54 executes the shifting of the automatic shifting portion 20. The hybrid control means 52 executes the shifting of the differential portion 11 so as to avoid the variation in the total speed ratio γT of the shifting mechanism 10 on a stage before and after the shifting of the automatic shifting portion 20 or to minimize such a variation in a continuous variation. Under such a shifting process, no variation takes place in the engine rotational speed $N_E$ or the variation in the engine rotational speed $N_E$ is minimized.

Even under such a status, however, if the automatic shifting portion 20 executes the shifting, the inertia phase, occurring in the course of such a shifting, causes a drop in the rotational speed of at least one of the second rotary element RE2 and the rotary element RE3 of the differential portion 11 and/or the fourth to eighth rotary elements RE4 to RE8 of the automatic shifting portion 20. Such a drop in rotational speed causes inertia torque to occur as the torque increment of torque being transferred to the drive wheels 38, resulting in the shifting shocks.

The torque-down control means 186 may operate to decrease torque, transferred to the drive wheels 38 during the shifting of the automatic shifting portion 20 effectuated by the step variable shift control means 54, for instance, input torque $T_{IN}$ or output torque $T_{OUT}$ of the automatic shifting portion 20. More particularly, the torque-down control means 186 cancels a torque component, equivalent to inertia torque, in, for instance, input torque $T_{IN}$ or output torque $T_{OUT}$, thereby minimizing the shifting shocks resulting from inertia torque. To this end, the engine torque-down control or the electric motor torque-down control may be executed in combination or in an independent manner for thereby reducing torque being transferred to the drive wheels 38. The torque-down control means 186 may decrease torque during the inertia phase in the course of the shifting of the automatic shifting portion 20.

Further, the torque-down control means 186 performs a function instead of the above-described function or in addition thereto for canceling a fluctuation in torque, occurring with a completion in engaging of the engaging device initiated by the step variable shift control means 54, to some extent. This result in a reduction in torque being transferred to the drive wheels 38, thereby minimizing the engaging shocks.

Thus, the torque-down control means 186 reduces input torque $T_{IN}$ so as to cancel the torque components, corresponding to inertia torque caused by the variation in the rotational speed of the rotary element in the automatic shifting portion 20 with the occurrence of the shifting of the automatic shifting portion 20, or inertia torque caused by the variation in the rotational speed, inclusive of the engine rotational speed $N_E$, of the rotary element in the differential portion 11. Simultaneously or separately, the fluctuation in torque, resulting from the completion in engaging of the engaging device of the automatic shifting portion 20, is cancelled to some extent so as to minimize the engaging shocks, thereby suppressing the shifting shocks in such a way.

Figure 25:
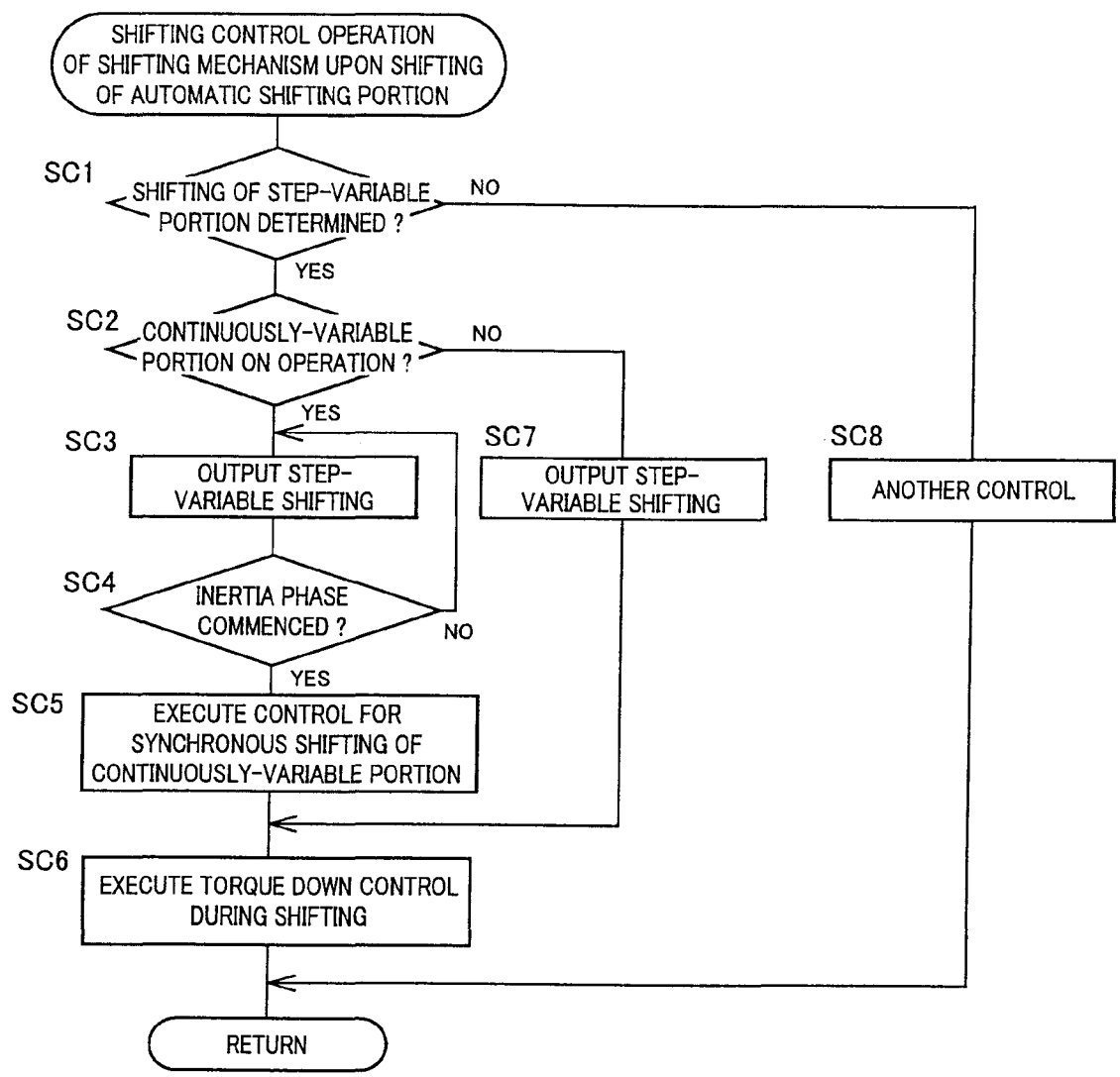
FIG. 25 is a flowchart for explaining control operation of the electronic control device in the embodiment shown in FIG. 24, that is a shifting control operation in the differential portion upon control operation of the automatic shifting portion.

FIG. 25 is a flowchart illustrating an essence of control operations to be executed by the electronic control device 40, that is, the shifting control operations to be executed by the shifting mechanism 20. This sequence is repeatedly executed on an extremely short cycle time in the order of about several milliseconds to several tens milliseconds.

With the differential portion 11 placed in the continuously variable shifting state due to the control executed as indicated in the flowchart shown FIG. 25, the automatic shifting portion 20 executes the up-shifting in 2nd→3rd gear speed under the same control operation as that shown in FIG. 13. With the differential portion 11 placed in the continuously variable shifting state, the automatic shifting portion 20 executes a coast down-shifting in 3rd→2nd gear speed under the same control operation as that shown in FIG. 14. With the differential portion 11 placed in the continuously variable shifting state, the automatic shifting portion 20 executes the coast down-shifting in 3rd→2nd gear speed under the same control operation as that shown in FIG. 15. With the differential portion 11 placed in the step variable shifting state (locked state), the automatic shifting portion 20 executes the up-shifting in 2nd 3rd gear speed under the same control operation as that shown in FIG. 16. With the differential portion 11 placed in the step variable shifting state (locked state), the automatic shifting portion 20 executes the coast down-shifting in 3rd→2nd gear speed under the same control operation as that shown in FIG. 17.

First in step SC1 corresponding to the step variable shift control means 54, the determination is made whether or not the shifting is executed in the automatic shifting portion 20. For instance, the determination depends on whether or not the gear position to be shifted in the automatic shifting portion 20 is determined depending on the vehicle speed V and the vehicle condition, represented by output torque $T_{OUT}$ of the automatic shifting portion 20, upon referring to the shifting diagram shown in FIG. 6.

A time instant $t_1$ in FIG. 13 and a time instant $t_1$ in FIG. 16 represent that the up-shifting "2nd→3rd" gear ratio in the automatic shifting portion 20 is determined. Further, a time instant $t_1$ in FIG. 14 and a time instant $t_1$ in FIG. 17 represent that the downshifting "3rd→2nd" gear ratio in the automatic shifting portion 20 is determined.

If the determination in step SC1 is made positive, then, in step SC2 corresponding to the differential state determining means 182, the determination is made whether or not the power distributing mechanism 16 is placed in the differential state, or whether or not the differential portion (continuously variable shifting) 11 is placed in the continuously variable shifting state. For instance, the determination depends on whether or not the differential portion 11 is placed in the continuously variable shifting state, depending on whether or not the continuously variable control region is present for the shifting mechanism 10 to be placed in the continuously variable shifting state, based on the vehicle condition upon referring to the shifting diagram shown in FIG. 6.

If the determination in step SC2 is made positive, then in step SC3 corresponding to the step variable shift control means 54, then, the shift command (hydraulic pressure command) is output to the hydraulic pressure control circuit 42 for the automatic shifting portion 20 to be shifted to the gear position determined in step SC1. The hydraulic pressure value for use in such a hydraulic pressure command is an engaging pressure value preliminarily and uniquely determined so as to cause the rotational speed $N_{18}$ of the transmitting member 18 to achieve the given varying state.

The time instant $t_1$ in FIG. 13 indicates a timing at which with the differential portion (continuously variable portion) 11 remained under the continuously variable shifting state (differential state), a shift command is output for the automatic shifting portion 20 to perform a shift in the 3rd-gear position to begin decreasing an disengaging hydraulic pressure $P_{B2}$ of the second brake B2 acting as the on-disengaging side engaging device. During a time period from $t_1$ to $t_3$, an engaging hydraulic pressure $P_{B1}$ of the first brake B1 acting as the on-engaging side engaging device is raised, and at time instant $t_3$, the engaging action of the first brake B1 is completed to finish a series of shifting operations. A transition hydraulic pressure in the on-disengaging side engaging device and a transition hydraulic pressure in the on-engaging side engaging device are preliminarily set.

The time instant $t_1$ in FIG. 14 indicates a timing at which with the differential portion (continuously variable portion) 11 remained under the continuously variable shifting state (differential state), a shift command is output for the automatic shifting portion 20 to perform a shift in the 2nd-gear position to begin decreasing an disengaging hydraulic pressure $P_{B1}$ of the first brake B1 acting as the on-disengaging side engaging device. During a time period from $t_1$ to $t_4$, a engaging i.e., an engaging hydraulic pressure $P_{B2}$ of the second brake B2 acting as the on-engaging side engaging device is raised, and at time instant $t_4$, the engaging action of the second brake B2 is completed to finish a series of shifting operations. A transition hydraulic pressure in the on-disengaging side engaging device and a transition hydraulic pressure in the on-engaging side engaging device are preliminarily set.

For instance, as shown in FIG. 15, at the timing when the on-engaging side engaging device commences to supply the hydraulic pressure to the engaging device, a high hydraulic pressure command is output so as to rapidly fill the on-engaging side engaging device with actuating oil for immediately plug the back-clearance. In this moment, if the on-engaging side engaging device is continuously engaged with such a high hydraulic pressure intact, the engaging shocks are liable to occur.

In consecutive step SC4 corresponding to the inertia phase commencement determining means 180, the determination is made whether or not the inertia phase is commenced to occur in the course of the shifting in the automatic shifting portion 20. The determination depends on any of the following factors. First, the factor depends on whether or not an actual rotational speed $N_{M2}$ of the second electric motor M2 varies by a given quantity preliminarily and experimentally obtained for determining the commencement of the inertia phase. Second, the factor depends on whether or not there is an elapse of a given time interval preliminarily and experimentally obtained as a time for the on-engaging side engaging device to commence having an engaging torque capacity. Third, the factor depends on whether or not the engaging hydraulic pressure of the on-engaging side engaging device reaches a engaging transition hydraulic pressure (command) value $P_c$ preliminarily and experimentally obtained as a hydraulic pressure (command) value to have a engaging torque capacity.

The time instant $t_2$ in FIG. 13 and the time instant $t_2$ in FIG. 14 indicate that the initiation of the inertia phase is determined. Such a determination depends on one of the following statuses. A first state is whether or not the actual rotation speed $N_{M2}$ of the second electric motor M2 varies in the given value preliminarily and experimentally determined for the initiation of the inertia phase to be determined. A second state is whether or not the time interval for the on-engaging side engaging device to have the engaging torque capacity has elapsed a given time interval that is preliminarily and experimentally determined. A third state is whether or not the engaging hydraulic pressure of the on-engaging side engaging device reaches the engaging transition hydraulic pressure (command) value Pc that is preliminarily and experimentally determined.

If the determination in step SC4 is made negative, then, the operation in step SC4 is repeatedly executed. If the determination in step SC4 is made positive, then in step SC5 corresponding to the hybrid control means 52, the operation is executed to vary the rotational speed $N_{18}$ of the transmitting member 18 and the engine rotational speed $N_E$ using the first electric motor M1 and/or the second electric motor M2. This allows the differential portion 11 to perform the differential action, that is, to perform an electrically controlled continuously variable shifting action to maintain the engine rotational speed $N_E$ at the nearly constant level such that the rotational speed $N_{18}$ of the transmitting member 18 achieves the given varying state.

For instance, the differential portion 11 executes the shifting so as to vary the speed ratio $\gamma 0$ in a direction opposite to that in which the speed ratio $\gamma$ is varied in the automatic shifting portion 20. This allows the engine rotational speed $N_E$ to be maintained at the nearly constant level while varying the rotational speed $N_{18}$ of the transmitting member 18 so as to achieve the given varying state. During the operations in steps SC3 to SC5, the total speed ratio γT of the shifting mechanism 10 is caused to continuously vary on a stage before and after the shifting of the automatic shifting portion 20. In addition, in step SC5, the commencement of the inertia phase may be determined and, in such a case, no step SC4 needs to be executed.

The time period between $t_2$ and $t_3$ in FIG. 13 and the time period between $t_2$ and $t_4$ in FIG. 14 indicate that during the inertia phase occurring in the course of the shifting of the automatic shifting portion 20, the differential portion 11 performs the differential action to control the rotation speed $N_{M1}$ of the first electric motor M1 to cause the differential portion 11 to change the gear ratio in a direction opposite to that, in which the automatic shifting portion 20 changes the gear ratio, by a variable corresponding to a change in such a gear ratio. During such a time period, the differential portion 11 performs the differential action on the stage before and after the shifting of the automatic shifting portion 20 so as to prevent the automatic shifting portion 20 from changing the total gear ratio γT, that is, such that the engine rotation speed $N_E$ is maintained at a nearly fixed level. In the inertia phase, substantially in synchronous with a commencement of the inertia phase from a time instant t2, the rotational speed $N_{18}$ of the transmitting member 18 is varied with the second electric motor M2, associated with the shifting of the automatic shifting portion 20, to have the given varying state.

If the determination in step SC2 is made negative, then in step SC7 corresponding to the step variable shift control means 54, a shift command (hydraulic pressure command) is output to the hydraulic pressure control circuit 42 for the automatic shifting portion 20 to be shifted to the gear position determined in step SC1. The hydraulic pressure value for use in such a hydraulic pressure command is an engaging pressure value preliminarily and uniquely determined to cause the rotational speed $N_{18}$ of the transmitting member 18 to achieve the given varying state.

The time instant $t_1$ in FIG. 16 indicates a timing at which with the differential portion (continuously variable portion) 11 remained under the non-continuously variable shifting state (locked state), a shift command is output for the automatic shifting portion 20 to perform a shift in the 3rd-gear position to begin decreasing an disengaging i.e., disengaging hydraulic pressure $P_{B2}$ of the second brake B2 acting as the on-disengaging side engaging device. During a time period from $t_1$ to $t_3$, a engaging hydraulic pressure $P_{B1}$ of the first brake B1 acting as the on-engaging side engaging device is raised, and at time instant $t_3$, the engaging action of the first brake B1 is completed to finish a series of shifting operations. A transition hydraulic pressure in the on-disengaging side engaging device and a transition hydraulic pressure in the on-engaging side engaging device are preliminarily set.

In the illustrated embodiment shown in FIG. 16, further, since the differential portion 11 executes the up shifting under the locked state with the switching clutch C0 being engaged, the shifting mechanism 10 is rendered operative to act as the step variable transmission as a whole. Therefore, with the vehicle speed V laying at a constant level, the input rotational speed $N_{IN}$ (the rotational speed $N_{18}$ of the transmitting member 18) of the automatic shifting portion 20 is caused to decrease with the up-shifting as indicated by the time period from $t_2$ to $t_3$ while also causing a drop in the engine rotational speed $N_E$. When this takes place, during the inertia phase, the rotational speed $N_{18}$ and/or the engine rotational speed $N_E$, variable with the shifting of the automatic shifting portion 20, are caused to vary so as to achieve the given varying states using the first electric motor M1 and/or the second electric motor M2 in nearly synchronism with the commencement of the inertia phase from the time instant $t_2$.

The time instant $t_1$ in FIG. 17 indicates a timing at which with the differential portion (continuously variable portion) 11 remained under the non-continuously variable shifting state (locked state), a shift command is output for the automatic shifting portion 20 to perform a shift in the 2ne-gear position to begin decreasing an disengaging hydraulic pressure $P_{B1}$ of the first brake B1 acting as the on-disengaging side engaging device. During a time period from $t_1$ to $t_4$, a engaging hydraulic pressure $P_{B2}$ of the second brake B2 acting as the on-engaging side engaging device is raised, and at time instant $t_4$, the engaging action of the second brake B2 is completed to finish a series of shifting operations.

A transition hydraulic pressure in the on-disengaging side engaging device and a transition hydraulic pressure in the on-engaging side engaging device during the time period from $t_1$ to $t_4$ are preliminarily set so that the rotational speed $N_{18}$ of the transmitting member 18 has the given varying state. For instance, like the illustrated embodiment shown in FIG. 14, a high hydraulic pressure value command is output when the hydraulic pressure begins to be supplied to the engaging device. At timing when the engaging is commenced, a low hydraulic pressure value command is output once. Thereafter, a hydraulic pressure value command is output to cause the hydraulic pressure to reach a hydraulic pressure value for the engaging to be completed.

In the illustrated embodiment shown in FIG. 17, further, since the differential portion 11 executes the downshifting under the locked state with the switching clutch C0 being engaged, the shifting mechanism 10 is rendered operative to act as the step variable transmission as a whole. Therefore, with the vehicle speed V laying at a constant level, the input rotational speed $N_{IN}$ (the rotational speed $N_{18}$ of the transmitting member 18) of the automatic shifting portion 20 is caused to increase with the down-shifting as indicated by the time period from $t_2$ to $t_4$ while also causing a raise in the engine rotational speed $N_E$. When this takes place, during the inertia phase, the rotational speed $N_{18}$ and/or the engine rotational speed $N_E$, variable with the shifting of the automatic shifting portion 20, are caused to vary so as to achieve the given varying states using the first electric motor M1 and/or the second electric motor M2 in nearly synchronism with the commencement of the inertia phase from the time instant $t_2$.

During the shifting in steps SC3 to SC5 or during the shifting in step SC7, in step SC6 corresponding to the torque-down control means 186, the torque-down control is executed causing a drop in torque, for instance, input torque $T_{IN}$ or output torque $T_{OUT}$ of the automatic shifting portion 20, which is transferred to the drive wheels 38.

Inertia torque occurs as the torque increment of torque being transferred to the drive wheels 38, for instance, the torque increment of output torque $T_{OUT}$, with a decrease in the rotational speed of the rotary element forming the automatic shifting portion 20 and a decrease in the rotational speed of the rotary element forming the differential portion 11. Alternately, inertia torque occurs as the torque increment of torque transferred to the drive wheels 38, for instance, the torque increment of output torque $T_{OUT}$ with a decrease in the engine rotational speed $N_E$ during the operation in up-shifting. Alternately, there is likelihood that the engaging shock occurs due to the fluctuation in torque resulting from the completion in engaging of the engaging device during the shifting of the automatic shifting portion 20.

In step SC6, therefore, the torque-down control is executed so as to allow the torque component, corresponding to resulting inertia torque, to be cancelled to some extent (that is, absorbed to some extent). Alternately, the torque-down control is executed so as to allow the fluctuation in torque, resulting from the completion in engaging of the engaging device, to be cancelled to some extent for thereby suppressing the engaging shock. For instance, the operations are executed to perform the engine torque-down control for reducing engine torque $T_E$ or the electric motor torque-down control, using the first electric motor M1 and/or the second electric motor M2, independently or in combination thereof. This results in a reduction in torque being transferred to the drive wheels 38. However, during the downshifting, that is, the coast downshifting with the vehicle running at a decelerated speed with the accelerator pedal being released, no torque-down control may be executed with no need arising to execute step SC6.

During the time period between $t_2$ and $t_3$ in FIG. 13, the variation in the engine rotation speed $N_E$ is suppressed during the shifting. This allows a torque component, corresponding to inertia torque occurring as the torque increment in torque being transferred to the drive wheels 38 to be cancelled to some extent. Torque increment is resulted from the variation in the rotation speed of the rotary element of the automatic shifting portion 20 or the variation in the rotation speed of the rotary element of the differential portion 11. That is, this represents that the torque down control is executed.

FIG. 14 represents that the illustrated embodiment is involved in the coast downshifting and no torque down control is executed. However, during the downshifting with torque being transferred to the drive wheels 38, the torque down control may be executed canceling the inertia torque component like the operation performed in the illustrated embodiment shown in FIG. 13.

During a time period between $t_2$ and $t_3$ in FIG. 16, the operation is executed to allow the torque component, corresponding to inertia torque representing the torque increment in torque transferred to the drive wheels 38 to be cancelled to some extent. Torque increment is resulted from the variation in engine rotation speed $N_E$, the variation in the rotation speed of the rotary element forming the automatic shifting portion 20 or the variation in the rotation speed of the rotary element forming the differential portion 11. That is, this represents that the torque down control is executed.

FIG. 17 represents the illustrated embodiment for the coast downshifting to be executed and shows that no torque down control is executed. However, during the downshifting with torque being transferred to the drive wheels 38, the torque down control may be executed canceling the inertia torque component like the operation executed in the illustrated embodiment shown in FIG. 16.

Further, if the determination in step SC1 is made negative, then in step SC8, the various control means of the control device 40 executes the control operations for the shifting not to be executed in the automatic shifting portion 20 or the current routine is terminated. For instance, with the shifting mechanism 10 placed in the continuously variable shifting state, the hybrid control means 52 executes the shifting of the differential portion 11 based on the vehicle condition.

In the illustrated embodiment, as set forth above, during the shifting of the automatic shifting portion 20 with the differential portion 11 placed in the continuously variable shifting state, the hybrid control means 52 allows the rotational speed $N_{18}$ of the transmitting member 18 to be varied to achieve the given varying state using the first electric motor M1 and/or the second electric motor M2. Thus, the rotational speed $N_{18}$ of the transmitting member 18, uniquely determined with the vehicle speed V and the speed ratio γ of the automatic shifting portion 20, is caused to achieve the given varying state.

This provides a balance between a rapid shifting response causing an increase in the varying rate $N_{18}'$ regarded to provide a comfortable feeling, and a slow shifting response causing a decrease in the varying rate $N_{18}'$ regarded to have an ease of suppressing the shifting shocks. In other words, the given varying state, for instance, the given varying rate, is established to provide a balance between the shortening of the shifting time and the suppression of the shifting shocks.

In the illustrated embodiment, further, during the shifting of the automatic shifting portion 20 with the differential portion 11 placed in the continuously variable shifting state, the hybrid control means 52 maintains the engine rotational speed $N_E$ at the nearly constant level using the first electric motor M1 and/or the second electric motor M2 for thereby continuously varying the total speed ratio γT. This results in a further suppression of the shifting shocks than that achieved in the engine rotational speed $N_E$ is caused to non-continuously vary, i.e., to vary step by step.

In the illustrated embodiment, furthermore, during the shifting of the automatic shifting portion 20 with the differential portion 11 placed in the non-continuously variable shifting state, the hybrid control means 52 varies the rotational speed $N_{18}$ of the transmitting member 18 or the engine rotational speed $N_E$ at the given varying states using the first electric motor M1 and/or the second electric motor M2. This allows the rotational speed $N_{18}$ of the transmitting member 18 or the engine rotational speed $N_E$, both uniquely determined with the vehicle speed V and the speed ratio γ of the automatic shifting portion 20, to achieve the given varying states.

This provides the balance between the rapid shifting response increasing the varying rate $N_{18}'$ of the transmitting member 18 or the engine rotational speed $N_E$ regarded to have the comfortable feeling, and the slow shifting response decreasing the varying rate $N_{18}'$ or the varying $N_E'$ regarded to have the ease of suppressing the shifting shocks. In other words, the given varying state, for instance, the given varying rate, is established to provide the balance between the shortening of the shifting time and the suppression of the shifting shocks.

In the illustrated embodiment, moreover, during the shifting of the automatic shifting portion 20, the hybrid control means 52 alters the method of varying the rotational speed $N_{18}$ of the transmitting member 18 or the engine rotational speed $N_E$ using the first electric motor M1 and/or the second electric motor M2. Such alteration is executed based on whether the differential portion 11 is placed in the continuously variable shifting state or the non-continuously variable shifting state.

The automatic shifting portion 20 performs the shifting, i.e., the rotational speed $N_{18}$ of the transmitting member 18 is caused to vary with the use of the first electric motor M1 and/or the second electric motor M2 depending on two factors related to whether the differential portion is placed in the continuously variable shifting state or the non-continuously variable shifting state, thereby suppressing the occurrence of shifting shocks. In the former state, during the shifting of the automatic shifting portion 20, the engine rotational speed $N_E$ is caused to vary due to the electrically controlled continuously variable shifting action, regardless of the rotational speed $N_{18}$ of the transmitting member 18 uniquely determined with the vehicle speed V and the speed ratio γ of the automatic shifting portion 20. In the latter state, the magnitude of inertia increases due to the occurrence of a further increased variation in the engine rotational speed $N_E$ than that appeared in the continuously variable shifting state.

In the illustrated embodiment, further, the hybrid control means 52 varies the rotational speed $N_{18}$ of the transmitting member 18 or the engine rotational speed $N_E$ using the first electric motor M1 and/or the second electric motor M2 such that the rotational speed $N_{18}$ or the engine rotational speed $N_E$ achieve the given varying states. In addition to such an operation, the engaging pressure control means 184 controls the engaging pressure of the engaging device, associated with the shifting of the automatic shifting portion 20, so as to allow the rotational speed $N_{18}$ or the engine rotational speed $N_E$ to achieve the given varying state (with only the differential portion 11 placed in the non-continuously variable shifting state). Such a varying state refers to a varying state in which the balance is provided between the shortening of the shifting time and the suppression of the shifting shocks. This provides a further suppression of the shifting shocks.

Embodiment 5

In the illustrated embodiment mentioned above, with the differential portion 11 placed in the continuously variable shifting state, the step variable shift control means 54 allows the automatic shifting portion 20 to execute the shifting such that the shifting shocks are suppressed and a fuel consumption is improved. To this end, the hybrid control means 52 allows the differential portion 11 to execute the shifting so as to continuously vary the total speed ratio γT on the stage before and after the shifting, that is, to maintain the engine rotational speed $N_E$ at the nearly constant level. During such operation, the differential portion 11 performs the shifting in a manner described below even in a case where the total speed ratio γT is significantly varied on the stage before and after the shifting. That is, the differential portion 11 performs the shifting so as to maintain the engine rotational speed $N_E$ at the nearly constant level. Then, the differential portion 11 performs a further shifting so as to continuously vary the total speed ratio γT toward a target total speed ratio γT.

In such a case, however, there exists a thinking way that for a user not to continuously vary the total speed ratio γT but to vary the total speed ratio γT step by step (non-continuously) for improving a shifting response, is more comfortable.

For instance, under a situation where the automatic shifting portion 20 performs the shifting with the variation in vehicle speed V occurring as shown by a transition "a↔b" on a solid line B in FIG. 6, the total speed ratio γT varies in a small range, or almost no variation takes place in the total speed ratio γT on the stage before and after the shifting of the automatic shifting portion 20. Accordingly, it would be better for the shifting shocks to be suppressed or the fuel consumption to be improved rater than improving the shifting response.

However, as shown by a transition "c↔d" on a solid line C in FIG. 6, as the accelerator pedal is rapidly depressed or rapidly released, a variation occurs in demanded output torque $T_{OUT}$ and the automatic shifting portion 20 often performs the shifting. In such a case, the total speed ratio γT, appearing on the stage before and after the shifting of the automatic shifting portion 20, has a wider varying range than that appearing on the solid line B. Accordingly, there is a thinking way that it would be better to vary the total speed ratio γT step by step (non-continuously) for improving the shifting response, rather than to continuously vary the total speed ratio γT on the stage before and after the shifting of the automatic shifting portion 20 for thereby suppressing the shifting shocks and improving the fuel consumption.

That is, when the total speed ratio γT varies in a minimized varying range or almost no variation takes place in the total speed ratio γT on the stage before and after the shifting of the automatic shifting portion 20, the total speed ratio γT may suffice to be continuously varied so as to suppress the shifting shocks and improve the fuel consumption rather than providing improved the shifting response. In addition, when the total speed ratio γT varies in an increased varying range on the stage before and after the shifting of the automatic shifting portion 20, the total speed ratio γT may suffice to be varied step by step, that is, not to be continuously varied for providing improved shifting response.

From another view point, if, for instance, there is a case where the accelerator pedal is depressed or released to cause the total speed ratio γT to vary in the increased varying range on the stage before and after the shifting of the automatic shifting portion 20. In such case, it is conceived for the user to be comfortable in feeling when the total speed ratio γT is skipped stepwise. that is, varied in the so-called skipped shifting. To this end, the total speed ratio γT may be skipped using the speed ratio γ of the automatic shifting portion 20 being varied step by step i.e., stepwise.

In the illustrated embodiment, therefore, under a situation where the total speed ratio γT varies in the increased varying range on the stage before and after the shifting of the automatic shifting portion 20, the differential portion 11 executes the operation, in addition to the operation in the illustrated embodiment mentioned above, to vary the total speed ratio γT on the stage before and after the relevant shifting. Hereunder, such control operation will be described below.

Figure 26:
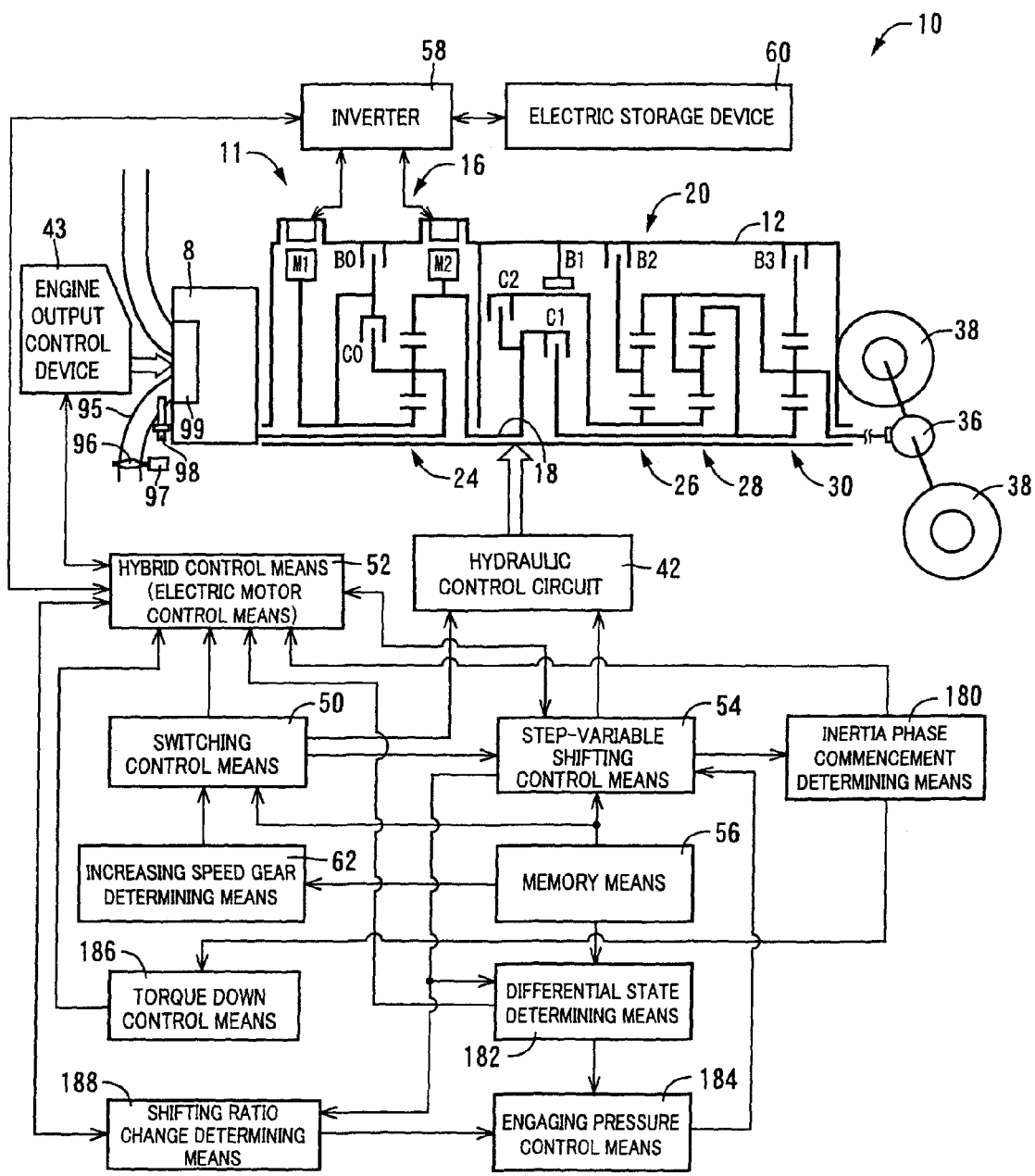
FIG. 26 is a functional back diagram for explaining a main part of the electronic control device of another embodiment shown in FIG. 4.

FIG. 26 is a functional block diagram illustrating an essence of a control function to be executed by the electronic control means 40. FIG. 26 is a view mainly different from FIG. 5 in that the shifting mechanism 10 further includes shifting ratio change determining means 188 for determining a change in the total speed ratio γT under a situation where the shifting of the automatic shifting portion 20 is determined.

In FIG. 26, the hybrid control means 52 performs, in addition to the function described above, the following function during the operation of the step variable shift control means 54 for the shifting of the automatic shifting portion 20. That is, when the differential state determining means 182 determines that the differential portion 11 is placed in the continuously variable shifting state and when the total speed ratio γT varies in the increased varying range, the shifting of the differential portion 11 is solely executed, i.e., independently of the shifting of the automatic shifting portion 20. Thus, the total speed ratio γT is caused to vary toward a target value. That is, no speed ratio γ0 of the differential portion 11 is varied depending on the variation in the speed ratio γ of the automatic shifting portion 20 in synchronism with the shifting thereof for thereby continuously varying the total speed ratio γT.

With such a variation, the total speed ratio γT can be varied toward the target value utilizing a stepwise change in the speed ratio of the automatic shifting portion 20 while adding (or subtracting) a change in speed ratio of the differential portion 11 thereto. This results in a capability of varying the total speed ratio γT step by step on the stage before and after the shifting of the automatic shifting portion 20 with a resultant improvement in shifting response.

For instance, the expression "the total speed ratio γT varies in the increased varying range" refers to a case in which the accelerator pedal is significantly depressed or released in a manner as indicated by the transition "c↔d" on the solid line C in FIG. 6. In such a case, the targeted total speed ratio γT is regarded to exceed a varying range by a given value. Then, the total speed ratio γT is caused to non-continuously vary, that is, the total speed ratio γT is caused to vary in the skipped shifting so as to skip step by step. As used herein, the term "given value" refers to a determined value preliminarily and experimentally obtained for determining that it is deemed to be comfortable in feeling for the user not to continuously vary the targeted total speed ratio γT but to vary the same step by step (i.e., in a non-continuous manner).

With the differential portion 11 placed in the continuously variable shifting state, if the execution of the shifting of the automatic shifting portion 20 is determined, the speed ratio change determining means 188 determines the presence of a change in the total speed ratio γT. For instance, such a phase occurs when the step variable shift control means 54 determines a gear position to be shifted in the automatic shifting portion 20, based on the vehicle condition by referring to the shifting diagram shown in FIG. 6, and the differential state determining means 182 determines that the differential portion 11 is placed in the continuously variable shifting state.

For instance, with the differential portion 11 placed in the continuously variable shifting state, if the execution of the shifting of the automatic shifting portion 20 is determined, then, the speed ratio change determining means 188 determines whether to non-continuously vary the total speed ratio γT, that is, to perform the so-called skipped shifting so as to skip the total speed ratio γT step by step. Such determination depends on whether or not the accelerator pedal is significantly depressed or released to cause the targeted total speed ratio γT to vary in the varying range greater than the given value, mentioned above, as indicated by the transition "c↔d" on the solid line C in FIG. 6.

Thus, if the speed ratio change determining means 188 determines that no skipped shifting is present, the hybrid control means 52 executes the shifting of the differential portion 11 so as to maintain the engine rotational speed $N_E$ at the nearly constant level on the stage before and after the shifting such that the total speed ratio γT is continuously varied. Moreover, if the speed ratio change determining means 188 determines that the skipped shifting is present, the hybrid control means 52 executes the shifting of the differential portion 11 independently of the shifting of the automatic shifting portion 20 so as to vary the total speed ratio γT step by step.

During the shifting of the automatic shifting portion 20 with the differential portion 11 placed in the continuously variable shifting state, the engine rotational speed and the rotational speed of the rotary element forming the differential portion 11 vary in different varying ranges, depending on one shifting with a suppressed variation in the engine rotational speed $N_E$ and the other shifting with a variation in the engine rotational speed $N_E$. The former represents the shifting in which the total speed ratio γT is caused to continuously vary, and the latter represents the shifting wherein the total speed ratio γT is caused to non-continuously vary, i.e., in the skipped shifting.

In other words, there is likelihood in that during the skipped shifting where the engine rotational speed $N_E$ varies at an increased varying rate in the course of the shifting, greater inertia torque occurs than that occurring when the total speed ratio γT continuously varies. Therefore, if the engaging hydraulic pressure of the engaging device, associated with the shifting of the automatic shifting portion 20, is uniquely set with the continuous variation and the skipped shifting of the total speed ratio γT as set forth above, the rotational speed $N_{18}$ of the transmitting member 18 becomes hard to achieve the given varying state. This causes a probability to occur with an increase in shifting shocks.

In view of the above situation, during the shifting of the automatic shifting portion 20 effectuated by the step variable shift control means 54 when the differential state determining means 182 determines that the differential portion 11 is placed in the continuously variable shifting state, the hybrid control means 52 performs the following function. That is, the hybrid control means 52 allows the rotational speed $N_{18}$ of the transmitting member 18 to vary so as to achieve the given varying state, during the inertia phase in the course of shifting of the automatic shifting portion 20, regardless of the determination result of the speed ratio change determining means 188 as to whether or not the skipped shifting is present. Such operation is executed in the same way as that in which the illustrated embodiment mentioned above is executed. During such operation, the hybrid control means 52 uses the first electric motor M1 and/or the second electric motor M2.

Thus, during the inertia phase in the course of the shifting of the automatic shifting portion 20 when the differential portion 11 is placed in the continuously variable shifting state to cause the total speed ratio γT to continuously vary, the hybrid control means 52 performs the following function. That is, the hybrid control means 52 varies the rotational speed $N_{18}$ and the engine rotational speed $N_E$ such that the rotational speed $N_{18}$ achieves the given varying state and the engine rotational speed $N_E$ is maintained at the nearly constant level. In this moment, the hybrid control means 52 uses the first electric motor M1 and/or the second electric motor M2.

In contrast, during the inertia phase in the course of the shifting of the automatic shifting portion 20 when the differential portion 11 is placed in the continuously variable shifting state and the total speed ratio γT is caused to stepwise vary, the hybrid control means 52 performs the following function. That is, the hybrid control means 52 varies the engine rotational speed $N_E$ independently of the shifting of the automatic shifting portion 20 so as to allow the rotational speed $N_{18}$ of the transmitting member 18 to achieve the given varying state while causing the total speed ratio γT to vary stepwise toward the targeted total speed ratio γT. In this moment, the hybrid control means 52 uses the first electric motor M1 and/or the second electric motor M2.

During the shifting of the automatic shifting portion 20 initiated by the step variable shift control means 54 with the differential portion 11 placed in the continuously variable shifting state, the hybrid control means 52 alters the varying method of the rotational speed $N_{18}$ or the engine rotational speed $N_E$, that is, the method of shifting the differential portion 11, during the inertia phase in the course of the shifting of the automatic shifting portion 20. This alteration is made based on whether the shifting is executed for continuously varying the total speed ratio γT or for varying the total speed ratio γT stepwise in the skipped shifting.

Figure 27:
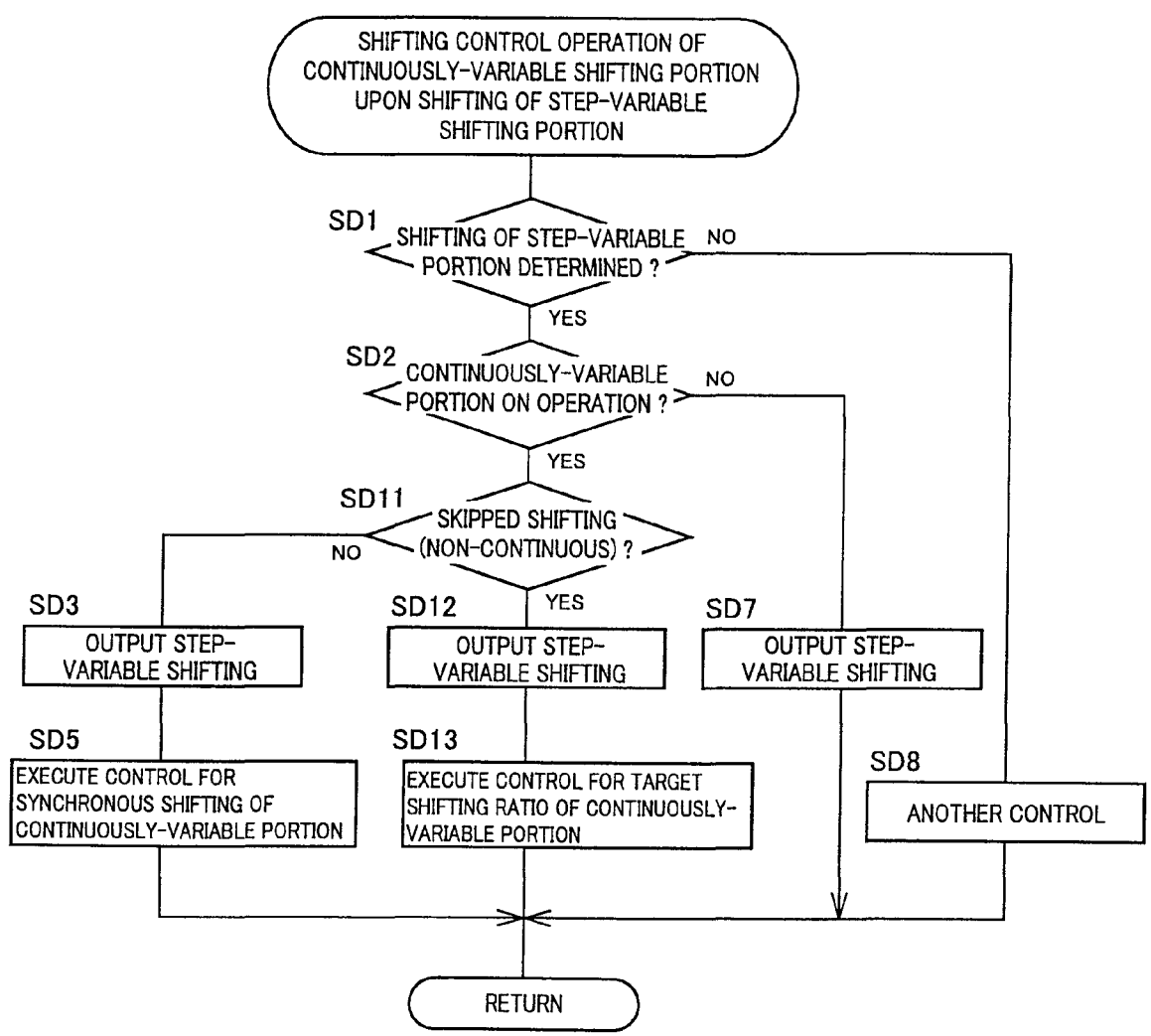
FIG. 27 is a flowchart for explaining the shifting control operation of the electronic control device, that is a shifting control operation in the differential portion upon control operation of the automatic shifting portion.

FIG. 27 is a flowchart illustrating an essence of control operations of the electronic control device 40, that is, shifting control operations to be executed by the differential portion (continuously variable shifting part) 11 during the shifting of the automatic shifting portion 20. This sequence is repeatedly executed for an extremely short cycle time in the order of, for instance, several milliseconds to several tens milliseconds. Further, FIG. 27, representing a view corresponding to FIG. 25, differs from FIG. 25 in that the operational sequence further includes step SD11, in which the skipped shifting is determined with the differential portion 11 placed in the continuously variable shifting state, and steps SD12 and SD13 in which the shifting mechanism 10 executes the shifting when the skipped shifting is determined.

FIG. 15 is a timing chart, illustrating the control operation plotted in the flowchart shown in FIG. 27, which represents the control operation to be executed so as to allow the automatic shifting portion 20 to achieve the skipped shifting on the power-on downshifting in 3rd→2nd gear position with the differential portion 11 placed in the continuously variable shifting state.

First, in step SD1 corresponding to the step variable shift control means 54, the determination is made whether to execute the shifting of the automatic shifting portion 20, based on whether or not the gear position to be shifted in the automatic shifting portion 20 is determined. This determination is made based on the vehicle speed V, by referring to the shifting diagram shown in FIG. 6, and the vehicle condition represented by output torque $T_{OUT}$ of the automatic shifting portion 20. The time instant $t_1$ in FIG. 15 indicates that the downshifting in the 3rd→2nd gear position is determined.

If the determination in step SD1 is made positive, then in step SD2 corresponding to the differential state determining means 182, the determination is made whether or not the power distributing mechanism 16 is placed in the differential state, that is, the differential portion (continuously variable shifting portion) 11 is placed in the continuously variable shifting state. More particularly, the determination is made depending on whether or not the continuously variable control region is present for the shifting mechanism 10 to be placed in the continuously variable shifting state, based on the vehicle condition upon referring to, for instance, the shifting diagram shown in FIG. 6.

If the determination in step SD2 is made positive, then in step SD11 corresponding to the speed ratio change determining means 188, the determination is made whether or not the accelerator pedal is deeply depressed or released, as indicated by the transition "c ↔d" on the solid line C in FIG. 6, to cause the shifting to be made in the so-called skipped shifting. As used herein, the term "skipped shifting" refers to a shifting in which for the purpose of permitting the varying range of the targeted total speed ratio γT to exceed a given value, the total speed ratio γT is non-continuously varied in the skipped shifting.

If the determination in step SD11 is made positive, then in step SD12 corresponding to the step variable shift control means 54, a shifting command (hydraulic pressure command) is output to the hydraulic pressure control circuit 42 for an intended gear position to be shifted in the automatic shifting portion 20 determined in step SD1. The hydraulic pressure value, used in this hydraulic pressure command, refers to a hydraulic pressure value that is preliminarily and uniquely set to cause the rotational speed $N_{18}$ of the transmitting member 18 to achieve the given varying state during, for instance, the shifting.

The time instant $t_1$ in FIG. 15 indicates a timing at which the shift command is output for the automatic shifting portion 20 to be shifted in the 2nd-speed, in the continuously variable shifting state (differential state) of the differential portion (continuously variable portion) 11, with a drop in the disengaging hydraulic pressure $P_{B1}$ of the first brake B1 acting as the on-disengaging side engaging device. During a time period from $t_1$ to $t_4$, the engaging hydraulic pressure $P_{B2}$ of the second brake B2 acting as the on-engaging side engaging device is raised, and at the time instant $t_4$, the second brake B2 is disengaged to complete the shifting of the automatic shifting portion 20.

Like the illustrated embodiment shown in FIG. 14 and FIG. 17, for instance, a high hydraulic pressure value command is output at a timing when the hydraulic pressure begins to be supplied to the on-engaging side engaging device. At the engaging commencing timing, a low hydraulic pressure value command is output once, after which a hydraulic pressure value command is output so as to gradually increase the hydraulic pressure value toward the hydraulic pressure value for the engaging to be completed.

On a timing in nearly parallel with step SD12, in step SD13 corresponding to the hybrid control means 52, the differential portion 11 independently performs the shifting in non-synchronism with the shifting of the automatic shifting portion 20 upon utilizing a stepwise variation in speed ratio resulting from the shifting of the automatic shifting portion 20 executed in step SD12. Such a shifting is executed so as to allow the actual total speed ratio γT to be controlled toward the targeted total speed ratio γT. In steps SD12 and SD13, the so-called skipped shifting is executed so as to allow the total speed ratio γT to skip step by step.

In the illustrated embodiment shown in FIG. 15, further, the rotation speed $N_{M1}$ of the first electric motor M1 is raised after the time instant t1 to increase the gear ratio γ0 of the differential portion, thereby raising the engine rotation speed $N_E$. Thus, the input rotation speed $N_{IN}$ (the rotation speed $N_{18}$ of the transmitting member 18) of the automatic shifting portion 20 increases with the downshifting of the automatic shifting portion 20. In addition, the engine rotation speed $N_E$ increases with the rotation speed $N_{M1}$ of the first electric motor M1 kept substantially constant. The differential portion 11 executes the shifting using at least the first electric motor M1 due to the differential action of the differential portion 11 so as to allow the differential portion 11 to finally regulate the total gear ratio γT toward the targeted total gear ratio γT.

Thus, with the illustrated embodiment belonging to the skipped shifting, the total gear ratio γT is caused to vary non-continuously (stepwise). To this end, the differential portion 11 executes the shifting in non-synchronism with the shifting of the automatic shifting portion 20 to utilize the stepwise change in gear ratio resulting from the shifting such that the total gear ratio γT approaches the targeted total gear ratio γT, i.e., the engine rotation speed $N_E$ to be achieved after the shifting. This results in improved shifting response. Further, the rotation speed $N_{18}$ of the transmitting member 18, variable with the shifting of the automatic shifting portion 20, may be positively varied using the second electric motor M2 in nearly synchronism with the initiation of the inertia phase from the time instant $t_2$ so as to approach the given variation.

If the determination in step SD11 is made negative, then, in step SD3 corresponding to the step variable shift control means 54, a shifting command (hydraulic pressure command) is output to the hydraulic pressure control circuit 42 for the automatic shifting portion 20 to shift in the gear position determined in step SD1. The hydraulic pressure value, used in this hydraulic pressure command, refers an engaging pressure that is preliminarily and uniquely determined such that the rotational speed $N_{18}$ of the transmitting member 18 achieves the given varying state during, for instance, the shifting.

In succeeding step SD5 corresponding to the inertia phase commencement determining means 180 and the hybrid control means 52, the determination is made whether or not the inertia phase is commenced in the course of the shifting of the automatic shifting portion 20. If the commencement of the inertia phase is determined, the rotational speed $N_{18}$ of the transmitting member 18 is caused to achieve the given varying state and the engine rotational speed $N_E$ is maintained at the nearly constant level due to the differential action, that is, the electrically controlled continuously variable shifting action of the differential portion 11.

To this end, the rotational speed $N_{18}$ and the engine rotational speed $N_E$ are varied using the first electric motor M1 and/or the second electric motor M2. For instance, the speed ratio γ0 is caused to vary in the differential portion 11 in a direction opposite to that in which the speed ratio γ is varied in the automatic shifting portion 20 such that the rotational speed $N_{18}$ of the transmitting member 18 achieves the given varying state while maintaining the engine rotational speed $N_E$ at the nearly constant level. In steps SD3 and SD5, the total speed ratio γT is continuously varied in the shifting mechanism 10 on the stage before and after the shifting of the automatic shifting portion 20.

If the determination in step SD2 is made negative, then in step SD7 corresponding to the step variable shift control means 54, the shifting command (the hydraulic pressure command) is output to the hydraulic pressure control circuit 42 for the automatic shifting portion 20 to shift in the gear position determined in step SD1. The hydraulic pressure value, used in this hydraulic pressure command, refers to a hydraulic pressure value that is preliminarily and uniquely set to cause the rotational speed $N_{18}$ of the transmitting member 18 to achieve the given varying state during, for instance, the shifting.

If the determination in step SD1 is made negative, then in step SD8, the various control means of the electronic control device 40 execute the control operations not to cause the shifting of the automatic shifting portion 20 or the current routine is terminated. For instance, if the shifting mechanism 10 is placed in the continuously variable shifting state, the hybrid control means 52 executes the shifting of the automatic shifting portion 20 based on the vehicle condition.

Further, during the shifting in steps SAD3 and SD5, during the shifting in step SD7 or during the shifting in steps SD12 and SD13, in steps (not shown) corresponding to the torque-down control means 186, the torque-down control may be executed. Like step SC6 in FIG. 25, this result in a reduction in torque, i.e., input torque $T_{IN}$ or output torque output $T_{OUT}$, to be transferred to the drive wheels 38.

FIG. 15 is a timing chart showing a status in which due to the existence of the power-on downshift, input torque $T_{IN}$ is reduced to some extent in the final stage of the shifting to cancel the fluctuation in torque, resulting from the completion in engaging of the engaging device (the locked condition in the presence of a one-way clutch) of the automatic shifting portion 20 during a time period from $t_3$ to $t_5$, for thereby suppressing the engaging shocks.

As set forth above, the illustrated embodiment has, in addition to the same effects as those of the illustrated embodiment set forth above, other effects described below. In particular, depending on whether the shifting is for the total speed ratio γT to be continuously varied or the shifting is for the total speed ratio γT to be non-continuously varied, the hybrid control means 52 alters the varying method of the rotational speed $N_{18}$ of the transmitting member 18 or the engine rotational speed $N_E$ using the first electric motor M1 and/or the second electric motor M2.

This allows the automatic shifting portion 20 to perform the shifting using the first electric motor M1 and/or the second electric motor M2, depending on the shifting for continuously varying the total speed ratio γT enabling the suppression of the engine rotational speed $N_E$ and the shifting for non-continuously varying the total speed ratio γT with the variation in engine rotational speed $N_E$. That is, the shifting is performed for the total speed ratio γT to be continuously varied with likelihood of a difference in magnitude of inertia torque occurring during the shifting of the differential portion 11 and the shifting of the automatic shifting portion 20 is performed depending on the shifting in the non-continuous variation. This suppresses the occurrence of shifting shocks.

While in the foregoing description, the present invention has been described above in detail with reference to the illustrated embodiments shown in the drawings, the present invention may be applied in other modes.

Although in the illustrated embodiment, for instance, the engaging pressure learning control means 100 stores the hydraulic pressure value, resulting from correcting (adjusting) the engaging pressure of the engaging device, as the new learned value, a corrected quantity (adjusted quantity) of the engaging pressure may be treated as a learned value G. For instance, the corrected quantity (adjusted quantity) derived from the default value may be stored as the learned value G, upon which the default value may be tinged with the learned value G and treated as the engaging pressure of the engaging device on a subsequent shifting cycle.

Further, in the illustrated embodiments mentioned above, while as represented by the hydraulic pressure learned value maps shown in FIG. 11, engine torque is stratified in seven stages including engine torques 1 to 7, engine torque may be stratified in more or less number of stages.

Furthermore, in the flowchart shown in FIG. 19, the control operation for the learned value on the engaging pressure of the engaging device to be selected for use in the shifting of the automatic shifting portion 20 is involved in the differential portion 11 placed in the continuously variable shifting state (pattern "A") or the non-continuously variable shifting state (pattern "B"). The present invention is not limited to such states. For instance, the control operations may depend on: the differential portion 11 placed in the continuously variable shifting state wherein the total gear ratio γT has a variation involved in the continuous variation (on the pattern "A") or the skipped shifting (on the pattern "B"); or whether or not the differential portion 11 is placed in the non-continuously variable shifting state. They further depend on; whether or not the differential portion 11 is placed in the continuously variable shifting state and the total gear ratio γT has a variation belonging to the continuous variation; or whether or not the differential portion 11 is placed in the continuously variable shifting state and the total gear ratio γT has a variation belonging to the skipped shifting.

For instance, if the total gear ratio γT has the variation belonging to the continuous variation or the skipped shifting (in non-continuous variation) with the differential portion 11 placed in the continuously variable shifting state, the default value on the hydraulic pressure value map for the pattern "A" not learned is corrected, based on the learned value on the hydraulic pressure learning map for the pattern "B" already learned.

The corrected value is selected as the hydraulic pressure value for the engaging pressure of the engaging device during the shifting of the automatic shifting portion 20. The default value on the hydraulic pressure value map for the pattern "B", which is not learned yet, is corrected based on the hydraulic pressure value map for the pattern "A" that is already learned and is selected as the hydraulic pressure value for the engaging device for the shifting of the automatic shifting portion 20.

If the patterns "A" and "B" are completed in learning, the learned value in the hydraulic pressure value maps is selected as the hydraulic pressure value for the engaging device for the shifting of the automatic shifting portion 20. If none of the learned values in the hydraulic pressure value maps for the patterns "A" and "B" is learned, the default value on the relevant hydraulic pressure value map is selected as the hydraulic pressure value of the engaging device for the shifting of the automatic shifting portion 20.

While in the illustrated embodiment, the engaging pressure control means 84 performs executes the learning on the control of the engaging pressure of the engaging device for use in the shifting of the automatic shifting portion 20, but the learning may be executed on a real time basis during the shifting of the automatic shifting portion 20. For instance, the engaging pressure of the engaging device, associated with the relevant shifting, is successively varied such that the rotational speed $N_{18}$ of the transmitting member 18 and the engine rotational speed $N_E$ achieve the given varying states during the shifting of the automatic shifting portion 20.

In addition, with the differential portion 11 placed in the non-continuously variable shifting state, the engine rotational speed $N_E$ varies during the shifting of the automatic shifting portion 20 to cause the inertia, occurring during the shifting, to increase in contrast to the inertia appearing with the differential portion 11 placed in the continuously variable shifting state. Therefore, the engaging hydraulic pressure of the on-engaging side engaging device may be incremented involving an inertia absorption component. In this moment, if the rotational speed $N_{18}$ and the engine rotational speed $N_E$ are forcibly varied using the first electric motor M1 and/or the second electric motor M2 so as to cause the rotational speed $N_{18}$ of the transmitting member 18 and the engine rotational speed $N_E$ to achieve the given varying states or to cause the rotational speed $N_{18}$ and the engine rotational speed $N_E$ to approach respective levels subsequent to the shifting, the on-engaging side engaging device may have a lower engaging hydraulic pressure than that in which none of the rotational speed $N_{18}$ of the transmitting member 18 and the engine rotational speed $N_E$ is varied.)

Further, in the illustrated embodiments mentioned above, the hydraulic pressure value maps for the patterns "A", "B" and "C" store the default values therefor, respectively, and the default values are rewritten as the learned values upon the learning operations for storage. However, the default value is stored for one kind (one pattern) of the hydraulic pressure value map in nature and is rewritten to new learned values upon the learning which may be organized and stored for the patterns "A", "B" and "C", depending on a status of the shifting mechanism during the shifting of the automatic shifting portion 20.

Furthermore, in the illustrated embodiments set forth above, the differential portion 11 executes the shifting control so as to maintain the engine rotation speed $N_E$ at the nearly fixed level, i.e., not to vary the total gear ratio γT on the stage before and after the shifting of the automatic shifting portion 20 as shown in the timing charts in FIGS. 13 and 14. However, no need arises for the engine rotation speed $N_E$ to be necessarily maintained at the nearly fixed level and the variation of the engine rotation speed $N_E$ may be continuously varied in a suppressed state. Even in such an alternative, a certain measure of success can be obtained.

In the illustrated embodiment, further, the differential state determining means 80 (step S2 in FIG. 12) determines whether or not the power distributing mechanism 16 is placed in the differential state based on whether or not the shifting mechanism 10 remains in the continuously variable region depending on the vehicle condition by referring to, for instance, the shifting diagram shown in FIG. 6. However, the determination may be made whether or not the power distributing mechanism 16 is placed in the differential state based on the determination as to whether or not the shift control means 50 renders the shifting mechanism 10 to be placed in the step variable control region or the continuously variable control region.

Further, in the illustrated embodiment, the gear ratio change determining means 86 (step S3 in FIG. 12) determines the presence of the skipped shifting in light of the occurrence wherein the varying width of the targeted total gear ratio γT is caused to exceed the given value. However, the skipped shifting may be determined on the ground that the varying rate of the targeted total gear ratio γT is caused to exceed a given varying rate. As used herein, the term "given varying rate" refers to a determined value that is preliminarily and experimentally determined for making the determination that the targeted total gear ratio γT is not continuously varied but varied step-by-step (i.e., in non-continuous manner).

For instance, in the illustrated embodiment, the shifting mechanism 10, 70 is structured to be switched to the continuously variable shifting state and the step variable shifting state, by switching the differential portion 11 (power distributing mechanism 16) to the differential state functioning as the electrically continuously variable transmission and the non-differential state (locked state). The switching between the continuously variable shifting state and the step variable shifting state is performed as one mode of placing the differential portion 11 in the differential state and the non-differential state. However, even if, for instance, when placed in the differential state, the differential portion 11 may be arranged to function as a step variable transmission with the shifting gear ratio thereof made not in a continuous mode but in a stepwise mode.

In other words, the differential state/non-differential state of the differential portion 11 and the continuously variable shifting state/step variable shifting state of the shifting mechanism 10, 70 do not necessarily fall in a one-on-one correspondence. The differential portion 11 need not necessarily be formed in a structure to enable the switching between the continuously variable shifting state and the step variable shifting state, but the shifting mechanism 10, 70 (power distributing mechanism 16) is sufficiently structured to be switched between the differential state and the non-differential state, for the present invention.

In the power distributing mechanisms 16 in the illustrated embodiments, the first carrier CA1 is fixed to the engine 8, and the first sun gear S1 is fixed to the first electric motor M1, and the first ring gear R1 is fixed to the transmitting member 18. However, such connecting arrangement is not essential, and the engine 8, first electric motor M1 and transmitting member 18 are fixed to respective ones of the three elements CA1, S1 and R1 of the first planetary gear unit 24. Although the engine 8 is directly connected to the drive apparatus input shaft 14 in the illustrated embodiments, it may be operatively connected to the input shaft 14 through gears, a belt or the like, and need not be disposed coaxially therewith.

In the illustrated embodiments, the first electric motor M1 and the second electric motor M2 are disposed coaxially with the drive apparatus input shaft 14, the first electric motor M1 is fixed to the first sun gear S1, and the second electric motor M2 is fixed to the transmitting member 18. However, such arrangement is not essential. For example, the first electric motor M1 may be fixed to the first sun gear S1 through gears, a belt or the like, and the second electric motor M2 may be fixed to the transmitting member 18.

Although the above power distributing mechanism 16 is provided with both the switching clutch C0 and the switching brake B0, it need not be provided with both of them, and may be provided with only one of the switching clutch C0 and brake B0. Although the switching clutch C0 selectively connects the sun gear S1 and carrier CA1 to each other, it may selectively connect the sun gear S1 and ring gear R1 to each other, or the carrier CA1 and ring gear R1. In essence, the switching clutch C0 sufficiently connects any two of the three elements of the first planetary gear unit 24. The switching clutch C0 in the illustrated embodiment is engaged to establish the neutral position "N" in the shifting mechanism 10, 70, but the neutral position need not be established by engagement thereof.

The hydraulic-type frictional engaging devices such as the switching clutch C0 and switching brake B0 may be an engaging device of a magnetic-powder type, an electromagnetic type or a mechanical type, such as a powder (magnetic powder) clutch, an electromagnetic clutch and a meshing type dog clutch. The second electric motor M2 connected to the transmitting member 18 in the above embodiment can be connected to the output member 22, or can be connected to the rotary member disposed in the automatic shifting portion 20, 72.

In the illustrated embodiment, further, the automatic shifting portion 20, 72 is disposed in the power transmitting path between the transmitting member 18 serving as the output member of the differential portion 11, that is the power distributing mechanism 16 and the drive wheels 38. However, a power transmitting device of the other type such as a well-known constantly meshed type includes two parallel shafts, and is automatically switched the gear positions thereof by the select ring and the shift cylinder. The term "step variable shifting state" used herein refers to a state wherein power transmission is achieved mainly in a mechanical transmitting path without using the electrical path.

In the case of the continuously variable transmission (CVT), it is placed in the step variable shifting state as a whole by placing the power distributing mechanism 16 in the fixed speed state. Here, the step variable shifting state means to transmit the power mainly through the mechanical power transmitting path, without using the electric path. Alternately, a plurality of fixed gear ratios can be memorized in advance in the continuously variable transmission corresponding to the gear ratios in the step variable transmission, so that the automatic shifting portion 20, 72 can execute the shifting using the plurality of fixed gear ratios.

In the illustrated embodiment, furthermore, while the automatic shifting portion 20, 72 is connected to the differential portion 11 in series via the transmitting member 18, a countershaft may be provided in parallel to the input shaft 14 to allow the automatic shifting portion 20, 72 to be coaxially disposed on an axis of the countershaft. In this case, the differential portion 11 and the automatic shifting portion 20, 72 are connected to each other in power transmitting capability via a set of transmitting members structured of, for instance, a counter-gear pair acting as the transmitting member, a sprocket and a chain.

The power distributing mechanism 16 in the illustrated embodiment can be comprised of for example a pinion driven and rotated by the engine, and a differential gear set having a pair of bevel gears meshed with the pinion being operatively connected to the first electric motor M1 and the second electric motor M2.

The power distributing mechanism 16 in the illustrated embodiment comprised of one paired planetary gear units, may be comprised of two or more pairs planetary gear units to function in the non-differential state (fixed speed state) as the transmission having three or more speed positions. The planetary gear unit is not limited to the single-pinion type, but can be the double-pinion type.

The switch device 90 in the illustrated embodiment has the shift lever 92 to be manipulated for selecting one of a plurality of shift positions. However, instead of such shift lever 92, following switch or device can be employed. That is, a switch being comprised of a pressing type switch and a sliding type switch and being selected to one of a plurality of shift positions; a device being selected to one of a plurality of shift positions in response not to the manipulation by the hand but to the driver's voice; and a device being selected to one of a plurality of shift positions in response to the manipulation by the foot, can be employed.

In the illustrated embodiment, the shifting range is established by manipulation of the shift lever 92 to the "M" position, but the shifting position i.e., speed position can be established by setting of the shifting step that is the maximum speed step for each shifting range. In this case, in the automatic shifting portion 20, 72, the shifting position is switched for executing the shifting action. For example, when the manual manipulation of the shift lever 92 to a shift-up position "+" and a shift-down position "−" at the "M" position is executed, any of the first gear position to the fourth gear position is set by the manipulation of the shift lever 92 in the automatic shifting portion 20.

The switch 44 in the illustrated embodiment is of the see-saw type. However, switches capable of being selectively switched to one of the continuously variable shifting running (differential state) and the step variable shifting running (non-differential state) can be employed. That is, a pressing type switch; two pressing type switches which can hold the state selectively pressed; a lever type switch; and a sliding type switch, can be provided. In addition to the switch 44 having single neutral position, a switch having two shifting positions for making the selected state thereof valid and invalid can be provided, independent from the switch 44, can be employed. Instead of, or in addition to the switch 44, following devices can be employed. That is, the devices capable of being selectively switched to one of the continuously variable shifting running (differential state) and the step variable shifting running (non-differential state), in response not to the manual manipulation but to the driver's voice, and the device switched by the manipulation by foot, can be employed.

In the illustrated embodiment, further, in order to allow the rotational speed $N_{18}$ of the transmitting member 18 to achieve the given varying state, for instance, the hybrid control means 52 successively varies the rotational speed $N_{18}$ of the transmitting member 18 using the first electric motor M1 and/or the second electric motor M2 (on a so-called real time basis). However, the hybrid control means 52 may be configured so as to learn the control variables of the first electric motor M1 and/or the second electric motor M2 to allow the relevant control variables to be used in a subsequent shifting.

For instance, during the operation of the step variable shift control means 54 to execute the shifting of the automatic shifting portion 20, the hybrid control means 52 monitors a variation in an actual rotational speed $N_{18}$ of the transmitting member 18 during the shifting for comparison to a given varying state. The hybrid control means 52 executes the learning control for correcting the control variables of the first electric motor M1 and/or the second electric motor M2 so as to suppress a difference between an actual change in the rotational speed and the given varying state on a subsequent shifting cycle. That is, the hybrid control means 52 performs the adjustment so as to increase or decrease the control variables of the first electric motor M1 and/or the second electric motor M2 used in immediately preceding shifting such that the given varying state is established in the subsequent shifting.

Further, the hybrid control means 52 rewrites the control variables, corresponding to engine torque and the kind (such as, for instance, the up-shifting in the 1st→2nd gear position) of the shifting targeted to be learned during the shifting, as values subsequent to the correction (upon completion of the adjustment) on the control variables resulting from the current learning control to newly store the same as learning values in the learning value maps on the control variables of the first electric motor M1 and/or the second electric motor M2. In addition, the learning value maps are prepared for the continuously variable shifting state and the non-continuously variable shifting state of the differential portion 11, respectively. Also, the learning value maps are prepared in different patterns depending on whether with the differential state 11 placed in the continuously variable shifting state, the total speed ratio γT continuously varies or varies in the skipped shifting.

In the illustrated embodiment, further, the engaging pressure control means 184 controls the engaging pressure of the engaging device for use in the shifting of the automatic shifting portion 20 on the real time basis during the shifting of the automatic shifting portion 20. However, such a control may be performed upon executing the learning like that executed by the hybrid control means 52. For instance, the engaging pressure control means 184 monitors the variation in the actual rotational speed $N_{18}$ of the transmitting member 18 during the shifting for comparison to a given varying state during the operation of the step variable shift control means 54 for executing the shifting of the automatic shifting portion 20. The engaging pressure control means 184 executes the learning control for correcting the engaging pressure of the engaging device so as to suppress a difference between an actual change in rotational speed and the given varying state on a subsequent shifting cycle.

Further, in the fourth illustrated embodiment, the differential portion 11 executes the shifting control so as to allow the engine rotational speed $N_E$ to be maintained at the nearly constant level, that is, not to vary the total speed ratio γT of the shifting mechanism 10 on the stage before and after the shifting of the automatic shifting portion 20 as shown in the timing charts shown in FIGS. 13 and 14. However, no engine rotational speed $N_E$ needs to be necessarily maintained at the nearly constant level and the operation may be suffice to suppress the variation in engine rotational speed $N_E$ while continuously varying the total speed ratio γT. Even with such operation, a prima-facie effect can be obtained.

In the fourth and fifth illustrated embodiments, the differential state determining means 182 (step SC2 in FIG. 25 and step SD2 in FIG. 27) determines whether or not the power distributing mechanism 16 is placed in the differential state depending on whether or not the power distributing mechanism 16 remains in the continuously variable control region based on the vehicle condition by referring to, for instance, the shifting diagram shown in FIG. 6. However, the switching control means 50 may determine whether or not the power distributing mechanism 16 is placed in the differential state based on the determination as to whether the shifting mechanism 10 is placed in the step variable control region or the continuously variable control region.

In the fifth illustrated embodiment, the speed ratio change determining means 188 (step SD3 in FIG. 27) determines the skipped shifting with a consequence in which the targeted total speed ratio γT has the varying range exceeding the given value. However, the skipped shifting may be determined with a consequence in which the targeted total speed ratio γT has the varying range exceeding a given varying rate. As used herein, the term "given varying rate" refers to a determining value preliminarily and experimentally obtained for determining that the variation in the targeted total speed ratio γT is not continuous but stepwise (that is, non-continuous).

In the illustrated embodiment, with the differential portion 11 limited in operation to act as the electrically controlled continuously variable shifting portion (differential device), the switching control means 50 completely engages the switching clutch C0 or the switching brake B0 are to switch the differential portion 11 in the non-differential state (locked state) to avoid the differential action. However, varying torque capacities of the switching clutch C0 or the switching brake B0 may be may be varied in, for instance, a semi-engaged condition for thereby limiting the operation of the differential portion 11 as the electrically controlled differential device.

In particular, the switching control means 50 may cause the switching clutch C0 or the switching brake B0 to be placed in the semi-engaged condition. This allows the differential portion 11 to act as the electrically controlled continuously variable shifting portion (differential device). In addition, using torque generated by the first electric motor M1 and torque generated in the semi-engaged state of the switching clutch C0 or the switching brake B0 may cause reaction torque to occur against engine torque $T_E$ being input to the differential portion 11.

With such arrangement, the differential portion 11 can be applied with engine torque $T_E$ exceeding the given value TE1 available to be born with, for instance, torque capacity of the first electric motor M1. As a result, the differential portion 11 is enabled to provide an increase in output without causing any increase in a maximal torque capacity of the first electric motor M1, that is, without causing any increase in size of the first electric motor M1.

Alternately, in contrast to a case in which the switching clutch C0 or the switching brake B0 are disengaged, the first electric motor M1 has no need to bear reaction torque against entire engine torque $T_E$ being input to the differential portion 11. This enables a reduction in ratio of engine torque $T_E$ to be born with the first electric motor M1 in respect of engine torque $T_E$ with the same magnitude as that applied to the differential portion 11. This results in the miniaturization of the first electric motor M1 or an increase in durability of the first electric motor M1. Alternately, this enables a decrease in electric energy to be transferred from the first electric motor M1 to the second electric motor M2, resulting in an increase in durability of the second electric motor M2.

Alternately, the shift control means 50 may render the switching clutch C0 or the switching brake B0 operative in a semi-engaging state regardless of whether or not the differential portion 11 remains in the continuously variable control region to be placed in the continuously variable shifting state or whether or not the differential portion 11 remains in the step variable control region to be placed in the non-continuously variable shifting state.

In the illustrated embodiments mentioned above, further, the shifting mechanisms 10, 70 are structured such that with the power distributing mechanism 16 switched to the differential state or the non-differentials state, the shifting mechanisms can be switched to the continuously variable shifting state enabling a function of the electrically controlled continuously variable transmission portion, or the non-continuously variable shifting state in a function of the step variable transmission. However, the present embodiments can be applied even if the shifting mechanisms 10, 70 include shifting mechanisms disenabled to be to switched to the step variable shifting state, that is, even if the continuously variable shifting portion 11 includes the differential portion (continuously variable shifting portion) 11 having only a function to ac as the electrically controlled continuously variable transmission (electrically controlled differential device). In this case, no need arises for providing the switching control means 50 and the speed increasing gear position determining means 62.

In addition, it is intended that the illustrated embodiments described be considered only as illustrative of the present invention, and that the present invention may be implemented in various modifications and improvements in the light of knowledge of those skilled in the art.

The invention claimed is:

1. A control device for a vehicular drive apparatus, the vehicular drive apparatus including (i) a differential portion including a differential mechanism enabled to distribute an output of an engine to a first electric motor and a power transmitting member, and a second electric motor disposed in a power transmitting path between the power transmitting member and drive wheels, and (ii) a shifting portion forming a part of the power transmitting path, the control device comprising:

an electric motor control unit which controls a rotational speed of the transmitting member or a rotational speed of the engine using at least one of the first electric motor or the second electric motor during a shifting of the shifting portion, based on whether the shifting of the shifting portion is for continuously varying a total speed ratio achieved with the differential portion and the shifting portion, or the shifting is for non-continuously varying the total speed ratio;

a differential state determining unit which determines whether the differential mechanism is in a continuously varying shifting state; and a speed ratio change determining unit which determines whether the total speed ratio is non-continuously varying to permit shifting that allows a varying range of a targeted total speed ratio to exceed a predetermined value, wherein when the differential state determining unit determines that the differential mechanism is in a continuously varying shifting state and the speed ratio change determining unit determines that the total speed ratio is non-continuously varying, the shifting portion shifts to a predetermined gear position and the electric motor control unit changes a rotational speed of the first electric motor to control the rotational speed of the engine such that the differential portion shifts in non-synchronism with shifting of the shifting portion to allow the total speed ratio to approach the target total speed ratio, and wherein when the differential state determining unit determines that the differential mechanism is in a continuously varying shifting state and the speed ratio change determining unit determines that the total speed ratio is not non-continuously varying, the shifting portion shifts to the predetermined gear position and the electric motor control unit changes the rotational speed of at least one of the first electric motor or the second electric motor such that the rotational speed of the transmitting member achieves a predetermined varying state and the rotational speed of the engine remains nearly constant.

2. A control device for a vehicular drive apparatus according to claim 1, wherein with the total speed ratio varied stepwise, the continuously variable shifting portion is controlled to achieve a skipped shifting without synchronous with the shifting portion, and with the total speed ratio varied continuously, the continuously variable shifting portion is controlled so that the speed ratio of the differential mechanism varies in an opposite direction to the speed ratio of the shifting portion.

3. A control device for a vehicular drive apparatus according to claim 1, further comprising a torque down control unit which executes a torque down control to reduce a transmitting torque to the drive wheels upon an inertia phase in the shifting process of the shifting portion before and after the shifting.

4. A control device for a vehicular drive apparatus according to claim 1, wherein the electric motor control unit places the differential mechanism in a continuously variable shifting state or a non-continuously variable shifting state, depending on a varying width of the total speed ratio comprised of the speed ratio of the continuously variable shifting portion or the differential portion and the speed ratio of the shifting portion.

5. A control device for a vehicular drive apparatus according to claim 1, wherein when the differential state determining unit determines that the differential mechanism is not in a continuously varying shifting state, the shifting portion shifts to the predetermined gear position.

6. A control device for a vehicular drive apparatus according to claim 1, wherein the predetermined gear position is based on vehicle speed and output torque of the shifting portion.

7. A control device for a vehicular drive apparatus according to claim 1, wherein the speed ratio change determining unit determines whether the total speed ratio is non-continuously varying based on a position of an accelerator pedal.

8. A control device for vehicular drive apparatus according to claim 1, further comprising a differential action limiting device operative to limit a continuous shifting of the differential portion by limiting a differential action of the differential mechanism.

9. A control device for vehicular drive apparatus according to claim 1, wherein the shifting portion executes the shifting by engagement and release of an engaging device, further comprising an engaging pressure control unit which controls an engaging pressure of the engaging device to allow a rotational speed of the transmitting member or a rotational speed of the engine to achieve a given variation during the shifting of the shifting portion, and wherein the engaging pressure control unit learns the engaging pressure to allow the rotational speed of the transmitting member or the rotational speed of the engine to achieve the given variation.

10. A control device for vehicular drive apparatus according to claim 9, further comprising a rotation control unit which varies a rotational speed of the transmitting member using at least one of the first electric motor or the second electric motor to allow the rotational speed of the transmitting member to achieve a given variation during the shifting of the shifting portion, and wherein when the rotational speed of the transmitting member is varied by the rotation control unit, the engaging pressure control unit inhibits learning of the engaging pressure of the engaging device.

* * * * *